United States Patent [19]

Oota et al.

[11] Patent Number: 5,740,341
[45] Date of Patent: Apr. 14, 1998

[54] DESIGN AND PRODUCTION SUPPORTING SYSTEM FOR COMPONENT ARRANGEMENT AND PIPE ROUTING

[75] Inventors: Yoshimi Oota, Mito; Toshiaki Yoshinaga, Hitachi; Shigeru Ohcoshi, Takahagi, all of Japan

[73] Assignee: Hitachi, Ltd., Tokyo, Japan

[21] Appl. No.: 230,527

[22] Filed: Apr. 20, 1994

[30] Foreign Application Priority Data

Apr. 21, 1993 [JP] Japan ................................... 5-094094
Sep. 1, 1993 [JP] Japan ................................... 5-216787

[51] Int. Cl.$^6$ ................................................ G06T 17/40
[52] U.S. Cl. ............................................................ 395/120
[58] Field of Search ........................... 395/118–120, 512; 364/512, 468.03, 468.04, 468.09, 468.1

[56] References Cited

U.S. PATENT DOCUMENTS

| | | | |
|---|---|---|---|
| 5,003,498 | 3/1991 | Ota et al. | 364/522 |
| 5,119,317 | 6/1992 | Narikawa et al. | 364/522 |
| 5,197,016 | 3/1993 | Sugimoto et al. | 364/490 |
| 5,255,207 | 10/1993 | Cornwell | 364/512 |
| 5,260,883 | 11/1993 | Wilson | 364/512 |
| 5,293,479 | 3/1994 | Quintero et al. | 395/161 |
| 5,337,320 | 8/1994 | Kung | 371/15.1 |
| 5,351,196 | 9/1994 | Sowar et al. | 364/474.33 |
| 5,386,506 | 1/1995 | Satoh et al. | 395/160 |

FOREIGN PATENT DOCUMENTS

| | | |
|---|---|---|
| A-0222387 | 5/1987 | European Pat. Off. . |
| 0294188 | 12/1988 | European Pat. Off. . |
| 64-28785 | 1/1989 | Japan . |
| 3-126173 | 5/1991 | Japan . |
| 4-21910 | 4/1992 | Japan . |

OTHER PUBLICATIONS

Charman, Philippe, "A Constraint–based Approach for the Generating of Floor Plans," *Tool s with Artificial Intelligence*, 1994 Conference, pp. 555–561.

Vaxivière, Pascal et al. "CELESSIN IV: Knowledge Based Analysis of Mechanical Engineering DrAwings," *System Engineering*, 1992 International Conference, pp. 242–245.

Zhu, David et al "Pipe Routing = Planning (with Many Constraints)," *Robotics and Automation*, 1991 International Conference, pp. 1940–1947.

(List continued on next page.)

*Primary Examiner*—Heather R. Herndon
*Assistant Examiner*—Rudolph Buchel
*Attorney, Agent, or Firm*—Antonelli, Terry, Stout & Kraus, LLP.

[57] ABSTRACT

A design and production supporting system for component arrangement and routing comprises a three-dimensional (3-D) component mapping means based on two-dimensional logical connection information of plant components and 3-D arrangement space information. To the 3-D component mapping means, an interactive mapping means and an automatic mapping means are provided. The interactive mapping means has a means for displaying the components arranged on the assigned plane of the arrangement space in the 3-D space keeping connection relationship among the components and a means for interactively moving these components in the arrangement space with keeping connection relationship among the components by using the dragging method. The automatic mapping means has a means for distinguishing the arranged spaces from the non-arranged spaces and arranging the components on the non-arranged spaces, and a means for searching the shortest route of pipes, etc., for the arranged components.

3 Claims, 35 Drawing Sheets

OTHER PUBLICATIONS

Sirinaovakul, Booncharoen, et al "An Intelligent Approach to Computer Aided Facility Layout," *Industrial Electronics, Control, and Instrumentation*, 1991 International Conference, pp. 87–92.

Satyanarayana, M.V.V. et al, "An Automatic Pipe–Routing Planner in Three Dimensional Plant Layout," *COMPEURO '92 omputer Systems and Software Engineering*, pp. 71–76. Proceedings of the American Power Conference, 24–25 Apr. 1989, pp. 743–747.

Proceedings of Compint 85: Computer Aided Technologies, 8–12 Sep. 1985, pp. 96–102, Wada Y et al.

Electronic and Packaging and Production, vol. 32, No. 4, 1 Apr. 1992, pp. 52–55, Printed Circuit CAD Systems and Software: Part 3, Ginsberg G L.

Patent Abstracts of Japan, & JP–A–06 282610 (Haseko Corp) 7 Oct. 1994.

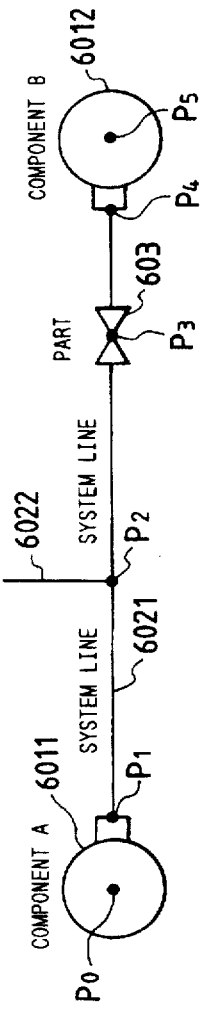
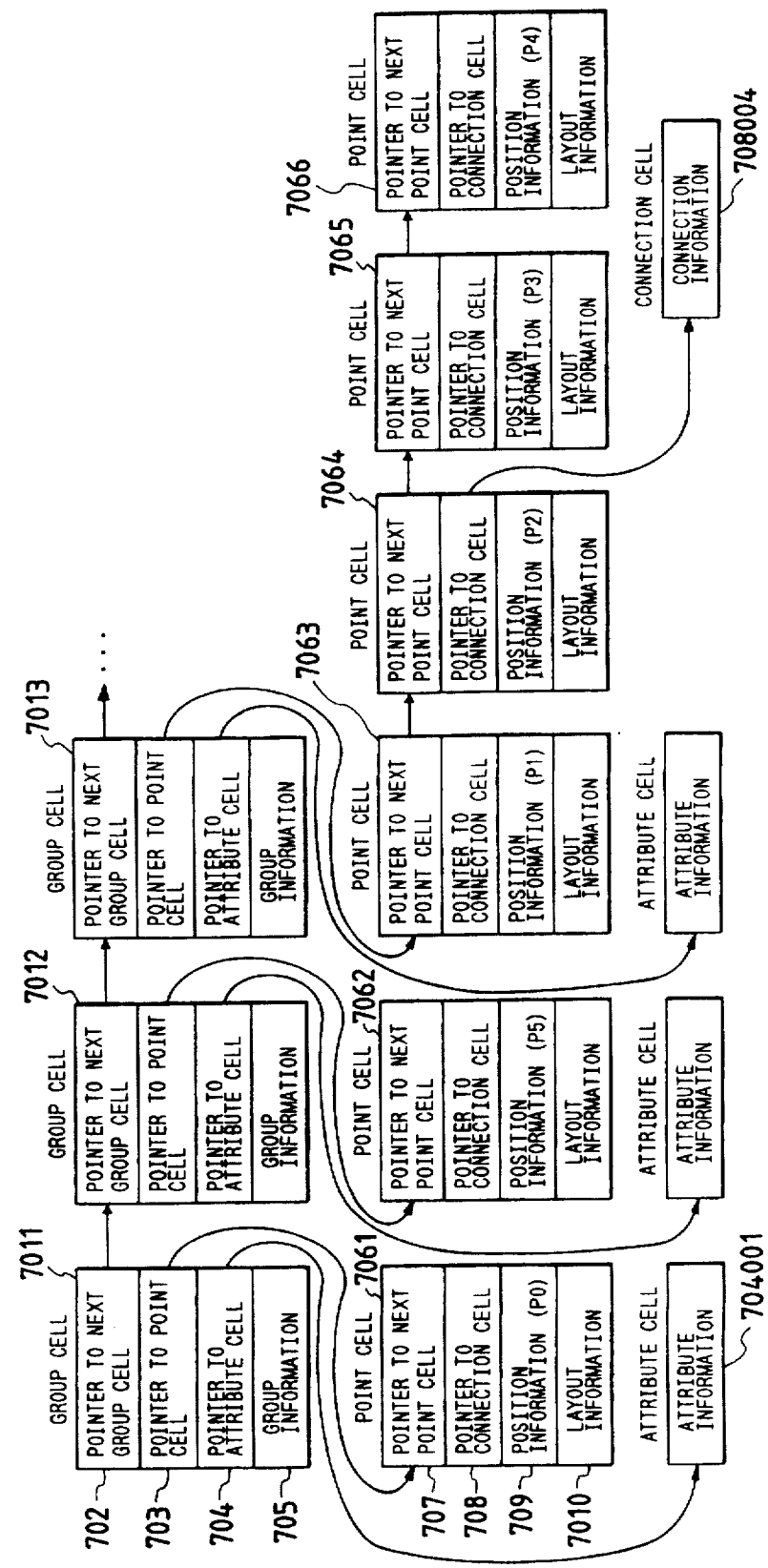
FIG. 7(1)
FIG. 7(2)

POLYLINE REPRESENTATION

THREE-DIMENSIONAL REPRESENTATION

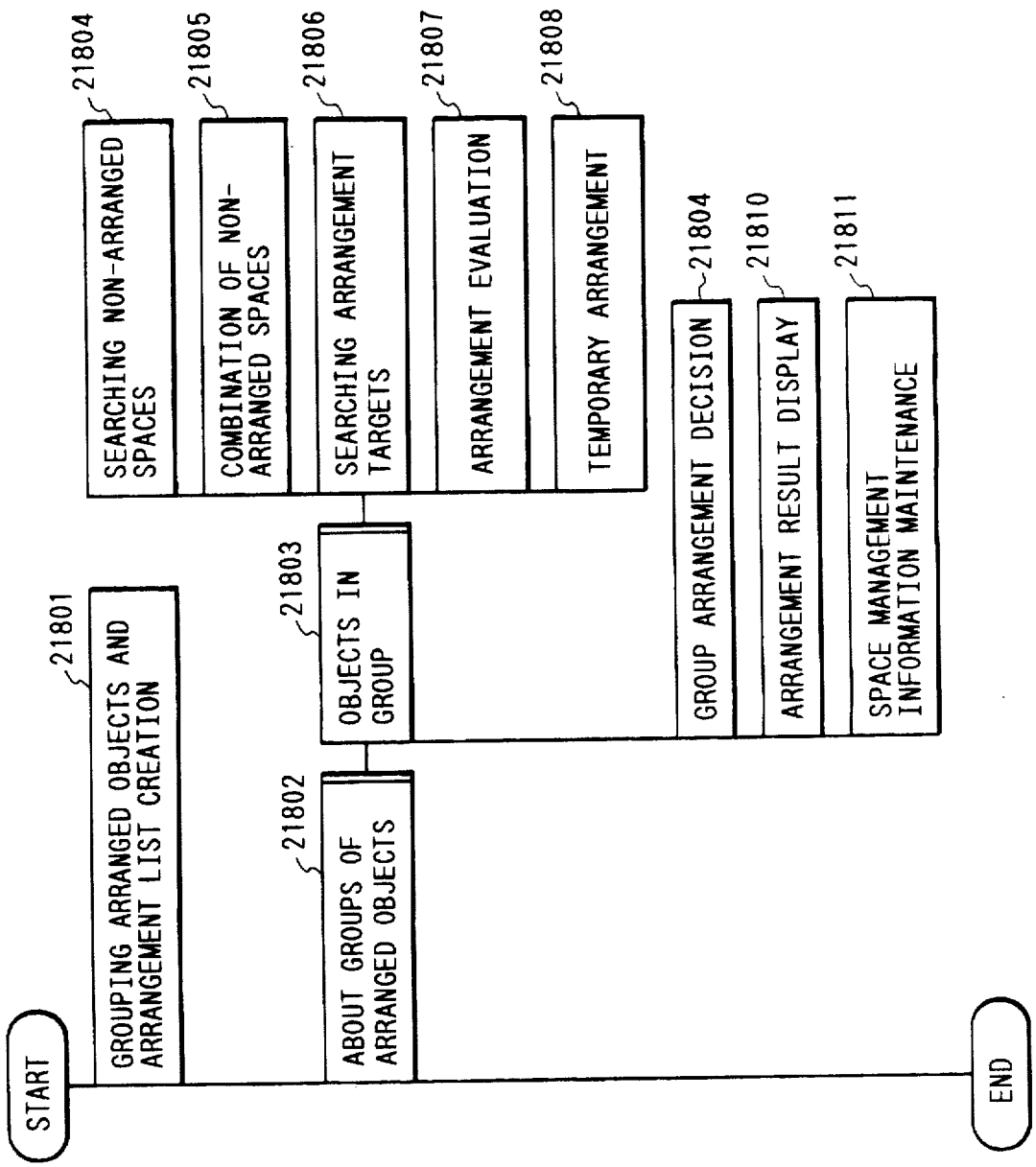

FIG. 23(1)

| COMPONENT NAME | TARGET BUILDING | COMPONENT SIZE (X,Y,Z) | ARRANGEMENT ORDER | RESTRICTION | ROUTE RESTRICTION |
|---|---|---|---|---|---|
| K1 | T1 | 20, 20, 20 | 1 | MUST BE PUT ON GROUND | R1 (K1, K2) |
| K2 | T1 | 20, 20, 20 | 2 | MUST BE PUT TOP FLOOR | R1 (K1, K2) |
| K3 | T1 | 20, 20, 20 | 3 | MUST BE PUT IN FRONT OF K1 (IN THE Y AXIAL DIRECTION) | R2 (K1, K3) |
| K4 | T1 | 20, 20, 20 | 4 | MUST BE PUT NEAR K2 | R3 (K2, K4) |

FIG. 23(2)

| ROUTE NAME | PRIORITY | START POINT | END POINT | TRANSIT POINT | CROSS SECTION FORM | SIZE (DIAMETER) (mm) | BEND RADIUS (mm) |
|---|---|---|---|---|---|---|---|
| R1 | 1 | K1 | K2 | — | CIRCLE | 318.5 | 1274.0 |
| R2 | 2 | K1 | K3 | — | CIRCLE | 114.3 | 457.2 |
| R3 | 3 | K2 | K4 | — | CIRCLE | 114.3 | 457.2 |

DESIGN AND PRODUCTION SUPPORTING SYSTEM FOR COMPONENT ARRANGEMENT AND PIPE ROUTING

BACKGROUND OF THE INVENTION

1. Field of the Invention

The present invention relates to a design and production supporting system for arrangements, pipe routing, etc. of plant components using a three-dimensional CAD system, and more particularly to a design and production supporting system which integrates steps from planning and basic designing steps to construction and manufacturing steps and is effectual for saving of design and production labor.

2. Description of the Prior Art

As described in "CAD/CAM in the CIM Period" (P.21 to P.53, January 1989, by Nikkei Computer Graphics) and in "Appearance of Global CIM Brought by Open CAD" (P.14 to P.29, May 1991, by Nikkei Computer Graphics), conventional design and production supporting systems have been accomplished by developing needed systems or by purchasing them on the market, by a design or a productions section individually.

In such designing processes, drawings are very significant information transferring means. Conventionally, what is the most important in designing has been to generate such drawings and supporting means to generate such drawings have been individually developed and put into practical use. However, no integrated design and production supporting system has been put into practical use.

Further, Japanese Patent Application Laid-open No. 64-28785, for example, discloses a plant component arrangement designing system which transfers system diagrams (piping and instrument diagram) which are system design information to a three-dimensional CAD, generates three-dimensional patterns and arrangements of components from the system diagrams, and interconnects the components with piping by the three-dimensional CAD. However, this disclosure does not describe how two-dimensional system diagrams are developed into three-dimensional arrangements of components.

As for automatic arrangement and pipe routing of plant components in order to further save design and production labor, automatic processing techniques as automatic arrangement and pipe routing have been developed and put into practical use for the electronic design support system including the LSI and printed circuit board as discussed in "Basics of Ultra-LSI CAD" (by Kaji, Kawanishi and Funazu, 1983, Ohm Publishing Co., Ltd., Tokyo). The maze method is known for automatic placement and routing of the LSI. This method requires the range to be divided to a very fine level equivalent to line width, raising a problem of extremely increased number of the elements.

Japanese Patent Application Laid-open No. 126173-1991 refers to automatic arrangement of the predetermined form, but does not mention the method of finding routes such as piping routes.

A combination of knowledge processing and maze method is known as described Japanese Patent Application Publication No. 21910-1992. The maze method requires the space to be divided to a very fine level, raising a problem of increased number of the range elements.

SUMMARY OF THE INVENTION

Objects of the Invention

An object of the present invention is to solve the problems and to provide a design and production supporting system which facilitates three-dimensional arrangement designing from system design information of plant components, etc.

Another object of the present invention is to provide a design and production supporting system capable of managing information in design and production steps from planning and basic designing steps to construction and manufacturing steps collectively.

Methods Solving the Problems

A design and production supporting system in accordance with the present invention has a three-dimensional space mapping means for mapping two-dimensional logical connection information which describes interconnections of a plurality of components constituting a plant in a three-dimensional space according to arrangement space information by which plant components are disposed and thereby obtaining three-dimensional component arrangement information. The two-dimensional logical connection information contains system diagram information describing a plurality of components constituting a plant with symbols and piping described with solid lines interconnecting these components.

In a preferred embodiment of the present invention, the three-dimensional space mapping means has a means of laying out and displaying a plurality of components on the preset plane in a three-dimensional arrangement space in which these components are to be laid out in keeping the interconnections. In arrangement display, it is preferable to display a specific component in a three-dimensional display way according to its attribute information such as the specification, shape, material, etc. of the component.

Further, the three-dimensional space mapping means preferably has a means for displaying these components on the preset plane in the three-dimensional arrangement space in which these components are to be laid out and moving the components respectively in the three-dimensional arrangement space in keeping the interconnections. For improvement of operability, it is preferable that the means has a dragging function of displaying a continuous movement of an component and a rubber-band function of expanding or contracting all related interconnections of components as the components moves.

Furthermore, a plant component design and production supporting system in accordance with the present invention has a database management means for storing and managing component design information which is attribute information such as specifications, shapes, materials, so on of a plurality of components constituting a plant, system design information describing interconnections of these components, and building design information describing the envelope shapes, and locations in the plant space of the building in which a plurality of components are disposed, as a database. A plurality of components and piping which interconnect these components are mapped and laid out in three-dimensional display way in a arrangement space in which a plurality of components are to be disposed.

The database managing means preferably manages the component design information, system design information, building design information, and three-dimensional component positional information which is mapped according to the information, by the same data structure. In a preferred embodiment, the database managing means manages two- or three-dimensional positional information of the plurality of components and two-dimensional system lines or three-dimensional pipe routing information respectively, as group cells.

For adopting the automatic component arrangement and pipe routing of plant components in the present invention, a component arrangement processing means to automatically generate the components arranged in spaces according to the basic design information such as components arrangement information as the logical connection information, the arrangement space information of the buildings, etc., and a routing processing means to automatically generate the information of piping routes to which the components are to be connected according to the said components arrangement information are provided.

The automatic components arrangement processing means specifies a space to arrange the target components, evaluates the component arrangement in the specified space executed by using the basic design information stored in a data base under the component arrangement restriction condition information, and selects the most highly evaluated arrangement.

The automatic pipe routing processing means divides the piping route to be set into sub-routes according to the components arrangement information, evaluates each of the sub-routes based on the sub-route length calculated in the specified space that includes the start and end point of the sub-route, and then selects the most highly evaluated sub-route.

Furthermore, the automatic processing means allow displaying the obtained component arrangement and the optimized pipe routing as occasion demands. And, it is possible to change the results by the dragging function and the rubber-band function.

BRIEF DESCRIPTION OF THE DRAWINGS

FIG. 7(1) is an example representation of system block diagrams.

FIG. 7(2) shows an example of describing system design information using cell structures as to the example shown in FIG. 7(1), explaining how arrangement information is managed.

FIG. 8(2) shows an example combination of the elementary figures.

FIG. 8(3) shows a figure for interference checking of maintenance space.

FIG. 9(2) explains how a two-dimensional symbol is made solid.

FIG. 11(2) is a block diagram representing the relation described in FIG. 11(1).

FIG. 11(3) shows a plan view of the section constitution described in FIG. 11(2).

FIG. 13(2) shows a mode of representing routes with three-dimensional solid elements.

FIG. 22 is a drawing to show the automatic component arrangement process.

FIG. 23(1) is a drawing to illustrate the concrete examples of constraint conditions.

FIG. 23(2) is a drawing to illustrate the constraint conditions of the pipe routing positions.

FIG. 26(2) is a drawing to show the case where non-arranged space forms four triangular prisms.

FIG. 27(2) is a drawing to illustrate the non-arranged space after arranging components K1 and K2 in the acceptable space.

FIG. 27(3) is a drawing to illustrate the non-arranged space after arranging components K1, K2 and K3 in the acceptable space.

FIG. 27(4) is a drawing to illustrate the non-arranged space after arranging components K1, K2, K3 and K4 in the acceptable space.

FIG. 30(2) is a three-dimensional drawing to show the non-arranged spaces A1–A9 available for the pipe routing.

FIG. 30(3) is a drawing to show the connection states of the non-arranged spaces A1–A9 by graph representation.

FIG. 33(2) is a drawing to illustrate rout candidates in the y and x direction.

FIG. 33(3) is a drawing to illustrate the routing results.

DETAILED DESCRIPTION OF THE EMBODIMENTS

Preferred embodiments of a plant design and production supporting system in accordance with the present invention will be explained with reference to drawings. For better understanding, the explanation is divided into sections (1) to (13).

(1) Summary of the embodiments

Figure 1:
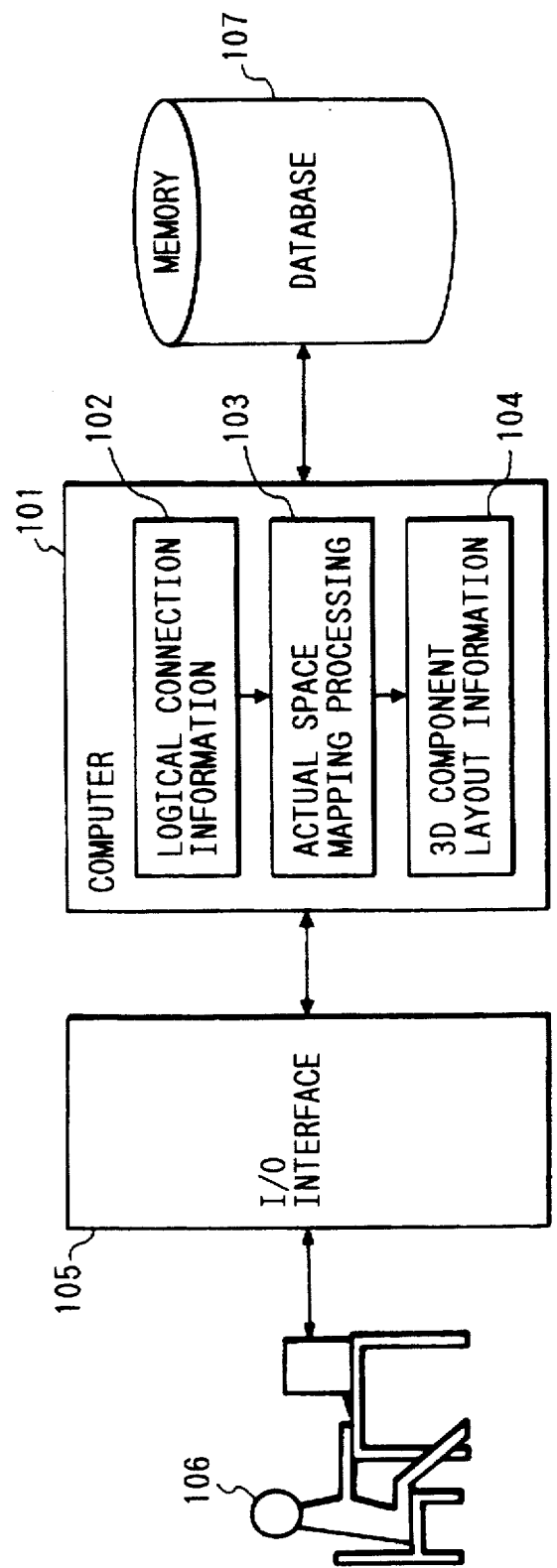
FIG. 1 is a block diagram explaining the concept of actual space mapping processing.

FIG. 1 illustrates a concept of mapping two-dimensional logical connection information into three-dimensional component arrangement information in the present invention. In FIG. 1, logical connection information 102 is generated by interactive processing between a designer 106 and a computer 101 via an I/O interface 105. The generated logical connection information 102 is stored in a database 107 in a memory. Actual space mapping processing 103 searches the database 107 for the completed logical connection information 102, maps it in a three-dimensional actual space, and generates three-dimensional component information 104. In greater detail, the actual space mapping processing 103 maps two-dimensional logical connection information in the three-dimensional space according to arrangement space information by which components are actually disposed. Details of the actual space mapping processing 103 will be explained in section (6).

The three-dimensional component arrangement information 104 mapped in the actual space is used as an initial design plan for arrangement and pipe routing design. This information may be modified and changed by interactive processing between the designer 106 and the computer 101 via an I/O interface 105 to generate more adequate three-dimensional component arrangement information 104, which may be stored in the database 107. The three-dimensional component layout information 104 which is modified and changed will be used in a successive design and production step.

Figure 2:
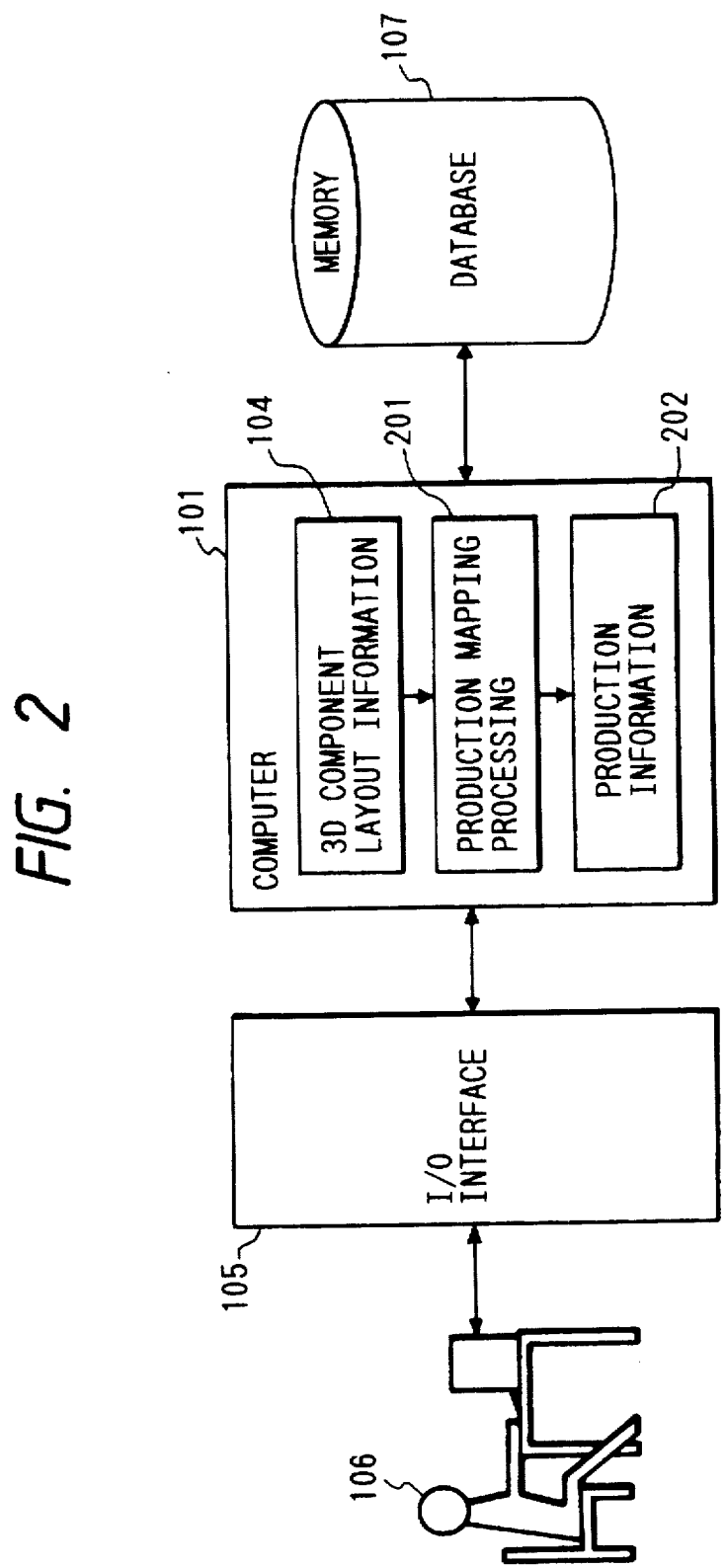
FIG. 2 is a block diagram explaining the concept of production mapping processing.

FIG. 2 illustrates a concept of generating production information from three-dimensional component layout information 104. Herein, production information includes construction design information (assembly drawing) and manufacturing design information (prefabricated drawing). The three-dimensional component layout information 104 relating to the completed three-dimensional layout design of components is mapped into production information 202 of a production design stage by the production mapping processing 201. In the production design stage, the production information 202 generated by the production mapping processing 201 is detailed by interactive processing between the designer 106 and the computer 101 through the I/O interface 105. The completed production information 202 is stored in the database 107 and will be used in stages of manufacturing three-dimensional components in actual production site and in construction stages on the site.

Figure 3:
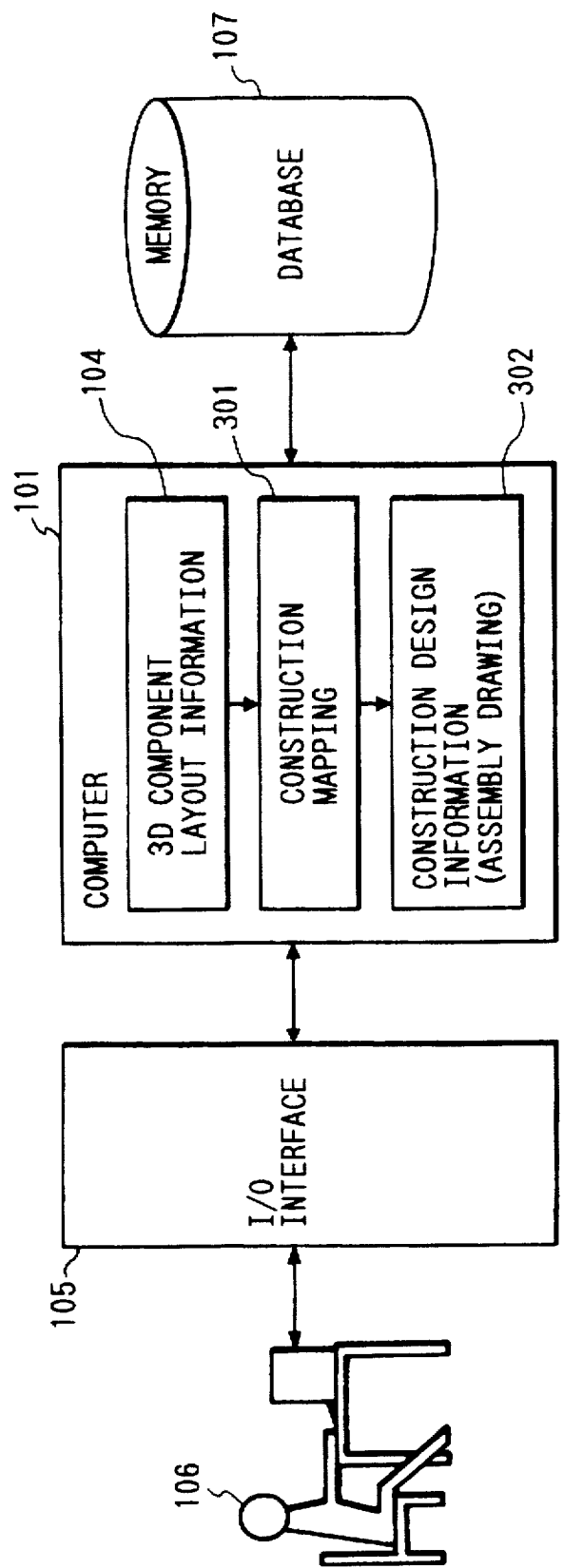
FIG. 3 is a block diagram explaining the concept of construction mapping processing.

FIG. 3 illustrates a concept of construction mapping processing. In this figure, the three-dimensional component layout information 104 relating to the completed component arrangement design and pipe routing design is mapped into construction design information 302 of a construction design stage by the construction mapping processing 301. In construction designing, the construction design information 302 which is automatically generated by the construction mapping processing 301 is detailed by interactive processing between the designer 106 and the computer 101 through the I/O interface 105 to generate construction design information 302 on the basis of three-dimensional component layout information 104. The construction design information 302 is stored in the database 107. The completed construction design information 302 is searched for in the database 107, transferred to actual production sites, and used on the spots. The construction mapping processing 301 will be explained in detail in section (9).

Figure 4:
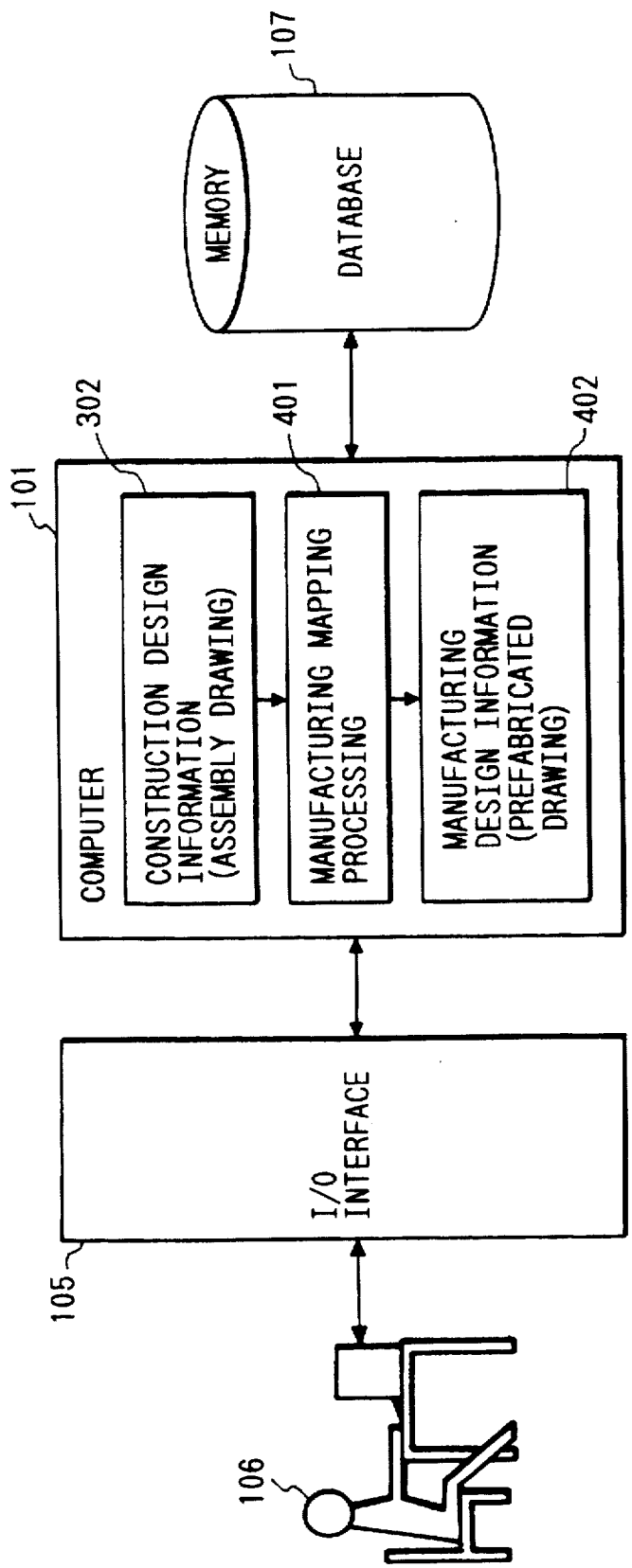
FIG. 4 is a block diagram explaining the concept of manufacturing mapping processing.

FIG. 4 illustrates a concept of manufacturing mapping. In this figure, the construction design information 302 whose designing is completed is mapped into manufacturing design information 402 of a manufacturing design stage by the manufacturing mapping processing 401. In manufacturing designing, the manufacturing design information 402 which is automatically generated by the manufacturing mapping processing 401 is detailed by interactive processing between the designer 106 and the computer 101 through the I/O interface 105 to generate manufacturing design information 402 on the basis of construction design information 302. The manufacturing design information 402 is stored in the database 107. The completed manufacturing design information 402 is searched for in the database, and transferred to actual production sites for manufacturing in a factory. The manufacturing mapping processing 401 will be explained in detail in section (11).

Figure 5:
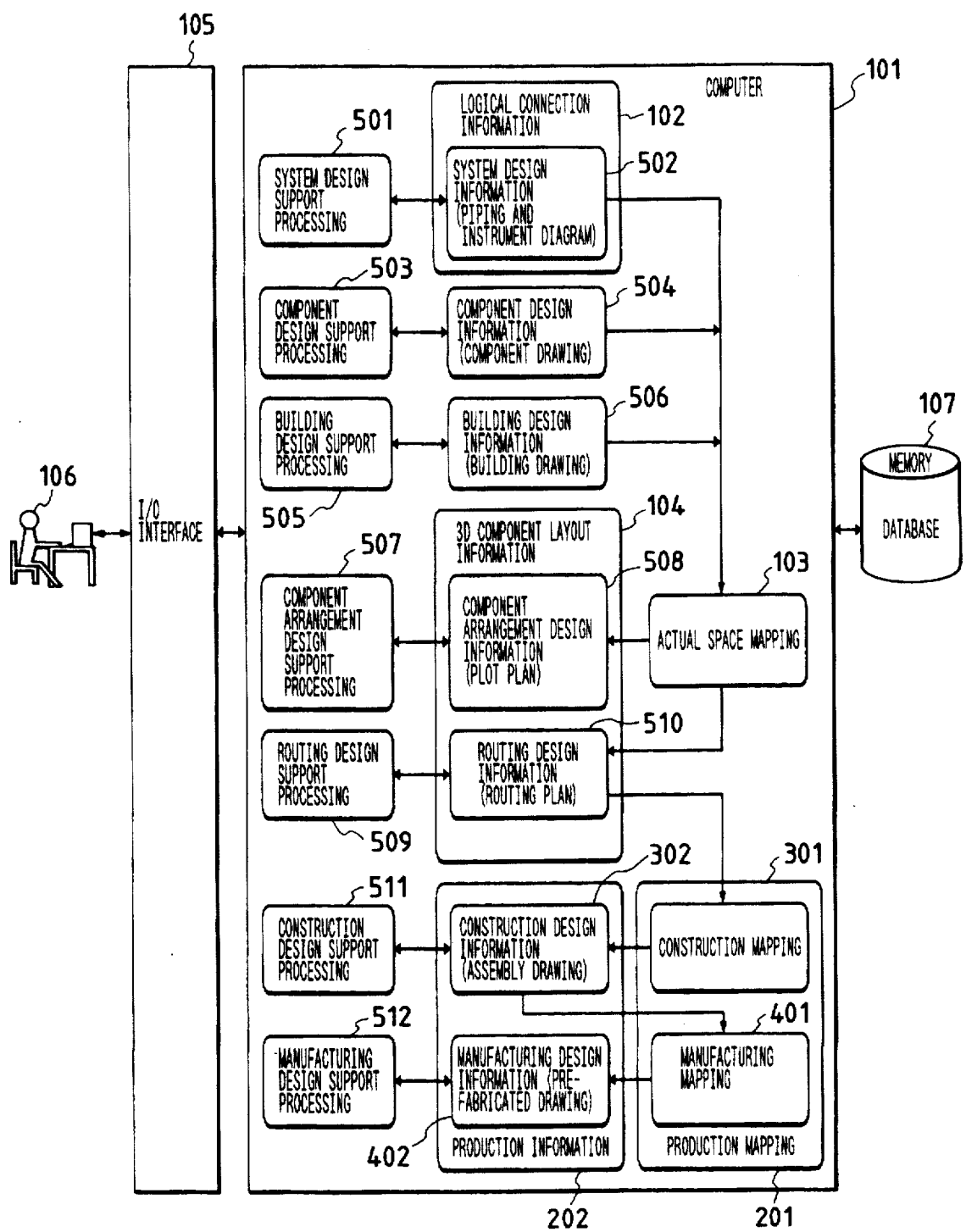
FIG. 5 is a block diagram explaining the concept of a plant design and production throughout a system.

(2) A continuous processing system from design to production of a plant structure FIG. 5 shows an embodiment of a continuous processing system from design to production combining the actual space mapping processing 103 and production mapping processing 201.

In this figure, the system design support processing 501 generates system design information (piping and instrument diagram) 502 and the component design support processing 503 generates component design information (component drawing) 504, which is attribute information of components such as specifications, shapes, materials, etc. The building design support processing 505 generates building design information (building drawing) 506 containing the envelope shape and location of the building in the plant space. Two-dimensional system design information generated by the system design support processing 501 is mapped in the three-dimensional arrangement space by the actual space mapping processing 103 according to component design information 504 and building design information 506 and thereby the initial design plan of three-dimensional component arrangement information is generated. The component arrangement design support processing 507 generates detailed component arrangement design information (plot plan) 508 from this initial design plan. Further, the pipe routing design support processing 509 generates pipe routing design information(route plan) 510 according to the component arrangement design information 508. The above processing is performed interactively between the designer and the computer by means of the display. Accordingly, arrangement of components in a three-dimensional building space in accordance with a piping and instrument diagram describing interconnections of components is carried out efficiently and adequately.

The system design support processing 501, the component design support processing 503, and the building design support processing 505 will be explained in detail respectively in sections (3) to (5) in that sequence.

The three-dimensional component layout information 104 obtained in the above-mentioned processing is mapped into production information 202 by the production mapping processing 201. In the production mapping processing 201, the routing design information 510 is mapped into construction design information (assembly drawing) 302 by the construction mapping processing 301 and the construction design information 302 is mapped into manufacturing design information (prefabricated drawing) 402 by the manufacturing mapping processing 401. Substantial generation of construction design information 302 and manufacturing design information 402 is made by the construction design support processing 511 and the manufacturing design support processing 512 during interactive construction between the designer and the computer through the I/O interface 105.

The component arrangement design support processing 507, the pipe routing design support processing 509, and the construction design support processing 511 will be explained in detail respectively in sections (7), (8), (10), and (12) in that sequence.

Each detailed design information obtained by each design support processing in interactive construction between the designer 106 and the computer 101 through the I/O interface 105 is stored in the database 107. Each design information stored in the database 107 is searched for and modified or changed if necessary by respective design support processing.

Further, in the I/O interface 105, the coordinate system of the display screen is one-to-one-related to the coordinate systems of coordinate input means (a mouse, a stylus pen or three-dimensional coordinate input means ) which can input continuously (in relation to time) so that the designer may input the coordinate value of any point on the display screen and pick any shape on the screen. This enables various interactive processing.

Hereinafter, more detailed explanation will be made. Before the explanation, word definition is described as follows. That is, "lines" which interconnect system components in the piping and instrument diagram represent system lines, three-dimensional connections such as piping, air ducts and cable trays as routes, "components" represent system components such as tanks and heat exchanger and "parts" represent piping units such as valves and flow meters which are disposed on routes.

Figure 6:
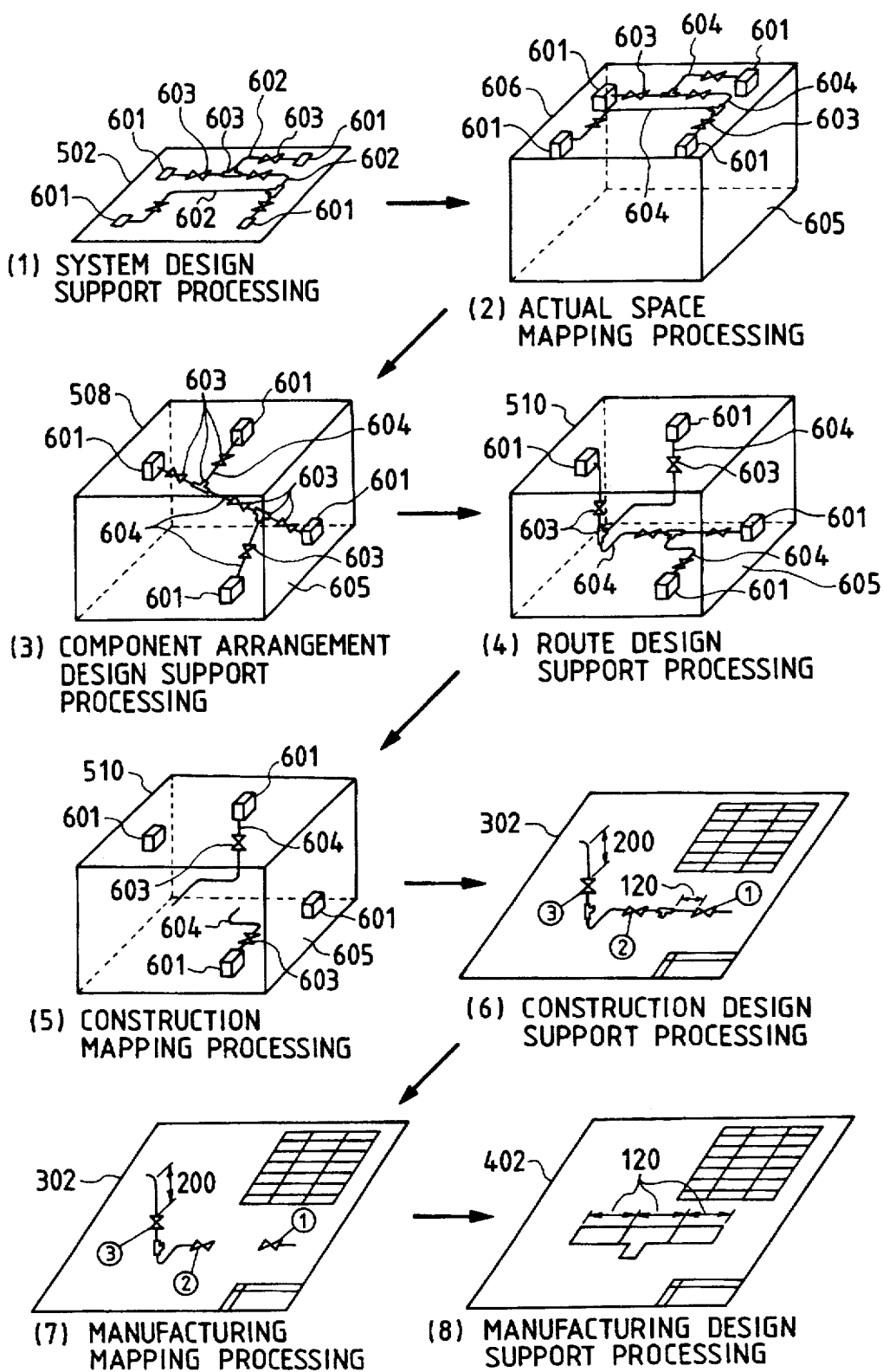
FIG. 6 is a flow diagram illustrating a flow of data in the plant design and production throughout a system.

FIG. 6 illustrates a flow of data in case a design and production supporting system is applied to plant components.

In a system designing stage equivalent to a basic designing illustrated in the step (1) of FIG. 6, the system design support processing 501 generates system design information 502. This system design information 502 describes components 601 constituting a plant and piping which interconnect the components 601 using a solid line (system line 602). This system design information 502 simplifies components 601, parts 603, and piping and describes their logical connections correctly but their scales are arbitrary. Components 601 and parts 603 are generally represented with symbols. The system design support processing 501 displays a drawing size describing the system design information 502 on the display screen. Accordingly, the designer can input positions of components 601 and shapes of curving points (including start and end points) of system lines 602 with numeric values or enter optimum positions of components 601 and parts 603 by displaying them in a dragging manner through the I/O interface 105.

Displaying in the dragging manner can be accomplished by one-to-one relating the coordinate system of the display screen to the coordinate system of a coordinate input means, one-to-one relating the positions of components 601 and parts 603 to the coordinate system of the coordinate input means, and re-displaying the change status in real time. Further, the system line 602 can be displayed by a rubber-band manner on-screen so that the designer can input and check an optimum shape of a system line 602. The rubber-band display function allows a component to be tacked on the screen while simultaneously expanding or contracting all related interconnections of the route 604. This function can be accomplished by providing curving points on the system line 602, one-to-one relating the curving points to coordinate values of the coordinate input means, and re-displaying the change of shapes in real time.

In synchronism with this, designing of a arrangement space (building) 605 and components 601 itself starts. The component design support processing 503 generates specifications, three-dimensional shapes, and symbolic shapes which are component design information 504. The building design support processing 505 generates building specifications, an envelope shape and location of the building in the plant space which are building design information 506. Next, component arrangement and route designing in a three-dimensional actual space are performed according to the building design information 506 and component design information 504.

According to the present invention, an actual space mapping processing 103 is provided to use two-dimensional system design information 502 directly in three-dimensional component arrangement designing and route designing stages. In other words, the actual space mapping processing 103 from the step (1) to the step (2) in FIG. 6 automatically maps system design information 502 in a three-dimensional arrangement space 605 in which arranging of components 601 and designing of routes 604 are actually carried out according to building design information 506 which indicates the size of a building in which components 601 and routes 604 are disposed and thereby generates an initial design plan 606 which is three-dimensional component arrangement information 104 comprising information of components 601 and routes 604. In component arrangement designing shown in the step (3) of FIG. 6, the component arrangement design support processing 507 generates detailed component arrangement design information 508 according to the initial design plan 606 in the step (2) of FIG. 6. In this case, if components 601 are not displayed three-dimensionally, it is automatically changed into three-dimensional component shapes which were generated by the component design support processing 503. Although the designer can input numeric values as positions of components 601, it is also possible to specify optimum positions of components 601 by the dragging display function as well as in the case of system design information 502. In this case, the route 604 expands and contracts like a rubber on the screen band as the components 601 moves. So, the designer can perform arrangement designing considering the lengths of the routes 604. These results are grouped as component arrangement design information 508.

In route designing in the step (4) of FIG. 6, the route design support processing 509 generates routing design information 510 according to the component arrangement design information 508 which is the arrangement design information of components 601 in the step of (3) of FIG. 6. As the start and end points of the route 604 are given in the arrangement information of components 601, the designer determines the optimum route 604 and the optimum positions of parts 603 considering the efficiency of using the three-dimensional actual space. Although the designer can inputs numeric values as positions of parts 603 and routes 604, it is also possible to specify optimum route by using the rubber band display function in the three-dimensional actual space as well as in the case of the system line 602. In arrangement designing of parts 603, each part can be moved and rotated on the route 604. The designer can specify an optimum position of each part 603 by dragging it on the route 604. These results are grouped into route design information 510.

Furthermore, these design information is transferred to construction design support processing and to manufacturing design support processing. Route design information 510 in the step (4) of FIG. 6 is cut out for each construction unit by the construction mapping processing 301. A cut-out part of the route design information 510 is deleted from the screen as shown in the step (5) of FIG. 6 (but not deleted from the route design information 510) so that the designer may easily check which part has not been mapped. In construction designing, the construction design support processing 511 cuts out preset lengths of the route according to the cut-out information in the step (6) of FIG. 6 and adds welding information and parts information to the information. The resulting information is grouped into construction design information 302 and will be used in the plant construction stage.

Further, construction design information 302 in the step (6) of FIG. 6 is cut out for each manufacturing unit by the manufacturing mapping processing 401. A cut-out part of the construction design information is deleted from the screen as shown in the step (7) of FIG. 6 (but not deleted from the construction design information 302) so that the designer may easily check which part has not been mapped. In manufacturing designing in the step (8) of FIG. 6, the manufacturing design support processing 512 adds shapes of welded parts and working information according to the cut-out information (cut out for each manufacturing unit). The resulting information is grouped into manufacturing design information 402 and NC data and will be used in the manufacturing stages in a factory.

Although processes of the design and production supporting system in accordance with the present invention are explained above respectively, the system can support design and production activities considering the whole including components, piping, air conditioning ducts, cable trays, etc.

FIGS. 7(1) and 7(2) illustrate how data is managed to support these design and production activities from beginning to end. System design information 502 consists of component arrangement information 601 and system line information 602. The information is managed by the database 107.

FIG. 7(1) assumes that component A (6011) and component B (6012) are positioned with symbols and their interconnection is represented by a system line 6021, that the system line 6021 starts at a nozzle point P1 of the component A on the drawing and ends at a nozzle point P4 of the component B (6012), that the system line 6021 is connected to another system line 6022 at the point P2 on the system line 6021 and has a part 603 at the point P3, and that the whole system design information is described using cell structures in the database 107.

FIG. 7(2) illustrates an example of describing system design information using cell structures. In this figure, group cells 701 (7011, 7012, and 7013) manage component arrangement information of component A and B and system line information of system lines 6021 and 6022. The group cells also manage three-dimensional arrangement information of components 601 generated by the component arrangement design support processing 507 and routing information of route 604 generated by the routing design support processing 509. The group cell 7011 manages a pointer 702 to the next group cell 7012, a pointer 703 to a point cell, a pointer 704 to an attribute cell, and group information 705. The group information 705 manages a flag F for identifying an object to be managed (F=1 for description of component arrangement information in system designing, F=2 for description of system line information, F=3 for three-dimensional arrangement information of components 601 in the component arrangement design stage, or F=4 for description of route information 604 in the routing design stage) and its name. For example, when an component 601 is to be managed, the group information manages the name of the components. When a system line 602 is to be managed, the group information manages the name of the system line. In management of route information 604 to be explained later, the group information 705 also manages sectional shape information of the route 604. This will be used for three-dimensional display and interference check of the route 604.

Each point cell 706 (7061 to 7066) manages information of locations of components A and B and arrangement information of the part 603 and curving points of the system line 602 and the route 604. The point cell can also manage design information in manufacturing and construction stages. Their details will be explained in "construction design support processing 511" and "manufacturing design support processing 5012." The point cell 706 manages a pointer 707 (7071, 7072, . . . ) to the next point cell 706, a pointer 708 (7081, 7082, . . . ) to a connection cell, point position information 709 (7091, 7092, . . . ), and arrangement information 7010 (70101, 70102, . . . ). For example, the point cell 7061 manages a pointer 7071 to the next point cell 7062, a pointer 7061 to a connection cell, point position information 7091, and arrangement information 70101. The position information 709 manages a position in a drawing, that is, two-dimensional coordinate values (x, y) in case of F=1 and F=2 or a position in a three-dimensional actual space, that is, three-dimensional coordinate values (x, y, z) in case of F=3 and F=4. The arrangement information 7010 manages the names of the components 601 and the part 603, transformation matrix, the shape display flag DF (DF=2 for display of a three-dimensional shape or DF=1 for display of a symbolic shape), a display scale factor (for enlarged or reduced display of components 601 and part 603, usually 1), and parameter information (for changing the size of components 601 and part 603). In case of arrangement of components 601 (F=1 and F=3), a point cell 706 is generated and the position information 709 manages the arrangement position of components 601.

In case the component 601 consists of a plurality of components, point cells 706 as many as the components are generated. Each of their arrangement positions is managed by position information 709 and each of their names is managed by arrangement information 7010. In this case, a generic component name is given as the component name in the group information 705 and the sequence of pointers in the point cells 706 are assumed to be meaningless. The name of component 601 or part 603 in the arrangement information 7010 is a key to component information 504 or part information (to be managed like component information) and also works to associate the point cell with an component cell 1001 shown in FIG. 10. The connection of the component 601 (F=1) and the system line 602 (F=2) and the connection of the component 601 (F=3) and the route 604 (F=4) are managed by the connection information of the connection cell 708004 by managing the name of a mate to be connected. For example, the connection information of the component cell of component 601 manages the name of the system line 602 and the connection information for the system line 602 manages the name of the component 601. The connection of the component 601 and the route 604 is also described in the similar way. In the description of the system line 602 (F=2) and the route 604 (F=4), point cells 706 for a set of points constituting the system line 602 and the route 604 are generated. These point cells are consecutively related to each other from the upper-stream side to the lower stream side. The part 603 placed on the system line 602 or the route 604 is managed by the arrangement information 7010 of the point cell 706. This arrangement information also manages a part name, a transformation matrix, a display scale factor, and parameter information. The interconnection of the system lines 602 or routes 604 is described in the connection cell 708004. The connection cell 708004 manages the name of the mate system line or route by the connection information. The specifications of the component 601, the system lines 602, and the routes 604 are respectively managed by the attribute information of the attribute cells 70400 (704001, 704002, and 704003).

As described above, the system design information 502, the component design information 508, and the routing design information 510 are managed with the same data structure. Further, in each design stage, the design information in the upper-stream side can be detailed and thereby the design and production activities throughout from the upper-stream side to the lower-stream side can be supported.

In the following examples are detailed support processes at respective design and production stages for generating and mapping these forms of information.

(3) System design support processing

The system design support processing 501 generates system design information 502. The system design support processing 501 first sets the drawing size of a diagram 502 and displays it on the display screen via the I/O interface 105. Then, the system design support processing 501 lays out components 601 whose symbols shapes are already generated in the drawing. (The generation of symbols and three-dimensional shapes will be explained in "component design support processing 503.") A coordinate input means is connected to the display screen via the I/O interface 105 and the designer can input positions of components 601 as time-consecutive coordinate values. When positions of components 601 are changed, new positions can be dragging-displayed. Accordingly, the designer can determine optimum component positions easily. Information of the component to be laid out is managed by a group cell 701 as explained above. The group information 705 of the group cell 701 manages the identification flag (F=1) and the name of the component 601. The arrangement information of the component 601 is described in a point cell 706. The position information 709 manages the arrangement position of the component 709. The arrangement information 7010 manages the component name and the transformation matrix indicating the attitude of the component (two-dimensional transformation matrix). The rotation of the component 601 is also dragging-displayed by calculating the amount of rotation from an angle of a line segment connecting a arrangement position of the component 601 and a coordinate point sent from the coordinate input means to the horizontal line on the screen and by re-displaying the component 601. Thereby, the designer can determine an optimum attitude of the component 601 easily. By using an angle mesh (a radial mesh whose lines extending radially from the arrangement position of the component 601 are angled at preset intervals), the designer can rotate the body of the component to a predetermined angle position, to a perpendicular position, or to a horizontal position. The amount of rotation of the component is managed by a rotation matrix.

Below is explained a generation of the system line 602. When the designer inputs the name of a system line, a group cell 701 is generated. When the designer inputs the coordinates values of turning points (including a start and end point) of the system line 602 on the drawing, point cells 706 corresponding to the turning points are generated. Instead of this input method, the designer can specify nozzle points of component 601 as the start and end point. In this case, the name of the system line is set in the connection information field of the connection cell 708004 of the component 601. Further, the connection cell 708004 under the point cells for the start and end point of the system line 602 manages the name of the mate component 601. The resulting system line 602 is displayed in a rubber-band manner. The system line 602 can be shaped, if necessary, by picking up a point for a turning point on the system line 602 by the coordinate input means, generating a turning point, and moving it. As for input of turning points, the designer can input (drag) the coordinates of a plurality of points continuously (with respect to time) as well as in the arrangement of the components 601. The shape of the system line 602 can be displayed in a rubber-band manner by re-displaying segments constituting the system line 602 as the turning point moves. Thereby, the designer can generate an optimum system line shape 602. In a generation of a new turning point, a point cell 706 is generated and the system line 602 is added to a set of points to be described.

Below is explained processing to dispose a part 603 on the system line 602 which is generated as explained above. In this processing as well as in the arrangement processing of components 601, it is possible to limit the arrangement of a part 603 on the system line 602, to drag and display it along the system line 602, and thereby to determine an optimum arrangement of the part 603 easily. A method of limiting the arrangement of a part 603 on the system line 602 consists of selecting the shortest one of perpendicular lines drawn from coordinate values which are input continuously to line segments constituting the system line 602 and determining the arrangement position of the part on the system line 602. When the arrangement position of the part is determined, a point cell 706 for the arrangement of the part 603 is generated and added to a point set of the system line 602. The arrangement information 7010 of the point cell 706 manages the name of the part and the transformation matrix indicating the attitude of the part. As for the arrangement attitude of the part 603, there are two kinds of elements: elements that are fixed by the system line 602 and elements that can be rotated freely. For example, as to a valve which requires the indication of a rotating direction of the handle, the indication must be provided. Such an element can revolve around the system line 602 and the amount of this revolution is managed by the transformation matrix. For the arrangement of the part 603, two management modes are available: a management mode (fixed position mode) for managing the arrangement positions of parts 603 by coordinate values on a model space and a management mode (relative position mode) for managing the arrangement positions of parts 603 by positions relative to turning points (including the start and end point), that is, the ratio of the distance between the part and the preceding turning point to the distance between the part and the succeeding turning point. In the fixed position mode, the part 603 can be moved and rotated freely on the model space. In this case, the system line 602 can expand and contract like a rubber-band as the part 603 moves. In the relative position mode, the arrangement position of each part is calculated from the ratio of the distance between the part and the preceding turning point to the distance between the part and the succeeding turning point. This mode does not manage any fixed arrangement position. With this managing method, the part 603 can be moved while a turning point of the system line 602 is changed or deleted. In other words, the part 603 can move along a rubber-band as the system line 602 is changed in a rubber-band manner.

The following examples explain how the connection of system lines 602 is set. In this processing, the designer specifies a system line 602 which will be connected to another system line (by picking up the name of the system line or selecting the system line by a coordinate input means). A point cell 706 is generated from the position information of the point and added to the point set of the system line 602. Simultaneously, a connection cell 708004 is generated and the name of the system line to be connected is managed by the connection information. Another method is also available to generate a new system line 602. The designer picks a start or end point on the system line 602 to which a new system line is connected. A point cell 706 and a connection cell 708004 for the connection point are generated and connection information is automatically set.

For setting of a connection point 603 as well as in case of arrangement of parts 603, the fixed position mode and the relative position mode are available. It is also possible to move and rotate component 601 with the system line 602 displayed in the rubber-band manner. Since the component 601 is displayed in the dragging manner and at the same time the system line 602 is displayed in the rubber-band manner while the component 601 moves or revolves, the designer can change the arrangement position of the component 601 while monitoring how the system line 602 changes its shape. Change of information can be accomplished by updating the position information 709 of a point cell corresponding to the arrangement of the component 601. In the above processing, the designer can select a mode of the rubber-band displaying or a non-rubber-band displaying function and a mode of making a part 603 on the rubber-band visible or invisible. Accordingly, the designer can make the rubber-band and parts invisible temporarily to check the arrangement of components 601 and the system line 602. This makes user operations faster. Although the whole of the system design support processing 501 is explained above, any restriction is not put to the processing order and the processing can be carried out in any sequence.

(4) Component design support processing

The component design support processing 503 is basically general shape processing and can handle not only components 601 but also the all shapes of plan structures such as parts 603 and building bodies. This processing can also define symbols for components 601 and parts 603 in piping and instrument diagrams 502. Plant structure shapes are defined by combinations of elementary figures 801 illustrated in FIG. 8(1). The elementary figures 801 are loosely classified into four: point elements, line elements, surface elements, and solid elements. Point elements are points 801a. Line elements are straight line segments 801b, circles and ellipses (arcs) 801c, and curved lines 801d.

Figure 8:
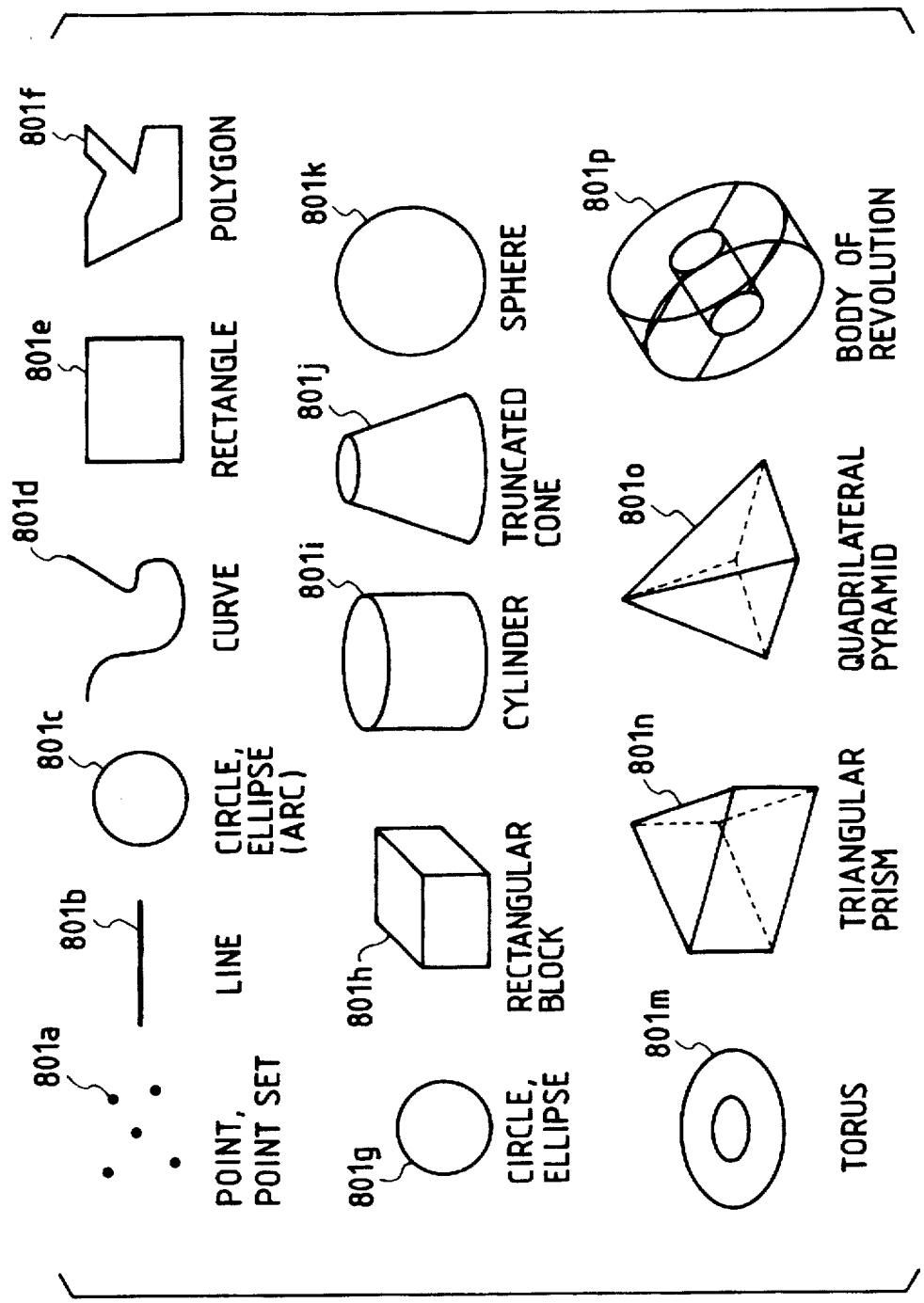
FIG. 8(1) is a list of elementary figures composing a component.
Figure 8:
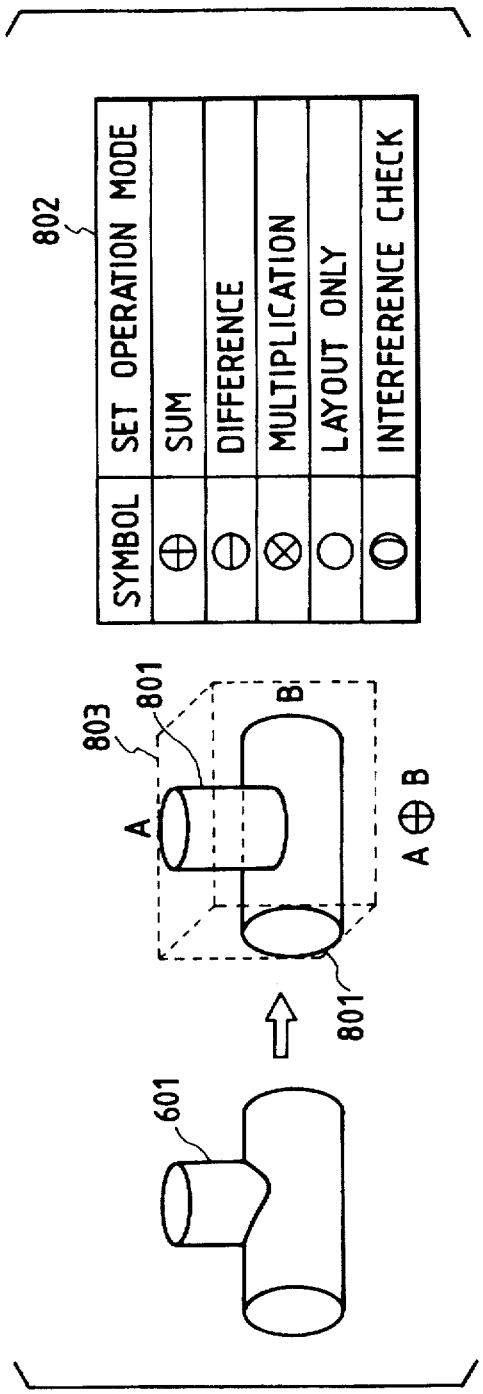
Figure 8:
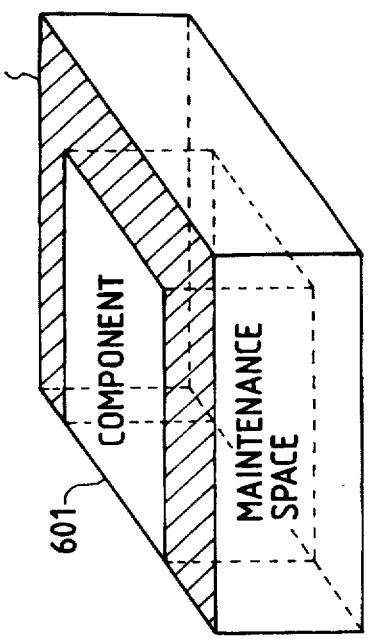
Figure 9:
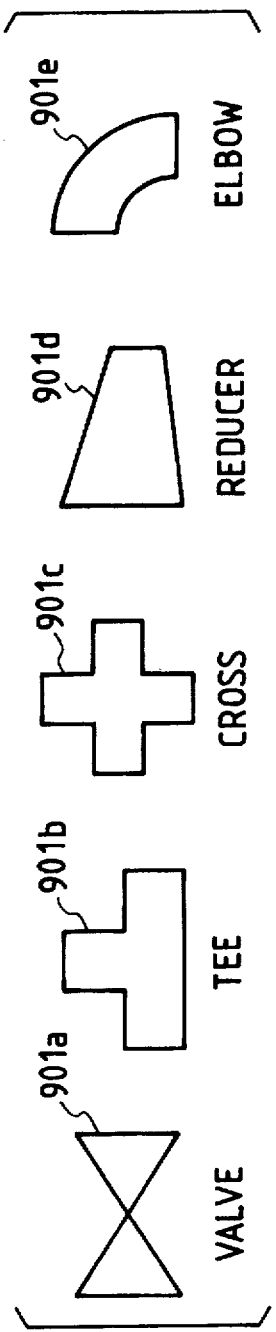
FIG. 9(1) is a list of symbol shapes.
Figure 9:
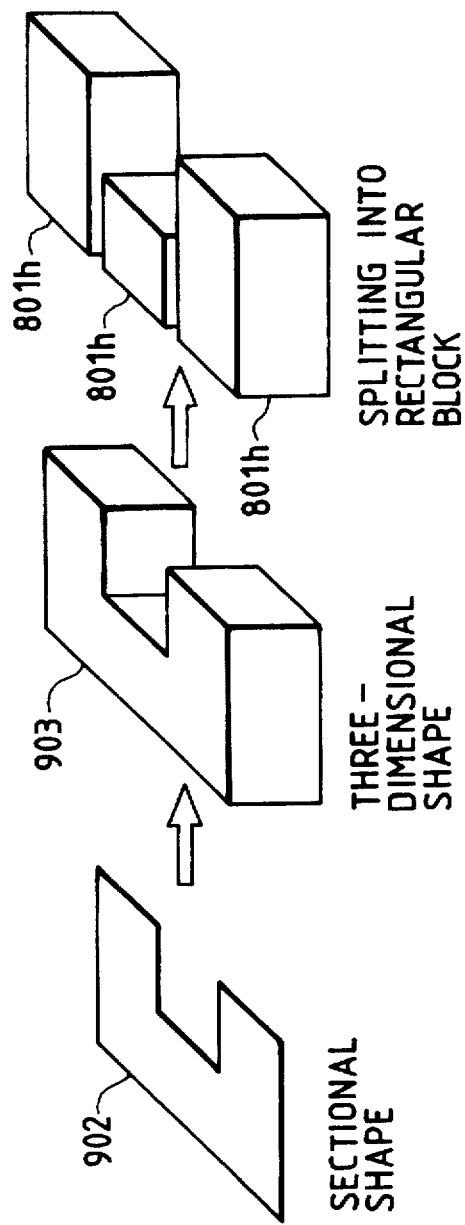

Surface elements are rectangles 801e, polygons 801f, and circles and ellipses 801g. Solid elements are rectangular body 801h, cylinders 801i, cones and truncated cones 801j, spheres 801k, torus 801m, and solids based upon two-dimensional shapes such as triangular prisms 801n, quadrilateral pyramids 801o, and revolution bodies 801p. Components 601 and parts 603 are described by combinations of elementary figures. The set construction modes 802 are available to combine elementary figures 801, as shown in FIG. 8(2). The set operation modes 802 can define addition, difference, and multiplication of elementary figures 801. The set operation modes also contains a mode of simply disposing elementary figures 801 and an interference check mode. The shape 803 for interference check describes a space or shape including no entity such as a maintenance space and it is referred to only for interference check. Further, in system designing and route designing, components 601 and parts 603 are frequently represented by symbols 901 shown in FIG. 9(1). Symbols to be used frequently such as valves 901a, tees 901b, crosses 901c, reducers 901d, and elbows 901e are registered as components 601 and parts 603 in advance. Furthermore, the component design support processing is designed so that building bodies may be input easily. FIG. 9(2) illustrates inputting of building bodies. The designer can input a three-dimensional shape 903 just by inputting a sectional shape (two-dimensional) 902 and a desired height. By dividing the three-dimensional shape into elementary figures 801, they can be managed as elementary figures 801.

Figure 10:
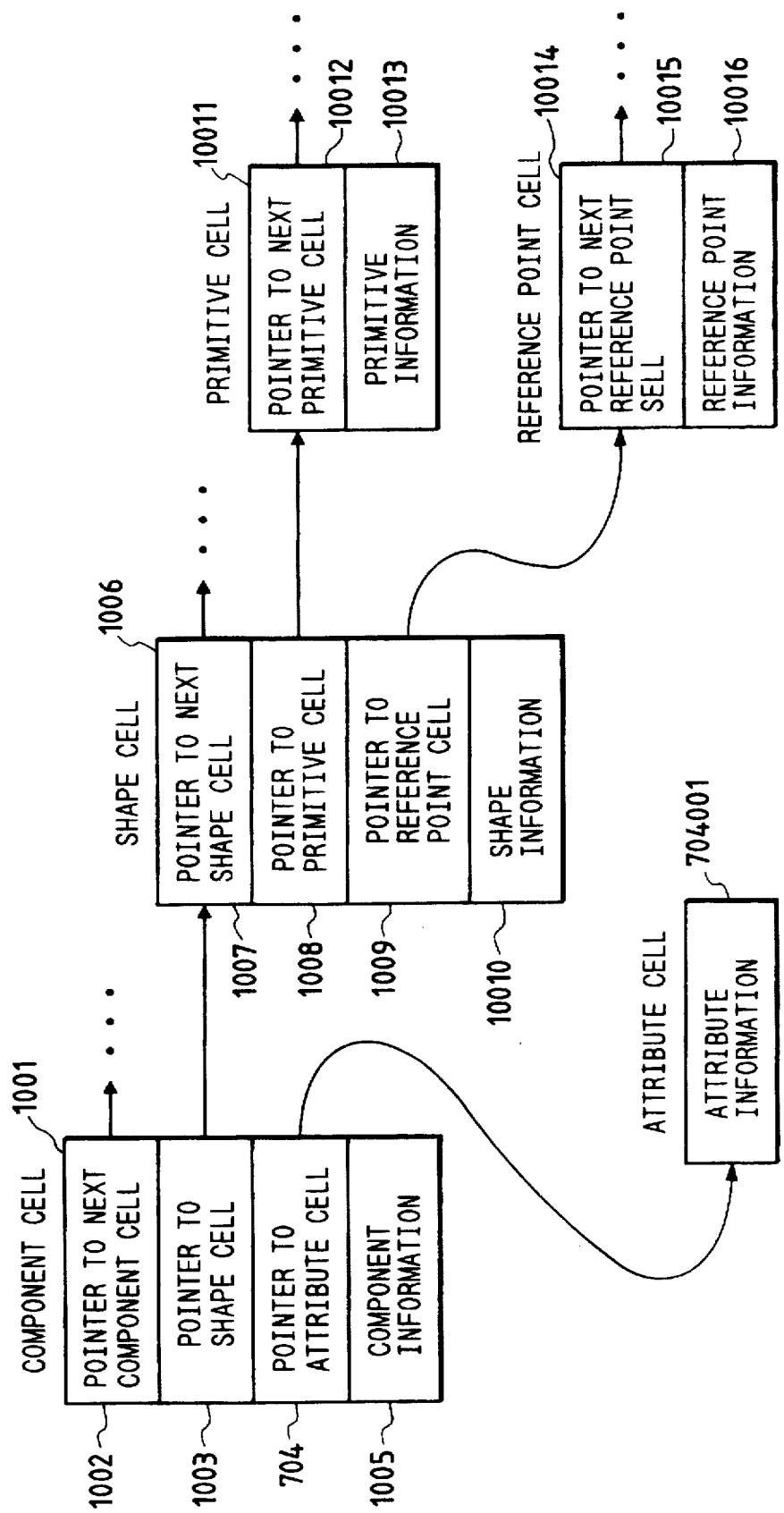
FIG. 10 is a block diagram explaining how component design information is managed.

FIG. 10 illustrates a method of managing component design information 504. An component cell 1001 can manage components 601, parts 603, and building bodies. The component information 1005 of the component cell manages the name of an object to be managed and an identification flag F (F=5 for description of components 601, F=6 for description of part 603, F=7 for description of a building body, or F=8 for description of the envelop shape of a building). The name of an object to be managed is a key for linkage with the arrangement information 7010 in FIG. 7 and with the drawing information 1805 (to be explained later in FIG. 18). The component cell 1001 manages a pointer 1002 to the next component cell 1001, a pointer 1003 to a shape cell 1006, and a pointer 704 to an attribute cell 70400. The shape cell 1006 manages a group of component shapes and contains a pointer 1007 to the next shape cell 1006, a pointer 1008 to a primitive cell 10011, a pointer 1009 to a reference point cell 10014, and shape information 10010 for management. The shape information 10010 contains an identification flag KF indicating whether the generated shape is a three-dimensional shape (KF=2) or symbol shape (KF=1). The system design information 502 generated by the system design support processing 501 uses components 601 and parts 603 as two-dimensional symbols 901.

As the component arrangement design support processing 507 and the routing design support processing 509 handle components 601 and parts 603 as three-dimensional shapes, the component design support processing 503 has a shape identification flag KF to describe both three-dimensional shapes and symbol shapes. This flag enables management of these shapes with the same cell structure. With this function, the actual space mapping processing 103 can convert symbol shapes of system design information 502 generated by the system design support processing 501 into three-dimensional shapes and display them on the screen. The primitive cell 10011 manages a pointer 10012 to the next primitive cell 10011 and primitive information 10013. The primitive information 10013 contains primitive parameters of elementary figures 801 constituting the component, the above-mentioned set construction modes 802, and positions and transformation matrixes of elementary figures 801 in the component coordinate system 1103 shown in FIG. 11(1), for management. It is required that nozzle points of components 601 which are start and end points of system lines 602 and routes 604 are managed. For this purpose, reference point cells 10014 are provided. A reference point cell 10014 consists of a pointer 10015 to the next reference point cell 10014 and reference point information 10016 for managing reference point coordinates (under the component coordinate system 1103).

To easily identify various similar shapes of parts 603, parameters are provided which treat sizes (diameter) of system lines 602 and routes 604 and surface-to-surface distances of parts 603. These shape changing parameters are managed by the arrangement information 7010 in a point cell 706. Processing of these parameters will be explained below using an example of a valve. The shape of a valve can be generated by registering a shape whose surface-to-surface distance and a distance perpendicular to a line connecting the surfaces are respectively 1 (basic dimensions) in advance as an elementary symbol 901 and by extending it in the direction intersecting the surface-to-surface direction (in the radial direction of a pipe). The shape of the symbol is determined by the surface-to-surface distance and the diameter of a pipe. The diameter (D) of a pipe can be searched from sectional shape dimensions of group information 705 in a group cell 701. The surface-to-surface distance should be input when a valve is laid out. The elementary symbol 901 is extended by B perpendicularly to the surfaces and by D in the radial direction. Elementary symbols 901 are managed by a shape cell 1006. Enlargement parameters D and B are managed as parameter information by the arrangement information 7010. Specifications of components 601, parts 603, building bodies, and envelope shapes of buildings are managed by attribute information of the attribute cell 704001.

(5) Building design support processing

Figure 11:
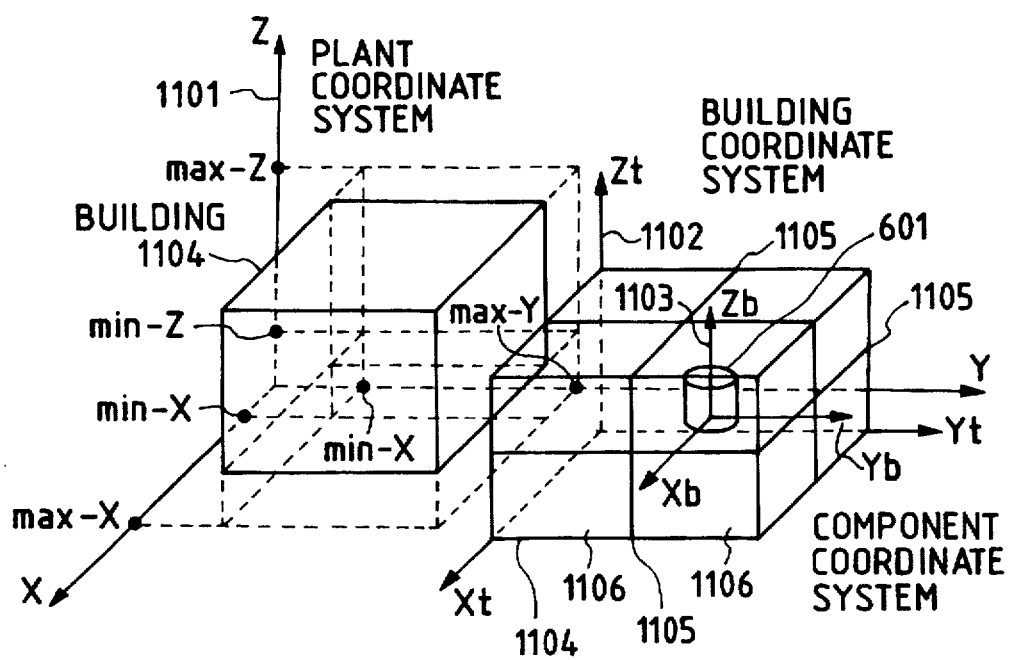
FIG. 11(1) shows how building information is related with the other information.
Figure 11:
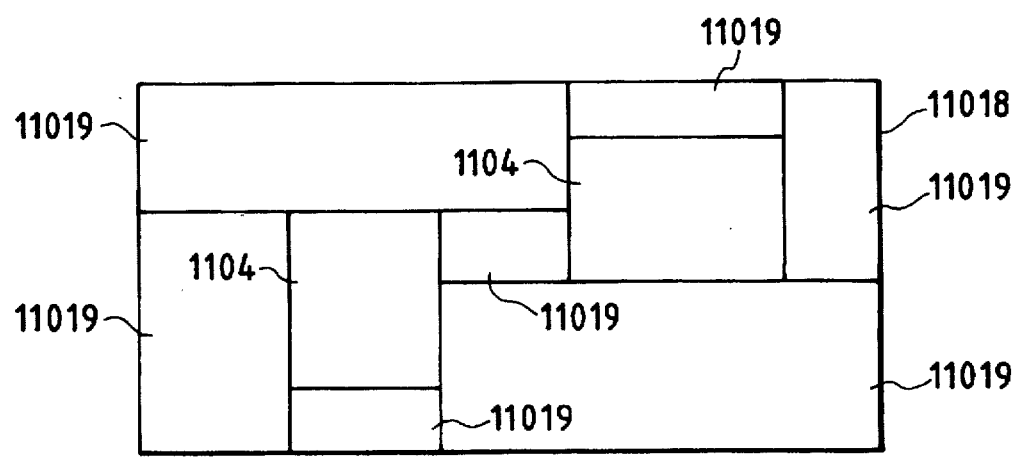
Figure 11:
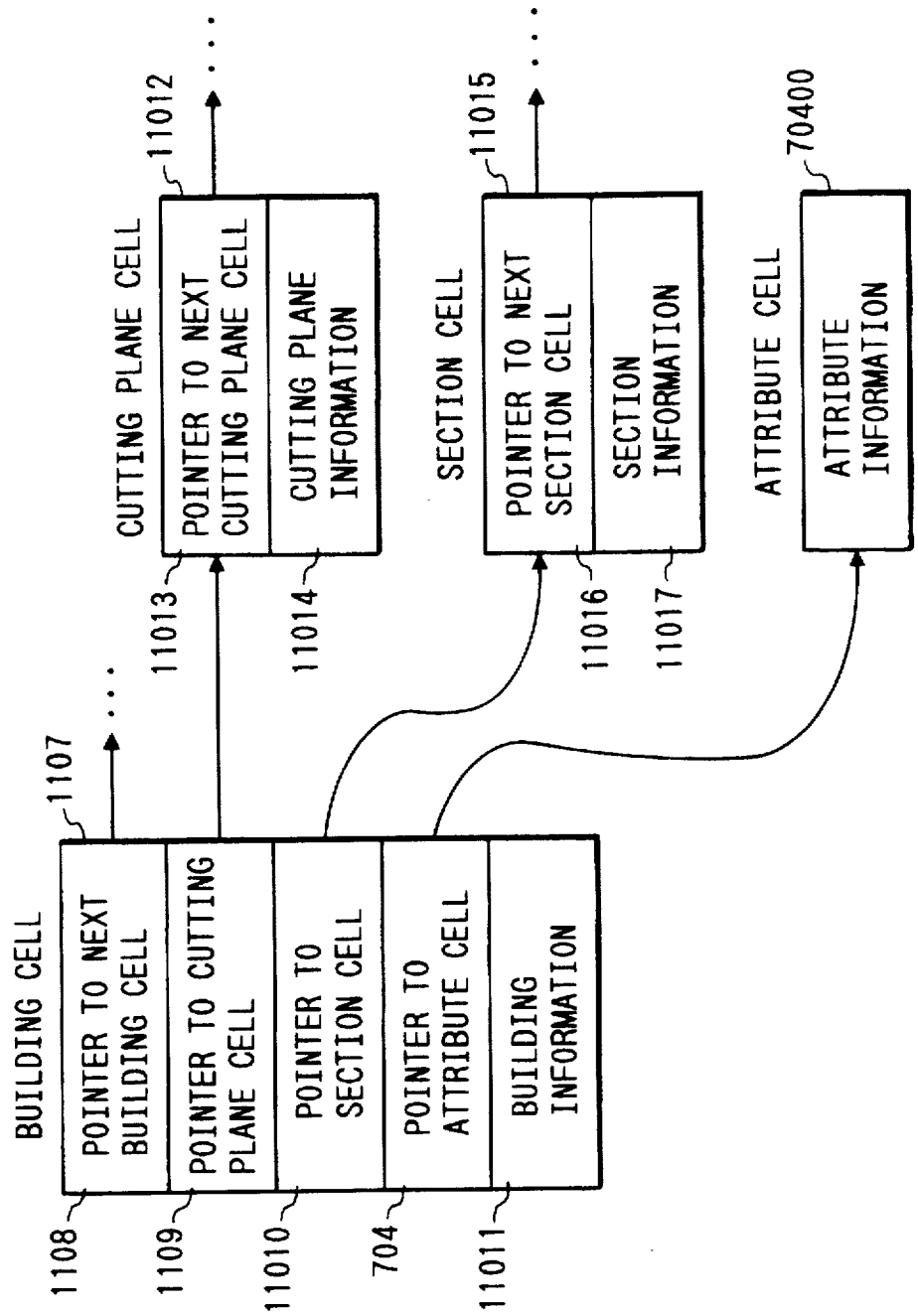

The building design support processing 505 supports designing of a building placed in the plant. In detail, this processing supports designing of the envelope shape of a building, the arrangement of a building, and building structural bodies. Design supporting of the envelope shape of a building and the arrangement of a building is similar to that of the component design support processing 503 and a building is described as a set of elementary figures 801. FIG. 11 (1) illustrates how building information is related with the other information. The building coordinate system 1102 is located on the basis of the plant coordinate system 1101 and the component coordinate system 1103 is located on the basis of the building coordinate system 1102. A building 1104 can be divided into sections by a plurality of cutting planes 1105. These planes are used as reference planes for component arrangement and routing design. With this, component arrangement and route designing can be carried out in sections 1106.

FIG. 11(2) illustrates the above relationship using a cell structure. A building cell consists of a pointer 1108 to the next building cell 1107, a pointer 1109 to a cutting plane cell 11012, a pointer 11010 to a section cell 11015, a pointer 704 to an attribute cell 70400, and building information 11011, for management. The building information 11011 manages the name of a plant, and the arrangement position and the transformation matrix of a building in the plant coordinate system. The cutting plane cell 11012 consists of a pointer 11013 to the next cutting plane cell 11012 and cutting plane information (coordinate values of cutting planes) 11014. The section cell 11015 consists of a pointer 11016 to the next section cell 11015 and section information (section size) 11017. The specification of a building is managed by attribute information of an attribute cell 70400. Furthermore, a space without any building is managed as one virtual building.

FIG. 11(3) illustrates the above relationship, describing that a building 1104 is located in the plant space 11018 and that a space without any building is managed as one virtual building. With this, a space without a building can be managed efficiently and used as a space in which components and routes can be laid out.

(6) Actual space mapping processing

Figure 12:
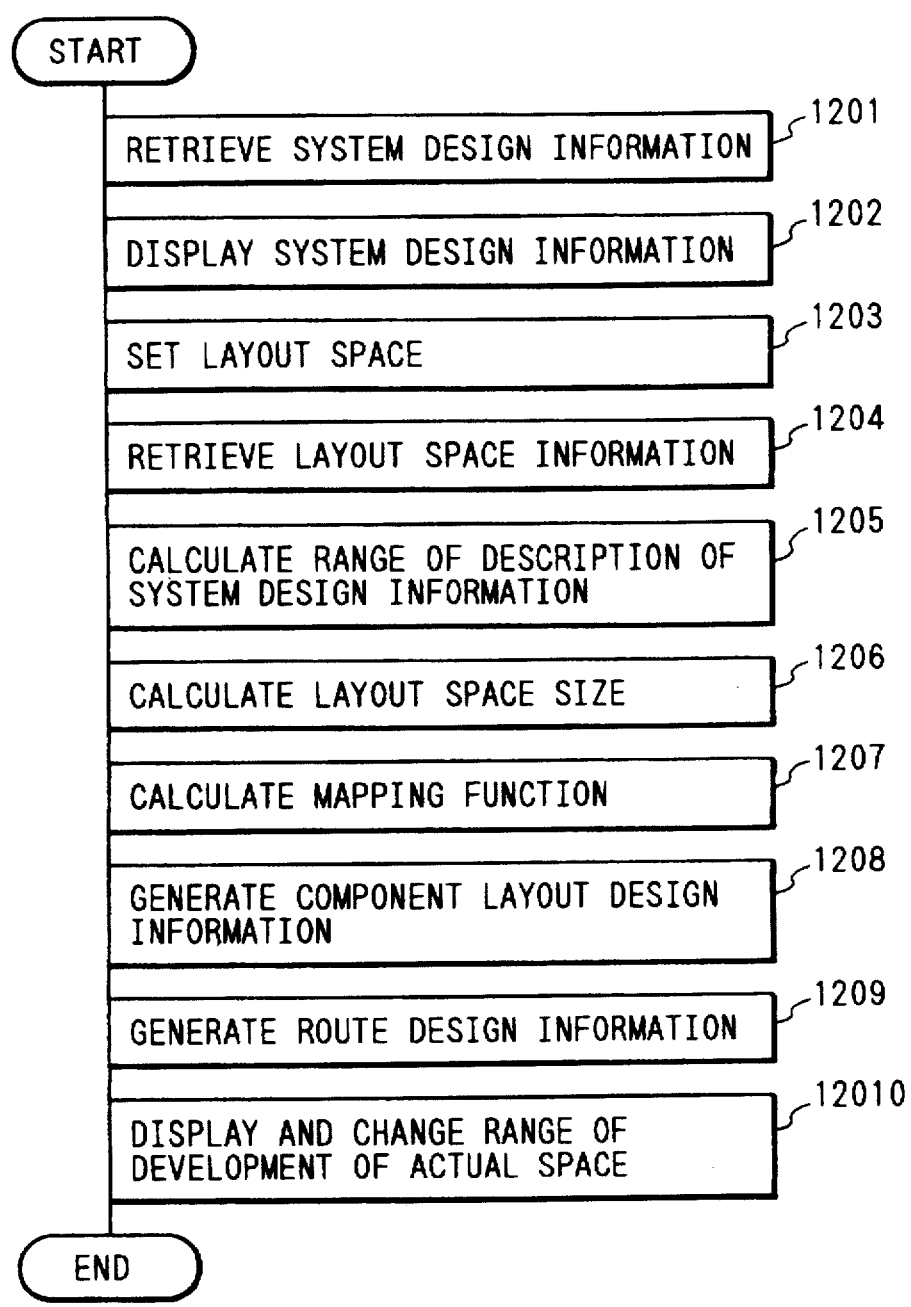
FIG. 12 is a detailed flow chart explaining actual space mapping processing.

The actual space mapping processing 103 maps two-dimensional logical connection information in a arrangement space 605 in which component arrangement and pipe routing are designed as shown in the step (2) of FIG. 6 to use system design information 502 as information to be input to the arrangement design support processing 507 and to the routing design support processing 509. FIG. 12 illustrates a basic configuration of the actual space mapping processing 103 for the system design information 502. The actual space mapping processing 103 consists of the processes of retrieving design information 1201, displaying design information 1202, setting a arrangement space 1203, retrieving arrangement space information 1204, calculating the range of description of system design information 1205, calculating a arrangement space size 1206, calculating a mapping function 1207, generating component arrangement design information 1208, generating route design information 1209, and displaying and changing the range of mapping in actual space 12010.

The step of retrieving system design information 1201 retrieves the database 107 in the memory for system design information 502 generated by the system design support processing 501. The step of displaying system design information 1202 displays the results of retrieval of system design information 502 in one window on the display screen. The step of setting a arrangement space 1203 sets the name of a building space in which system design information 502 is mapped as components 601 and routes 604. The step of retrieving arrangement space information 1204 retrieves the database 107 in the memory for building design information 506 according to the preset building name. The step of calculating the range of description of system design information 1205 calculates a two-dimensional area (min x≦x≦max x, min y≦y≦max y) which describes system line 602 according to system design information 502. The step of calculating a arrangement space size 1206 calculates a range of a space in which system lines 602 are designed as actual routes 604, that is, the space range of a building 1104 (min X≦X≦max X, min Y≦Y≦max Y, min Z≦Z≦max Z). The step of calculating a mapping function 1207 matches the range of the two-dimensional area calculated by the step of calculating the range of description of system design information 1205 with the range of a three-dimensional space obtained by the step of calculating a arrangement space size 1206. This step assumes the following mapping functions to convert point coordinates (x,y) of the two-dimensional area of system line 602 to point coordinates (X,Y,Z) of a three-dimensional space:

$$X = X0 + a*(x - x0)$$

$$Y = Y0 + b*(y - y0)$$

$$Z = \max Z$$

wherein $x0 = (\min x + \max x)/2$ $y0 = (\min y + \max y)/2$ $X0 = (\min X + \max X)/2$ $Y0 = (\min Y + \max Y)/2$ $a = (\max X - \min X)/(\max x - \min x)$ $b = (\max Y - \min Y)/(\max y - \min y)$ The above mapping function is only an example in the present invention and the mapping function is not restricted to the example. The value of Z can be in the range of min $Z \leq Z \leq \max Z$. The enlargement coefficients "a" and "b" can be any values in the actual space. If the system design information is complicated and system lines 602 are crowded, they can be simplified by hierarchically displaying respective independent system line 602 (for every set of independent lines) by varying the value of Z. The step of generating component arrangement design information 1208 maps arrangement information of components 601 generated by the system design support processing 501 in the actual space in which the components 601 are actually laid out and presents the results as an initial component arrangement design plan. The arrangement information of components 601 generated by the system design support processing 501 is retrieved. And, since the identification flag (F) in the group information 705 of the group cell 701 is 1, the processing 1208 copies the cell structures from the group cell 701 to generate another identical group cell, changes the value of the identification flag (F) in the group information of the copied group cell 701 to F=3, and changes the arrangements to the arrangement of components 601 in the actual space. Further, this processing 1208 operates a mapping function on the position information 709 of the point cell 706 and converts the coordinates of the positions to ones mapped into the actual space. Furthermore, this processing 1208 converts the transformation matrix for managing the attitude of components 601 of the arrangement information 7010 in the point cell 706 in the two-dimensional space to one in the three-dimensional space. For example, the following two-dimensional matrix is treated:

$$(a11, a12)$$
$$(a21, a22)$$

This processing 1208 converts the above matrix into a three-dimensional matrix as shown below.

$$(a11, a12, 0)$$
$$(a21, a22, 0)$$
$$(0, 0, 1)$$

If a three-dimensional shape of the component 601 is described in this stage, the display of the component 601 is automatically converted to the three-dimensional shape. As already explained in the component design support processing 503, the designer can select a symbol shape or a three-dimensional shape to describe the component in the component cell 1001. The selection of the shape displaying can be controlled by the display flag (DF) in the arrangement information 7010 of the point cell 706. Accordingly, the value is changed to DF=2.

The step of generating pipe routing design information 1209 automatically maps information of the generated system line 602 in the actual space in which the system line 602 is laid actually as a route 604 and presents it as an initial route design plan. Information of the system line 602 generated by the system design support processing 501 is retrieved. And, since the identification flag (F) in the group information 705 of the group cell 701 is 2, the processing 1209 copies the cell structures from the group cell 701 to generate another identical group cell, changes the value of the identification flag (F) in the group information of the copied group cell 701 to F=4, and changes to the information of route 604 in the actual space. Further as well as in the case of components 601, this processing 1209 operates a mapping function on position information 709 of the point cell 706 and converts the coordinates of the positions to ones mapped into the actual space. Furthermore, this processing 1209 converts the transformation matrix for representing the attitude of part 603 managed by arrangement information 7010 of the point cell 706 in the two-dimensional space to one in the three-dimensional space. A conversion method in processing 1209 is similar to that in processing 1208 of components 601. In case that the identification flag (F) in the group information 705 of the group cell 701 is a value of 4, the sectional shape of the route 604 must be specified. As for a piping, the diameter of a pipe is already determined as the specification of the system line 602 in the system design support processing. Therefore, the sectional shape of the route 604 is retrieved according to the attribute information of the attribute cell 70400 and automatically set.

If a three-dimensional shape of the part 603 is already generated in this stage, it can be automatically converted from a symbol shape to a three-dimensional shape. The designer has only to change the value of the display flag in the arrangement information 7010 of the point cell 706 to DF=2 as well as in the case of the components 601. The sizes and surface-to-surface distances of the route 604 can be managed as parameter information by the arrangement information 7010 of the point cell 706. The size of the part 603 on the route 604 can be automatically determined and displayed as an actual three-dimensional shape. This processing method is the same as the two-dimensional parameter processing explained in the component design support processing 503 but the three-dimensional processing has more parameters. In case of a valve, the dimension of the valve in the direction of the handle must be set. These settings and changes are performed by the routing design support processing 509. In some cases, parts 603 interfere with each other when they are represented in actual sizes. In such a case, the display scale of the arrangement information 7010 in the point cell 706 is used for adjustment. The display scale usually is 1. The designer checks whether the parts 603 interfere with each other or whether the parts 603 exceed the turning point of the route 604 according to the arrangement positions and surface-to-surface distances of parts 603 on the route 604. If the parts 603 interfere with each other, the designer must determine the display scale of each part so that the parts may not interfere with each other. If the part interferes with a turning point of the route 604 (or exceeds the turning point the on-screen), the designer must determine the display scale of the part 603 so that the part may not exceed the turning point. It is easy to distinguish parts whose display scale is 1 from parts whose display scale is not 1 by changing their colors and line types. Further, a function is provided to set the display scales of parts back to 1. With this function, the designer can easily check the actual part arrangement and eliminate unwanted interference of parts. The step of displaying and changing the range of mapping in the actual space 12010 deletes the mapped part of information input for the component arrangement design support processing 507 or for the routing design support processing 509 from the system design information 502 or changes the colors or line types of parts. With this processing, the designer can know which part of the system design information 502 has been mapped. Provision of such actual space mapping processing 103 enables unified treatment of design information of different dimensions, easy and smooth transfer of information from upper-stream of designing to lower-stream of designing, prevention of missing and errors in the stage of transferring design and production information, and support of highly reliable design and production activities.

(7) Component arrangement design support processing

The component arrangement design support processing 507 substantially checks the initial component arrangement design plan generated by the actual space mapping processing 103 as illustrated in the step (2) of FIG. 6 for the efficiency of use of a three-dimensional space and arranges the components 601 generated by the component design support processing 503 as illustrated in the step (3) of FIG. 6 in the actual space. Although the component 601 is represented by symbol shapes 901 in system design information 502, the shape of the component 601 can be automatically converted into three-dimensional shapes in this stage as illustrated in the step (2) of FIG. 6. This can be accomplished by changing the value of the display flag DF to 2. Similarly, the shapes of parts 603 can be automatically converted to three-dimensional shapes. In this status, the designer displays a plurality of drawings (plan and isometric view) via the I/O interface 105 and determines the position and attitude of each component 601 while monitoring the arrangement of components 601 on the screen with reference to the drawings. In this processing, the coordinate system of each drawing is one-to-one related to the coordinate system of a coordinate input means as well as in the case of laying out components 601 by the system design support processing 501 and thereby the designer can input optional coordinate values continuously on the drawings (in the dragging manner). It is also possible to determine the position and attitude of each component 601 by redisplaying the three-dimensional shape of the component 601 when it moves or rotates. With a three-dimensional coordinate input means, the designer can directly input three-dimensional coordinate values and three directions indicating component attitude and thereby the design can easily determine the arrangement and attitude of components 601.

The attitude of components 601 can be easily determined by relating the three-dimensional coordinate values and the two directions indicating component attitude input from the three-dimensional input means respectively to X, Y and Z axes of the component coordinate system. In case of a two-dimensional coordinate input means, the input values must be converted into three-dimensional coordinate values. For movement of components 601, the coordinates of a point at which a straight line passing through an input two-dimensional point and perpendicular to the display screen (a drawing) intersects a plane including the current position of the central point or components 601 in the arrangement space and parallel to the screen (a drawing) is used as three-dimensional coordinate values. In rotation of component 601, the amount of rotation of the component 601 is calculated from an angle between the horizontal line on the screen and a line connecting the arrangement position of the component 601, and the three-dimensional coordinate values. By using an angle mesh (a radial mesh whose lines extending radially from the arrangement position of the component 601 are angled at preset intervals), the designer can easily change the attitude of the body of the component 601 to a predetermined angle position, to a perpendicular position, or to a horizontal position.

A rubber-banding function is provided which displays the shape of a route 604 connecting a plurality of components 601 in a rubber-band manner. Accordingly, the designer can arrange components 601 considering the length of a route 604 connecting a plurality of components 601. Rubber-banding of a route 604 can be accomplished by redisplaying only the shape of the route 604 which varies as the component 601 moves and rotates. In this processing, the designer can select a mode of cancelling a turning point of the route 604 and thereby can display a part connecting the start and end point of the component 601 with a straight line. As the component 601 moves around, the rubber-band also expands and contracts. Simultaneously, the parts 603 on the route 604 move together with the rubber-banding of the route.

As already explained in the system design support processing, only parts 603 in the relative position mode can be moved. In the above processing, the designer can select a mode of enabling or disabling the rubber-band function and a mode of making a part 603 on the rubber-band visible or invisible. Accordingly, the designer can make the rubber-band and parts invisible temporarily to check the arrangement of components 601. This makes user operations faster. This processing 507 can perform interference check on any part at any timing in optimum arrangement designing. Furthermore, this processing enables addition of supplemental information such as dimensions, annotations, comments, etc. to complete the component arrangement design information 508.

(8) Routing design support processing

Figure 13:
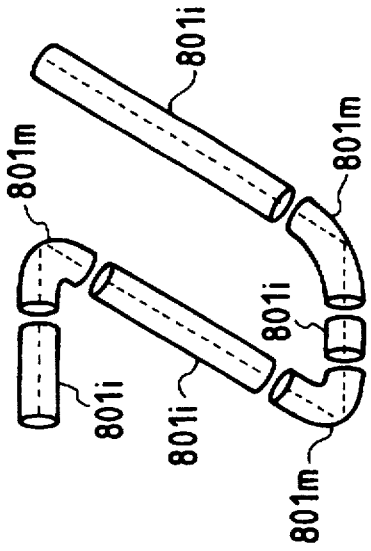
FIG. 13(1) shows a mode of representing routes with line elements.
Figure 13:
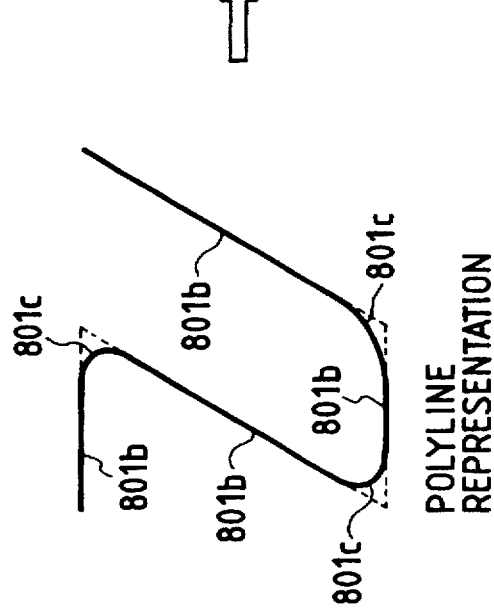

The routing design support processing 509 is a processing for detailing the shape of the route 604 as shown from the step (3) to the step (4) of FIG. 6. This processing 509 determines the shapes of the routes 604 or the turning points (including the start and end point) of the route 604, the arrangement position of parts 603, and branching points to another routes 604, by considering the efficiency of use of the actual space according to the initial route design plan mapped in the actual space by the actual space mapping processing 103 as illustrated in the step (3) of FIG. 6. Although parts 603 are represented with symbol shapes in the steps (3) and (4) of FIG. 6, they can be represented with three-dimensional shapes as well as in the case of components 601. Part representation with symbol shapes, however, is faster and more efficient than part representation with three-dimensional shapes. The description of the route 604 is the same as that of system line 602 in FIG. 7 except that the coordinates of the start and end point, and turning points are three-dimensional. There are two modes of representing the routes 604 from point series information as illustrated in FIG. 13 (1) and FIG. 13 (2): a mode of representing routes with line elements (that is, elementary FIG. 801) and a mode of representing routes by automatically converting the route shape by using the rout sectional shape to three-dimensional solid elements.

A rubber band function is provided to represent line elements. With this function, the designer can change the shape of route 604 by picking up a part of the route by a coordinate input means and dragging it like the rubber-band. The rubber-band processing is basically the same as designing of the system lines 602 by the system design support processing 501. However, changing the shape of the route 604 which uses three-dimensional coordinate values is more complicated. Therefore, it is basically recommended to use a plurality of drawings to change the shape of routes 604. The coordinate system for the coordinate input means is one-to-one related to the coordinate system for each drawing on the display screen via the I/O interface and the designer can input coordinate values of desired points on the drawings continuously (in the dragging manner). The designer can change the shape of the route 604 by picking up the shape of the route 604 on the drawing, moving a turning point, and generating new turning points. The shape of the route can be displayed in a rubber-band manner by displaying the shape of the route 604 as the turning point moves. When the coordinate input means is a three-dimensional input means, the input coordinate values can be used directly and the designer can input three-dimensional coordinate values directly using any drawing and specify the desired three-dimensional position of the turning point. When the coordinate input means is a two-dimensional input means, the coordinates of a point at which a straight line passing through an input two-dimensional point and perpendicular to the display screen (a drawing) intersects a plane including the central point of a space in which the route 604 is laid or a turning point to be changed is used as three-dimensional coordinate values. To change the route shape perpendicularly to a drawing, another drawing perpendicular to the drawing displayed on the screen is used. In this processing, parts 603 in the relative position mode on the route 604 move as the route expands and contracts like the rubber-band. The above processing has a mode of making a part 603 on the rubber-band visible or invisible. Accordingly, the designer can make the rubber-band and parts invisible temporarily to check the change of the shape of the route 604. This makes user operations faster.

The sequence of laying out parts 603 on the routes 604 is basically determined by the initial design plan 606 (system design information 502). The designer can re-display the shape of the part 603 (in the dragging manner) continuously by picking up an object part on the route 604 and specifying its destination position by the coordinate input means and thereby the designer can easily determine the optimum arrangement position of the part 603. When the coordinate input means is a two-dimensional input means, the coordinates of a point at which a straight line passing through an input two-dimensional point and perpendicular to the display screen (a drawing) intersects a plane including the arrangement position of the part 603 and parallel to the screen (a drawing) is used as three-dimensional coordinate values. To limit the arrangement position of a part 603 to on the route 604, a foot point having the shortest perpendicular from the input part position to the rout 604 is used as the arrangement position of the part 603. For arrangement of the part 603, a function for setting a point apart from a turning point by the designated distance is provided to indicate a correct distance. Similarly, the optimum attitude of the part 603 can be easily determined by using a drawing (projection drawing) which explains the attitude of the part 603 in detail and calculating the amount of rotation of the part 603 by obtaining the angle between the horizontal line on the screen and a line segment connecting the arrangement position of the part 603 and the input coordinate values. By using an angle mesh (a radial mesh whose lines extending radially from the arrangement position of the part 603 are angled at preset intervals and perpendicular to the route 604), the designer can easily change the attitude of the part 603 to a predetermined angle position, to a perpendicular position, or to a horizontal position. Furthermore, this processing has modes to enable and disable change of sequence of disposing the parts 603 on the route 604, deletion of parts from the route 604, and insertion of a new part 603. The designer can check the arrangement of parts 603 on the route 604 while changing the modes.

A mode of disabling change of sequence of disposing parts 603 on the route 604, deletion of parts from the route, and insertion of a new part is to strictly keep the arrangement of parts 603 in the system design stage and the designer cannot change the arrangement of parts in the route design stage. To change the arrangement of parts, the designer must go back to the system design stage and change the system design information. This is very time-consuming and troublesome, but this mode is essential to keep data consistency. Contrarily, for cases which does not require such strict data consistency, a mode is provided to enable change of arrangement of parts in the route design stage. It is also possible to automatically round the turning point of the route 604 by specifying the bend radius of the route 604. The shape of the route 604 which is designed as explained above can be represented by line elements and solid elements as illustrated in FIG. 13(1) and FIG. 13(2). The three-dimensional representation of the route 604 (FIG. 13 (2)) is automatically accomplished using elementary figures from line elements of the route 604 and sectional shapes in the group information 705 of the group cell 701. This method is helpful to make data compact because the route shapes need not be managed using elementary figures 801. Furthermore, this method enables the following: interference check of desired parts at any timing in optimum arrangement designing, addition of supplemental information such as dimensions, annotations and comments for completion of a route design plan, and generation of a composite drawing which integrates piping, air conditioning ducts and cable trays.

(9) Construction mapping processing

Figure 14:
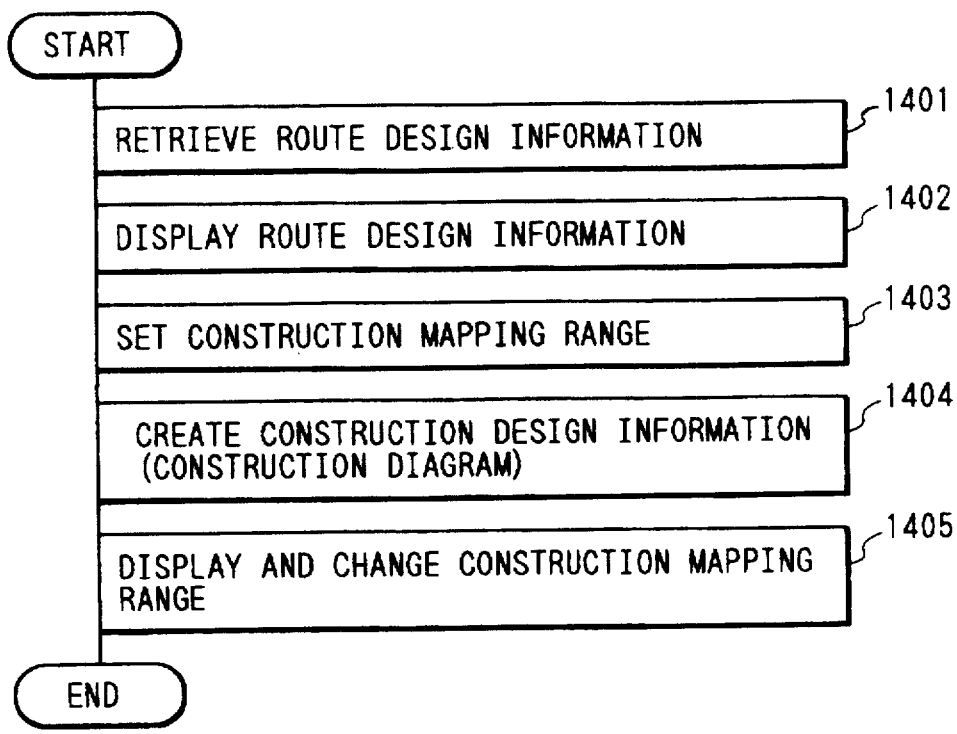
FIG. 14 is a detailed flow chart explaining construction mapping processing.
Figure 16:
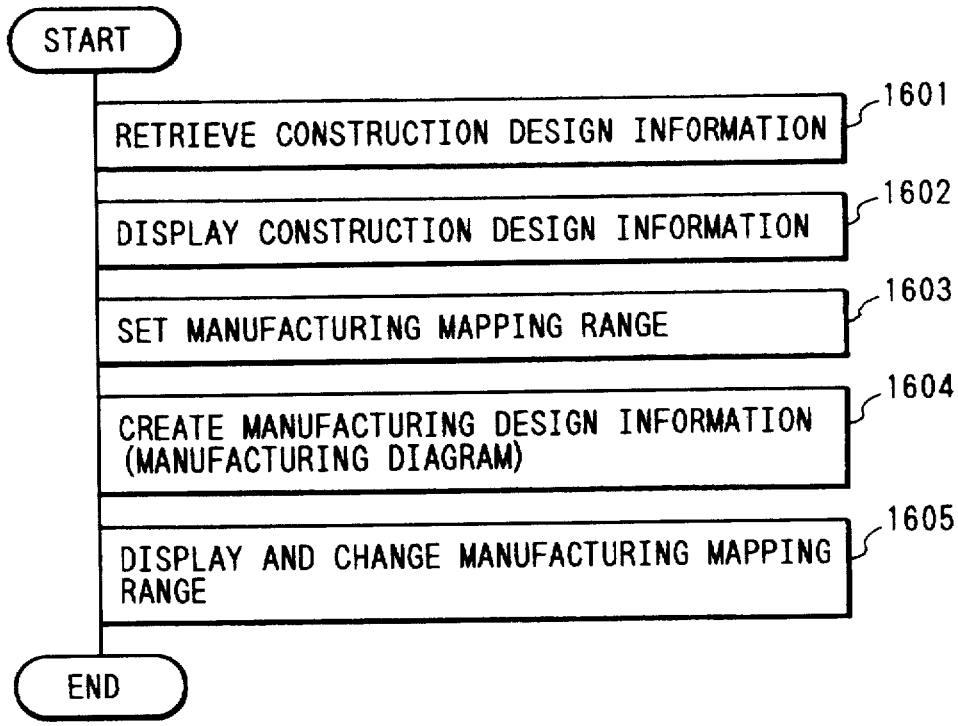
FIG. 16 is a detailed flow chart explaining the manufacturing mapping processing.
Figure 15:
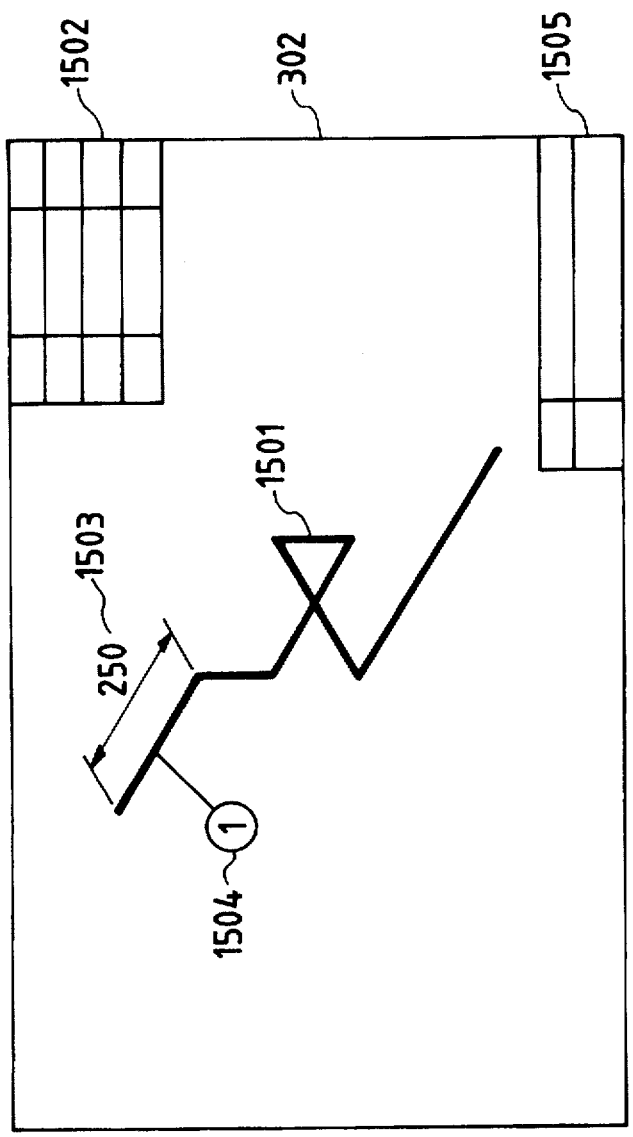
FIG. 15 is an assembly drawing.

The construction mapping processing 301 as shown in the step (5) of FIG. 6 automatically generates the initial state of construction design information 302 from the route design information 510 generated by the route design support processing 509 by specifying the range of construction. As illustrated in FIG. 14, the construction mapping processing consists of retrieving the routing design information 1401, displaying the routing design information 1402, setting a range of construction mapping 1403, generating construction design information 1404, and changing the display range of construction mapping 1405. The step of retrieving the routing design information 1401 retrieves the database 107 in the memory for the routing design information 510 of a route to undergo the construction mapping. The step of displaying the routing design information 1402 displays the retrieved route design information 510 on the display screen via the I/O interface 105. The step of setting a range of the construction mapping 1403 specifies a range of the construction mapping from the routing design information 510. There are two methods of specifying the range of construction mapping: specifying the range by the size of a space and specifying the range on the route 604. The method of specifying a range by the size of a space consists of selecting a plurality of drawings, specifying a rectangular area in each drawing, and retrieving route information which is included in common in all selected drawings. The method of specifying a range on the route 604 consists of picking up two desired points on the route 604.

As for the range of the construction mapping, the name of an assembly drawing is managed by the arrangement information 7010 of a point cell 709 describing the route 604 so that the designer can know which part is mapped into which construction design information 302. The assembly drawing names are given serial numbers automatically in the order they are mapped. They are also used as the names of the construction design information 302. The step of generating the construction design information 1404 automatically maps the mapped range in the construction design information 302. The construction range is automatically converted into isometric projection data 1501 and it can be used as a drawing. The step of changing the display range of the construction mapping 1405 changes the display of the mapped part in the route design information 510. The step (5) of FIG. 6 shows the range of the construction mapping of the route 604, making the specified range invisible in the route design screen. Accordingly, the designer can easily read which range has been mapped. This can prevent unwanted duplication and missing of construction and thereby accomplish highly reliable design supporting. The example illustrated in the step (5) of FIG. 6 employs a method of deleting the range of the mapped route but the method can be replaced by a method of changing the colors and types of routes. Which part is mapped in which construction design information 302 is managed by a point cell 706 under a group cell 701 of the route 604. The designer can easily make a desired part invisible and change colors or line types the on-screen.

(10) Construction design support processing

The construction design support processing 511 adds construction information to the construction range generated by the construction mapping processing 301 and generates construction design information 302 illustrated in the step (6) of FIG. 6. This processing 511 cuts out the predetermined lengths of the cut-out construction range, sets welding points, etc., divides them into parts (manufacturing units) which can be manufactured in factories, and assigns serial numbers to respective parts 603. This processing stage expands the range of parts 603 so that the route components manufactured in factories may also be treated as parts 603. The welding points are further divided into points to be welded on the spot and points to be welded in factories. Furthermore, this processing can automatically scale up extremely small objects or down extremely big objects among projection data 1501 so that they may be legible. The automatic scaling function calculates the length of a displayed line segment of the mapped route 604, compares its display ratio with the preset standard ratio (to the drawing size), and enlarges the display line segment if the ratio is smaller or reduces the display line segment if the ratio is greater so that the ratio may be equal to the standard ratio. The scaling-up and scaling-down ratios are managed by using the arrangement information 7010 in the point cell 706 under the group cell 701 of the route 604. Further, this processing summarizes the specifications of the parts 603 to be prepared, generates a parts table 1502, and writes it on the drawing. The parts table 1502 contains parts numbers, parts names, materials, dimensions, quantities and remarks. The parts numbers are the above serial numbers and the parts names are taken from component information 1005 of the component cell 1001. The material of parts 603 are described as parts specifications and taken from the attribute cell 70400 under the component cell 1001. The parts dimensions are taken from shape parameters in the primitive information 10013 of the primitive cell 10011. The number of parts in one drawing can be obtained by counting the number of identical parts in the construction drawing. The parts table 1502 can be generated automatically. Comments and annotations, if necessary, can be interactively described in the remarks fields. Further, the dimensions 1503, the part numbers 1504, and the drawing names 1505 are described to complete the construction design information 302.

(11) Manufacturing mapping processing

Figure 17:
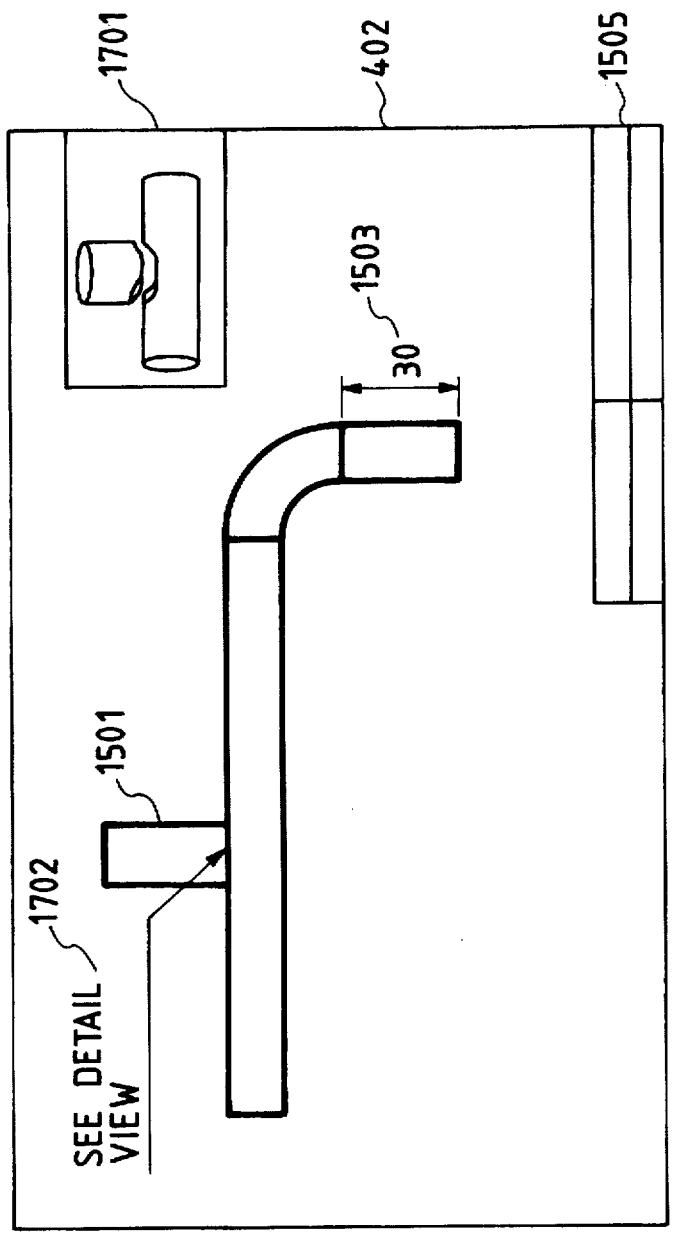
FIG. 17 is a prefabricated drawing diagram.

The manufacturing mapping processing 401 automatically generates the initial state of manufacturing design information 402 by specifying the range of manufacturing in factories from the construction design information as illustrated in the step (7) of FIG. 6. The manufacturing mapping processing 401 consists of retrieving the construction design information 1601, the displaying the construction design information 1602, setting the range of manufacturing mapping 1603, generating manufacturing design information (manufacturing diagram) 1604, and changing the display range of the manufacturing mapping 1605. The step of retrieving the construction design information 1601 retrieves the database 107 in the memory for the construction design information 302 to undergo the manufacturing mapping. The step of displaying the construction design information 1602 displays the retrieved construction design information 302 on the display screen via the I/O interface 105. The step of setting the range of the manufacturing mapping 1603 specifies the range of manufacturing mapping from the construction design information 302. The range (parts) of manufacturing can be specified by picking up the range on the route 604 by the coordinate input means. As for the range of manufacturing mapping, the name of a prefabricated drawing is managed by the arrangement information 7010 of the point cell 706 under the group cell 701 describing the route 604. It also manages which part is mapped in which manufacturing design information 402. The name of a manufacturing drawing is automatically assigned a serial number in the order of mapping and also used as the name of the manufacturing design information 402. The step of generating the manufacturing design information 1604 automatically maps the mapped range in the manufacturing design information 402 as illustrated in FIG. 17. The manufacturing range is automatically converted into projection data 1501 such as a front view, a plan view and a side view and can be displayed as drawings.

The step of changing the display range of the manufacturing mapping 1605 changes the display of the mapped part of the construction design information 302. An example illustrated in the step (7) of FIG. 6 shows a part 603 to undergo the manufacturing mapping and that the specified part 603 is rendered invisible in the construction design information 302. Accordingly, the designer can easily read which part has been mapped for manufacturing. This can prevent unwanted duplication and missing of construction and thereby accomplish highly reliable design supporting. The example illustrated in the step (7) of FIG. 6 employs a method of deleting a mapped part 603 but the method can be replaced by a method of changing the colors and types of lines. Which part is mapped in which manufacturing design information 402 is managed by using a point cell 706 under a group cell 701 of the route 604. The designer can easily make a desired part invisible and change colors or line types the on-screen.

(12) Manufacturing design support processing

The manufacturing design support processing 5012 adds manufacturing information to the manufacturing range generated by the manufacturing mapping processing 401 and generates manufacturing design information 402 in the step (8) of FIG. 6. This processing adds working information such welding parts to the cut-out manufacturing range. Typical welding methods are butt welding and face-fed welding. These welding shapes are registered in advance as a plurality of patterns 1701, selected by welding codes and displayed on the screen. The method of generating the welding shape patterns is the same as the method of generating the shapes of components 601 and parts 603. The patterns are described as a set of elementary figures 801. This processing can set the size of a sectional shape of a route 604 as a parameter and can display a pattern fit for the actual route shape. Further, NC information for manufacturing can be generated simultaneously only by inputting the diameter of a pipe. This can be accomplished by providing a program for generating NC information into which pipe sizes are input in advance. This processing can automatically scale up extremely small objects and scale down extremely great objects in the projection data 1501, if necessary, so that they may be visible. The automatic scaling-up and down method is the same as that explained in the construction design support processing 5011. Further, dimensions 1503, annotations 1702, and drawing names 1505 are described to complete manufacturing design information 402.

(13) Management of drawing information

Figure 18:
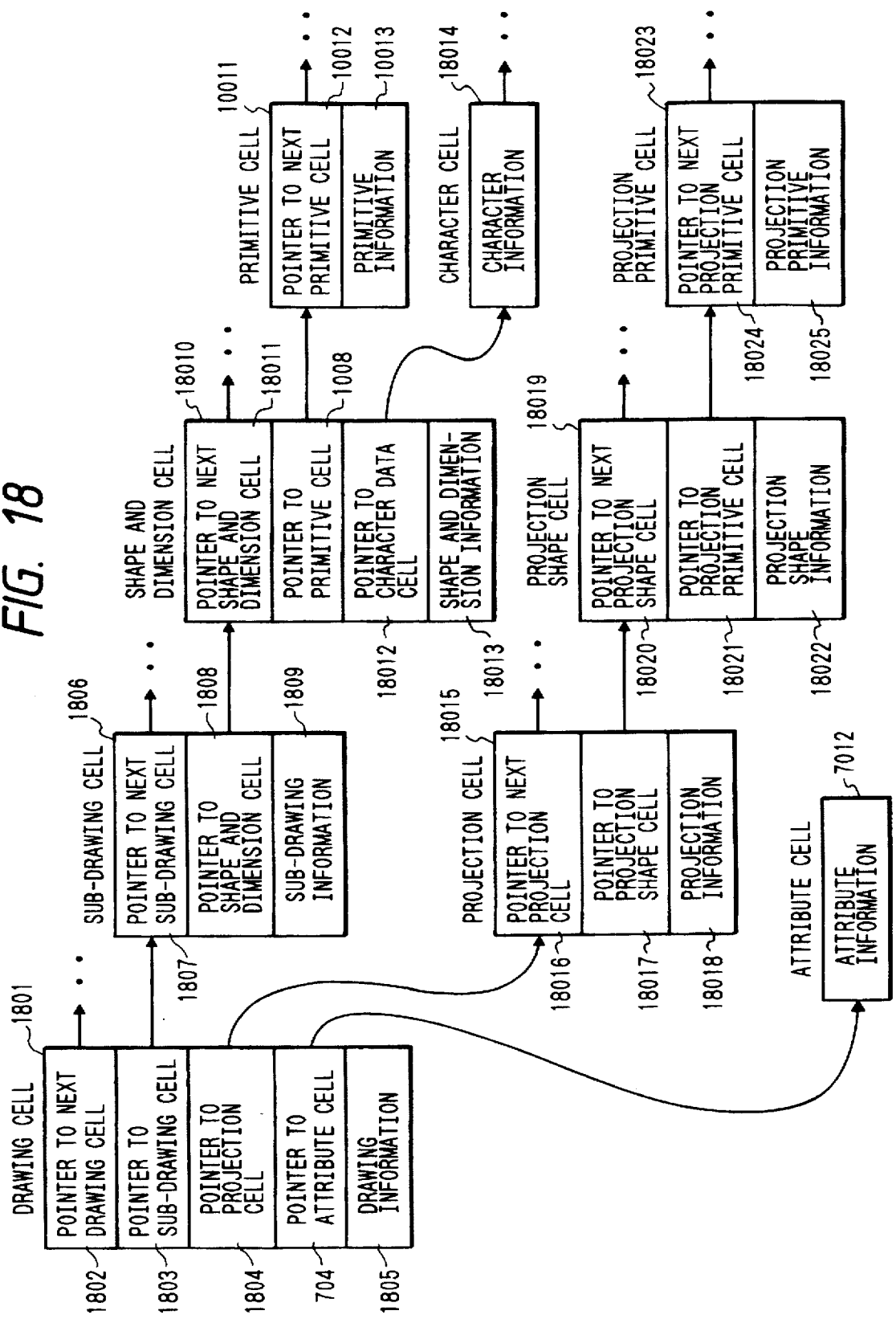
FIG. 18 is a block diagram explaining how drawing information is managed.

FIG. 18 illustrates how the above-mentioned drawing information is managed. Drawing information is generated in the related design stage as shown below. The system design information 502 is generated in the system design stage and the building design information (building plan, and building body drawing which are building drawing) 506 is generated in the building design information. The component arrangement design information (plot plan) 508 is generated in the component arrangement design stage. The routing design information (pipe plan, air conditioning duct plan, and cable tray plan which are route plans) 510 is generated in the route design stage. Further, the information is integrated into a composite diagram. The construction design information 302 is generated in the construction design stage. The manufacturing design information 402 is generated in the manufacturing design stage. All basic information is information on objects themselves to be laid out and information on their arrangements. The information is projected to drawings and supplemented with dimensions and annotations to complete drawings. The drawing information is described by the cell structures. A drawing cell 1801 consists of a pointer 1802 to the next drawing cell 1801, a pointer 1803 to a sub-drawing cell 1806, a pointer 1804 to a projection cell 18015, the pointer 704 to an attribute cell 704801 and drawing information 1805, for management. The drawing information 1805 includes drawing names 1505 for management. A sub-drawing cell 1806 consists a pointer 1807 to the next sub-drawing cell 1806, a pointer 1808 to a shape and dimension cell 18010 and sub-drawing information 1809, for management. The sub-drawing information 1809 includes information on figure display positions in drawings. The shape and dimension cell 18010 describes the dimensions 1503, the parts numbers 1504 and the annotations 1702, and consists of a pointer 18011 to the next shape and dimension cell 18010, the pointer 1008 to the primitive cell 10011, a pointer 18012 to a character cell 18014 and shape and dimension information 18013, for management. The shape and dimension information 18013 manages flags identifying the dimensions 1503, the parts numbers 1504 and the annotations 1702. The primitive cell 10011 manages auxiliary dimensional lines for the dimensions 1503 by the primitive information 10013. A character cell 18014 manages character positions of the annotations 1702, the dimensions 1503, the parts numbers 1504 and character code strings as character information. A projection cell 18015 contains a pointer 18016 to the next projection cell 18015, a pointer 18017 to the next projection shape cell 18019 and projection information 18018, for management. The projection information 18018 manages coordinate conversion information used to generate the projection data from the arrangement information. In case of the system line 602, the coordinate conversion information is information on arrangement in a drawing and used as a unit matrix. The projection shape cell 18019 describes the projection data of components 601, the system line 602, the route 604, and the part 603 and consists of a pointer 18020 to the next projection shape cell 18019, a pointer 18021 to a projection primitive cell 18023 and projection shape information 18022, for management. The projection shape information 18022 manages the names of components 601, the system line 602, the route 604, and the parts 603 to be projected. This information is used as a key to be linked to the arrangement information and the routing information. The projection primitive cell 18023 consists of a pointer 18024 to the next projection primitive cell 18023 and projection primitive information 18025, for management. The projection primitive information 18025 manages the projection data 1501. The other drawing information is managed by the attribute information of the attribute cell 70400.

Figure 19:
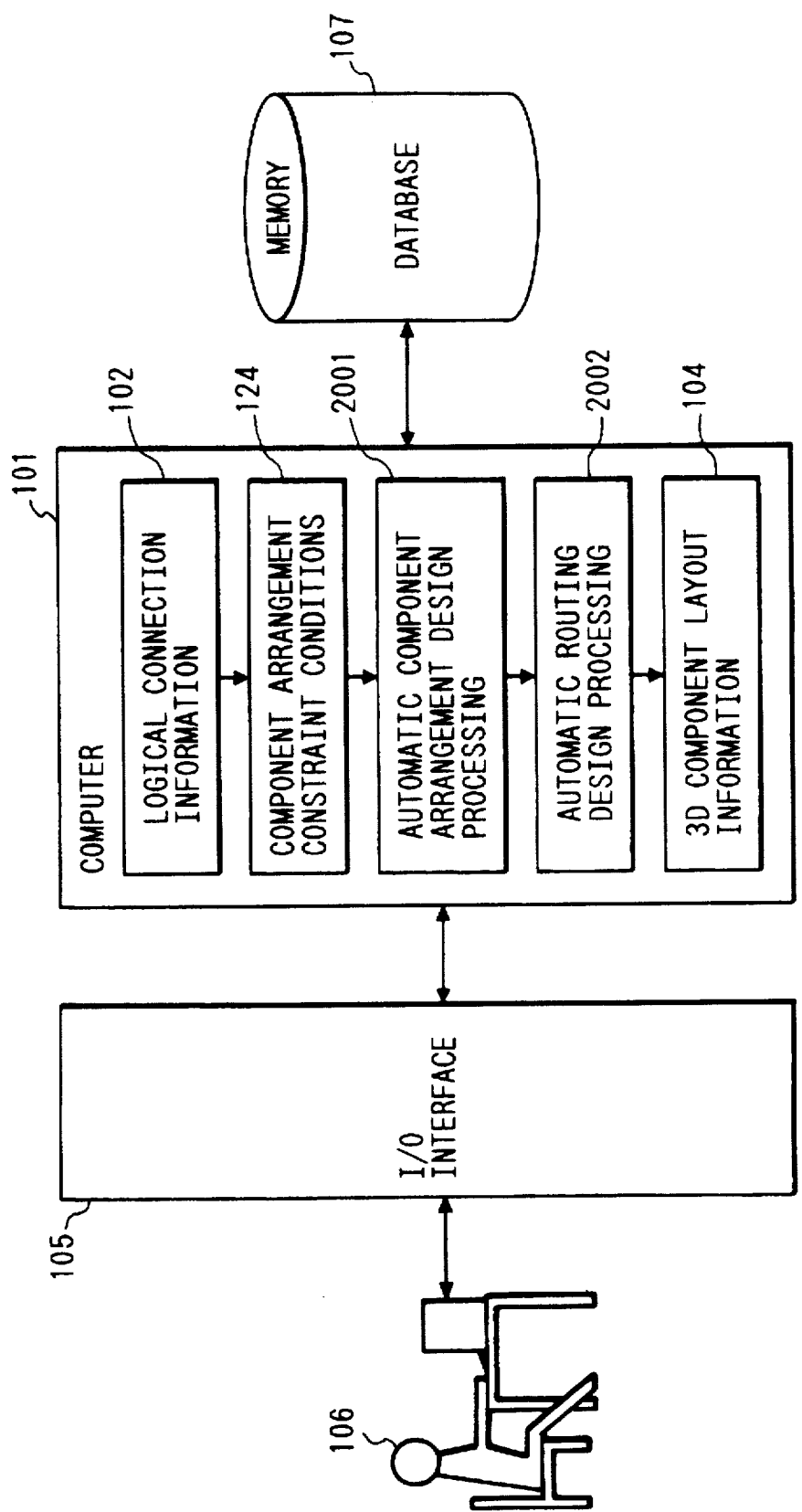
FIG. 19 shows a conceptual system constitution applying the automatic component arrangement and pipe routing processing means.

Hereinafter, as another embodiment of the present invention, automatic processing for the component arrangement design and the routing design previously explained in the sessions (7) and (8) is described. FIG. 19 shows a conceptual system constitution for getting the 3-D(three-dimensional) structure layout information 104 by applying the automatic component arrangement design processing 2001 and the automatic routing design processing 2002 by using the basic design information including the logical connection information 102 and the component arrangement constraint conditions 124 applied for the priority to arrange the components and for the limitation of positions between the component to be arranged. Although the structure and managing method of the data used by the automatic processes of 2001 and 2002 are the same as those in the previously mentioned interactive processing, main particular parts of the data structure and the data managing in the automatic processes are explained thereafter.

Figure 20:
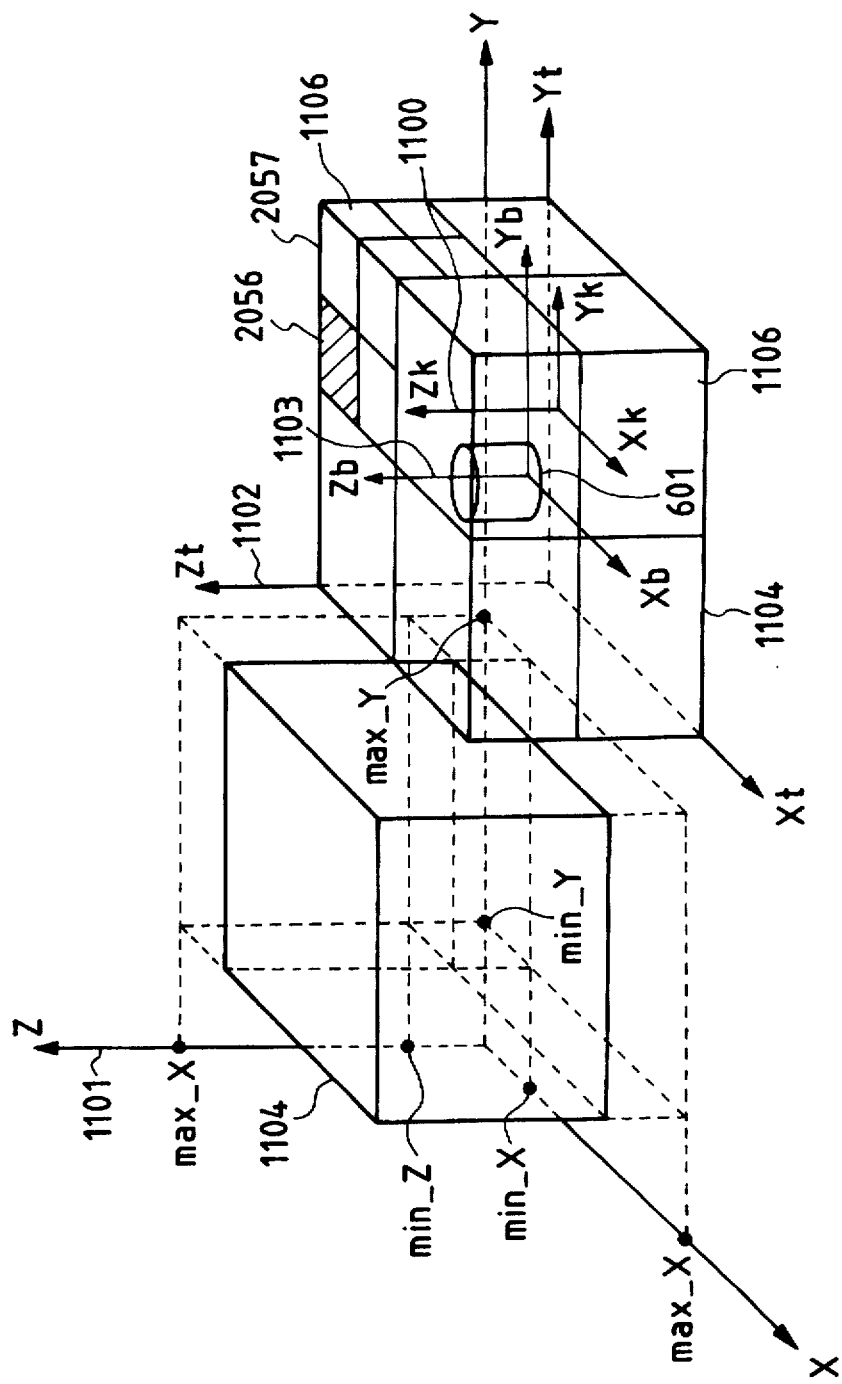
FIG. 20 shows how building information is related with the other information.

FIG. 20 shows how the automatic components arrangement design processing 2001 manages spaces in a plant. The plant coordinate system 1101 is fixed for the plant. The building coordinate system 1102 is provided under the plant coordinate system 1101. There are two or more buildings 1104 in the plant, and each building is divided into two or more sections 1106 along each coordinate axis of the building coordinate system 1102. Furthermore, sections 1105 are divided into arranged spaces 2056 where objects such as components 601, etc. are arranged, and non-arranged spaces 2057. A component coordinate system 1103 is provided under the building coordinate system 1102. And a elementary figure coordinate system 1100 is decided under the component coordinate system 1103.

Figure 21:
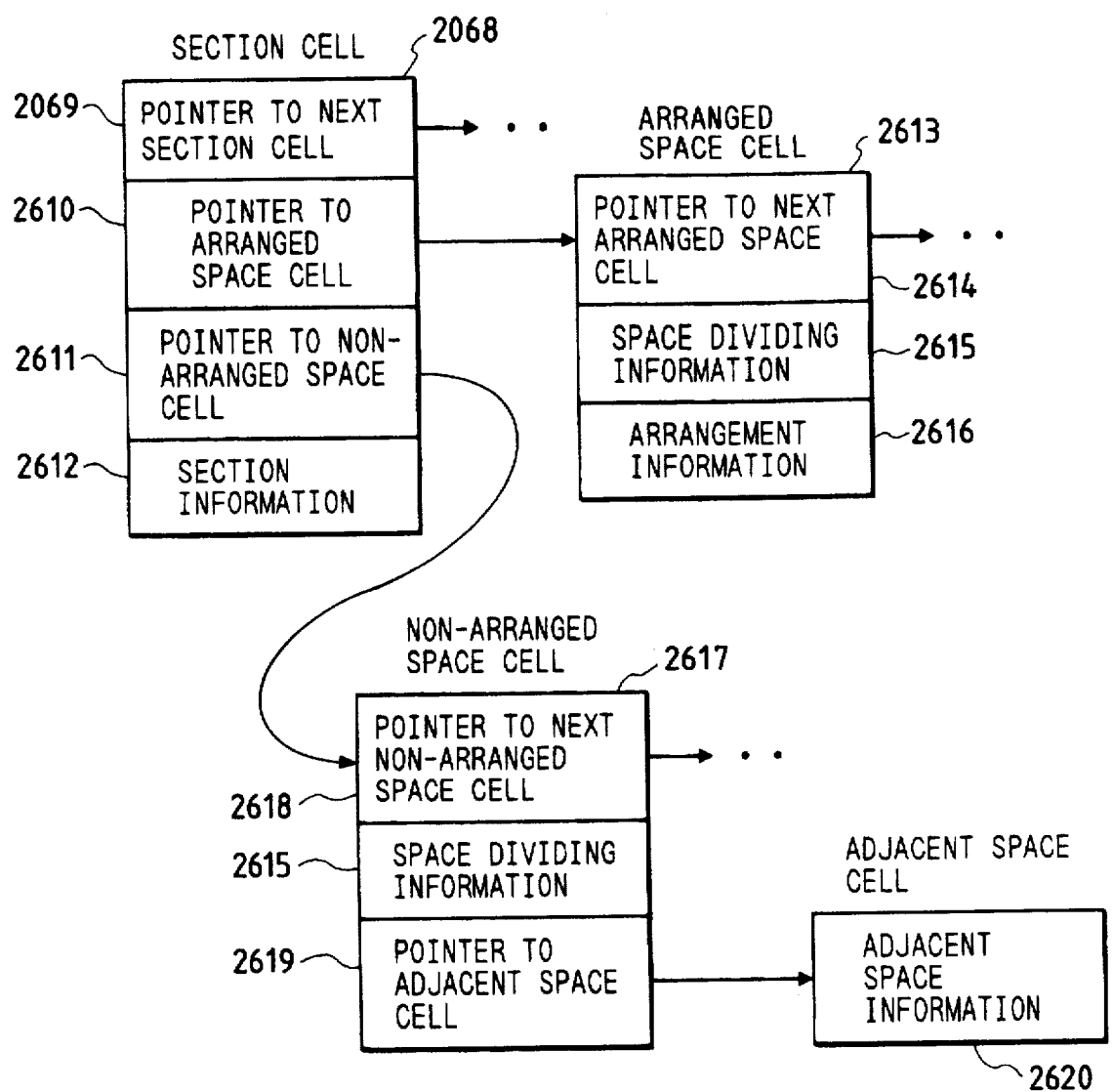
FIG. 21 is a block diagram representing the relation described in FIG. 21.

FIG. 21 shows the relationships among the above-mentioned data as the cell structure.

A section cell 2608 manages a pointer 2609 to the next section cell 2608, a pointer 2610 to the arranged space cell 2613, a pointer 2611 to the non-arranged space cell 2617 and section information (section size) 2612.

A arranged space cell 2613 manages a pointer 2614 to the next arranged space cell 2613, space dividing information (arranged space size) 2615 and arrangement information (arranged object names) 2616. The non-arranged space cell 2617 manages a pointer 2618 to the next non-arranged space cell 2617, space dividing information (non-arranged space size) 2615, and a pointer 2619 to the adjacent space cell 2620. A adjacent space cell 2620 manages the information of the non-arranged space 2057 adjacent to the subject non-arranged space 2057 (the number of adjacent non-arranged spaces and the pointers to the adjacent non-arranged space cells).

Features of the automatic processing of the present invention are described in the followings.

Figure 24:
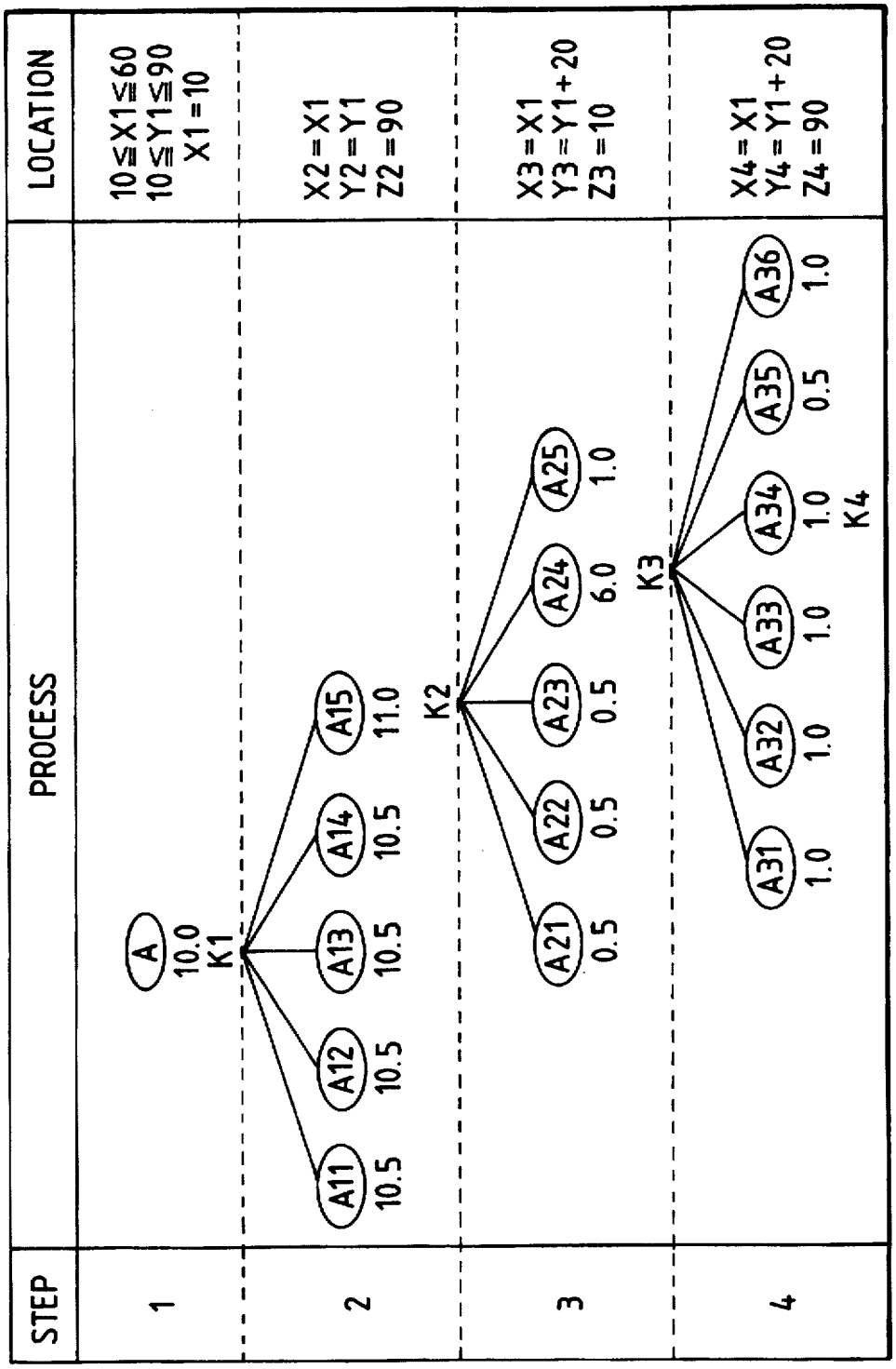
FIG. 24 is a drawing to show automatic arrangement process.

Overall automatic processing:

FIG. 22 shows the operation flow of the automatic components arrangement design processing 2001. This operation flow will be explained below using the constraint conditions 124 shown in FIG. 23(1). FIG. 24 shows how components K1 to K4 are arranged in the arrangement space.

The processing outline is as follows. The target object is searched in the basic design information, then a rectangular body is found for the object. The rectangular body will be explained later. After this, some spaces where the target object can be arranged are searched. The searched spaces are then evaluated whether they can satisfy the constraint conditions of the object arrangement, and the most proper one is selected. Components arrangement information 2616 is generated for the target object. After the target object is arranged in the most proper space, the space is divided into the arranged space 2056 and the non-arranged space 2057 so that the next target object can be arranged.

(a) Rectangular body circumscribing a component

Figure 25:
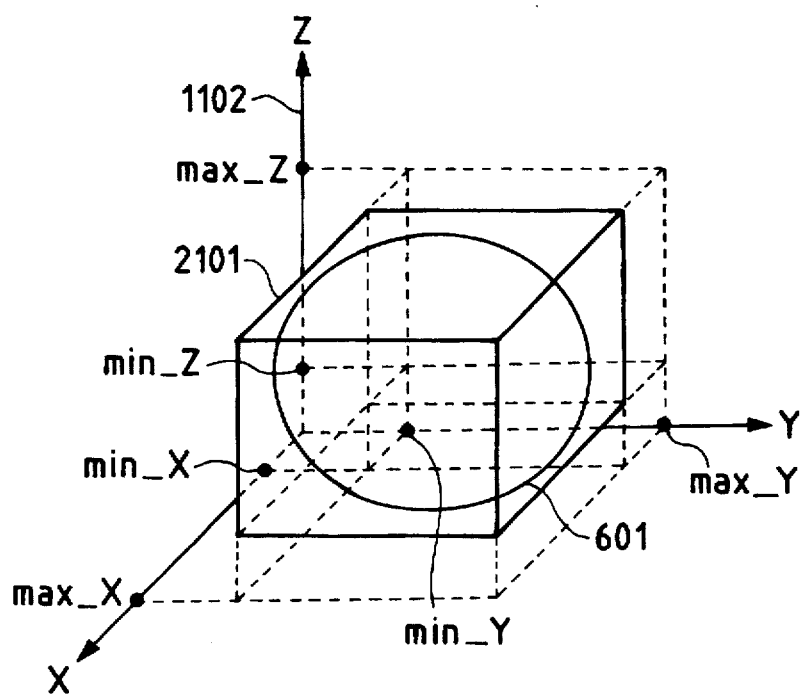
FIG. 25 is a drawing to illustrate the envelope rectangular block of a component.

Next, how to find a rectangular body circumscribing a component will be explained below. FIG. 25(1) shows the rectangular body circumscribing a component 2101. The size of the rectangular body circumscribing a component 601 is found as follows.

In general, it is not so easy to find the size of a rectangular body circumscribing a component 2101. So, at first, a rectangular body circumscribing an elementary figure is found in the elementary figure coordinate system 1100 and the elementary figures forming a component 601 are treated as a unit. Then, the rectangular body circumscribing the unit is converted to the one in the component coordinate system 1103. The result is further converted to a rectangular body circumscribing a component 2101 in the building coordinate system 1101.

Figure 26:
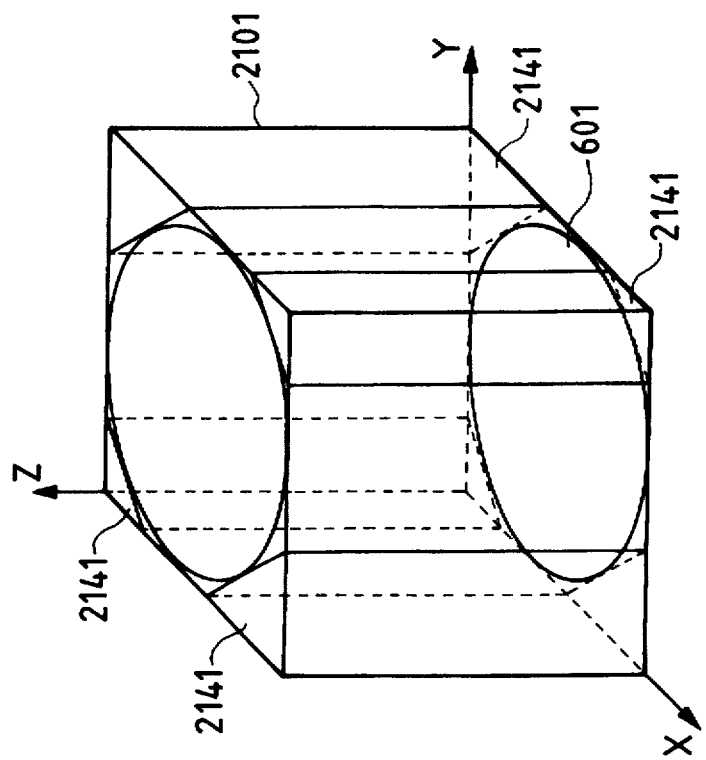
FIG. 26(1) is a drawing to show the case where non-arranged space forms two triangular prisms.
Figure 26:
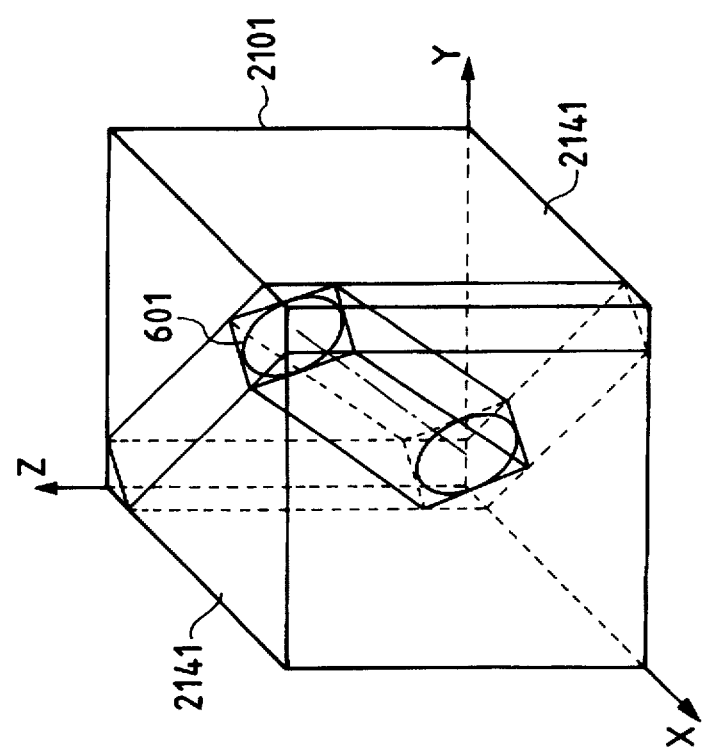

Note that if objects such as a component 601 and a rout 604 are arranged obliquely or if large objects are circumscribed with a rectangular body, many dead spaces are generated. To avoid this, those dead spaces are used as spaces for triangle prisms as shown in FIGS. 26(1) and (2). In other words, the spaces of the two triangle prisms 2141 can be used in the Z axial direction as shown in FIG. 26(1). In the same way, the spaces for a pair of triangle prisms 2141 can be used in the X and Y axial directions. FIG. 26(2) shows, for example, the case that the component shapes a cylinder 2141, in which the spaces for the triangle poles 2141 at the four corners of the rectangular body circumscribing a component 2101 can be used. However, in this case, the sizes (volumes) of the usable spaces must be set beforehand. The space dividing information is used to generate both the arranged space cell 2613 and non-arranged space cell 2617 shown in FIG. 21 at the same time to manage the usable triangle prism spaces and the identification flags.

(b) Constraint condition setting processing

FIG. 23(1) shows an example to set the constraint conditions for arranging a component 601. The information on the component size, systematic line and parts are found from the component names. The constraint conditions are encoded, and necessary codes are selected and input. The component K1 is given the top priority for arrangement. The constraint condition indicates that "put it on the ground level". The component K2 is given the second priority for arrangement. The constraint condition is "put it on a position as high as possible". The constraint condition for the component K3 is "put it in front of the component K1", and that for the component K4 is "put it near the component K2".

FIG. 23(2) shows an example to set constraint conditions for passing points of routing. The rout R1 starts from the nozzle point of the component K1 and ends at the nozzle point of the component K2. The rout R2 branches from the rout R1 and ends at the nozzle point of the component K3. In addition, the rout R3 branches from the rout R1 and ends at the nozzle point of the component K4.

(c) Automatic component arrangement design processing

In the step 21801 of FIG. 22, the order of components for arrangement is decided according to the constraint conditions. Components K1 to K4 are arranged in the same building and processed as a group. Thus, the components to be arranged are listed as ((K1, K2, K3, and K4)). The outer parenthesis of the arrangement list represents a group aggregation, while the inner parenthesis represents the aggregate of object components for arrangement. In the step 21802, the first group is taken out. In other words, (K1, K2, K3, and K4) is taken out. When all the groups are taken out, the processing ends.

In the step 21803, component K1 is taken out as the target for arrangement from the arrangement list. If there is no component which can be taken out, the control of the processing goes to step 21809.

Figure 27:
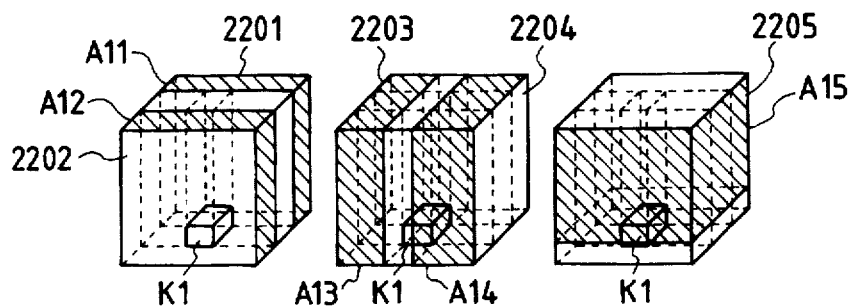
FIG. 27(1) is a drawing to illustrate the non-arranged space after arranging component K1 in the acceptable space.
Figure 27:
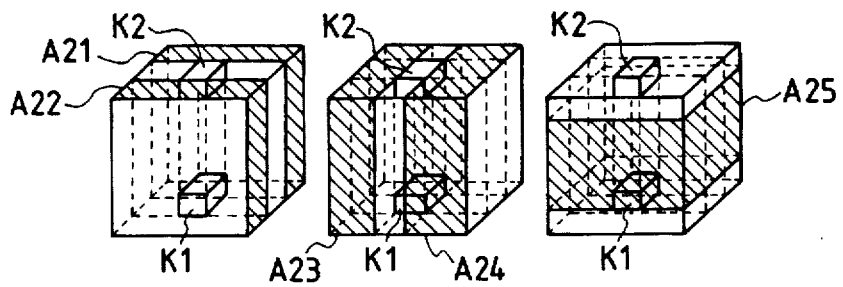
Figure 27:
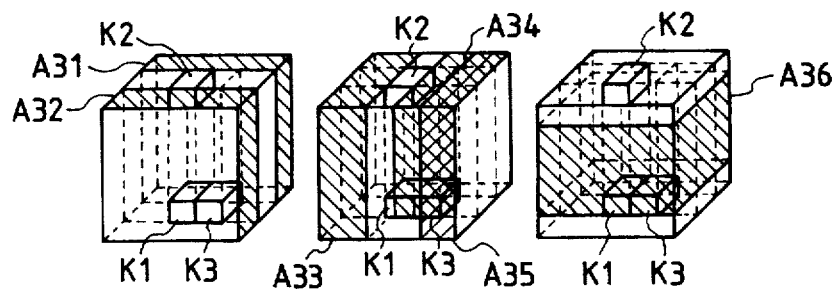
Figure 27:
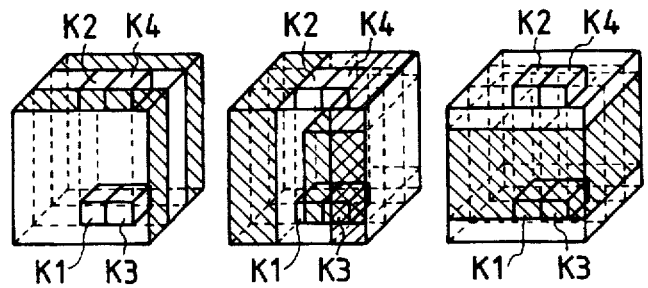

In the step 21805, the system searches the non-arranged spaces which becomes the object to be arranged according to space dividing information 2615 shown in FIG. 21, and they are composed in the step 21805. When the component is installed for the first time, the non-arranged space itself is the object space to be arranged, and is assumed as arrangement candidate space A ($0 \leq x \leq 60$, $0 \leq y \leq 100$, $0 \leq z \leq 100$). FIG. 27(1)–27(4) illustrate the method of the space composition. FIGS. 27(1) illustrates the state of non-arranged space 2057 after the component K1 is placed in the arrangement space. The system searches the adjacent space information of non-arranged spaces 2201 and 2202. Since it cannot obtain a greater rectangular body including the non-arranged spaces 2201 and 2202, the spaces become arrangement candidate spaces A11 and A12. Then the system searches the adjacent space information of other non-arranged spaces 2203 and 2204, and is in the state of having generated arrangement candidate spaces A13 and A14 which include non-arranged spaces 2203 and 2204 and can be connected in the X-axis direction. It also searches the adjacent space information of another non-arranged space 2205 and is in the state of having generated arrangement candidate space A15 which includes non-arranged space 2205 and can be connected in the Y-axis direction. FIG. 27(1) shows that a total of five arrangement candidate spaces are obtained. And the obtained spaces are registered in the arrangement candidate list.

The step 21806 compares the size of the rectangular body circumscribing component K1 and the size of the arrangement candidate pace, and searches the available arrangement candidate space to generate the arrangement candidate list. The arrangement candidate list in this case is (A).

The step 21807 evaluates the constraint conditions for the arrangement candidate list. The constraint conditions of component K1 requires that component K1 must be put on the ground level (Z=0) (weight=10), and component K1 can be put on the ground level in the arrangement candidate space A, which meets the constraint conditions. The evaluation value in the case is "10", and the arrangement candidate list is changed to (A (10)).

The step 21808 takes out the arrangement candidate list having the greatest evaluation value, and temporarily places the arrangement target object in that arrangement candidate space. The step 1 of FIG. 24 shows that component K1 is temporarily placed in the arrangement candidate space A. The position range allowing arrangement can be expressed by $10 \leq X1 \leq 50$, $10 \leq Y1$ 90 and $Z1=10$. The space dividing information 2615 described in FIG. 21 on the non-arranged space of component K1 after the temporary arrangement is generated and the control of the processing returns to the step 21803. The space dividing information 2615 is given as the range.

Component K2 is taken out in the next step 21803. Five non-arranged spaces are provided in this case as shown in FIG. 27 (1). The arrangement candidate list is given as (A11, A12, A13, A14 and A15). The constraint conditions of component K2 requires "installation at the highest possible position" (weight=10), and must be connected to component K1 by a rout 604, that is, requires the constraint conditions that component K2 is preferred to be located close to component K2 (weight=1). When the constraint conditions are evaluated, arrangement candidates A11, A12, A13 and A14 have the same evaluation value of 10.5, and constraint condition A15 has 11. All the candidates meet the constraint conditions of installation at the highest possible position, but they satisfy the constraint condition of installation at the possible highest position, in different degrees. Arrangement candidate A15 scores 1 and all the rest get the mark of 0.5. Thus, the arrangement candidate list results in (A11 (10.5), A12 (10.5), A13 (10.5), A14 (10.5) and A15 (11), as given in the step 2 of FIG. 24. Then, A15 is selected for temporary arrangement. The location range of component K2 is represented by $X2=X1$, $X2=X1$ and $Z2=90$. The space dividing information 2615 is generated after the temporary arrangement as well as the case of component K1.

Then, the control of the processing goes back to step 21803, and component K3 is taken out of the arrangement list. Non-arranged spaces are searched and the five arrangement candidate spaces are composed as shown in FIG. 27 (2). And, the arrangement candidate list is then given as (A21, A22, A23, A24 and A25). The constraint condition of component K3 requires that the K3 must be placed in the front of component K1 (in the Y-axis direction) (weight=5). Component K3 must be connected to the piping route branched from the piping route linking between component K1 and component K2, that is, requires the constraint condition that component K3 is preferred to be located close to component K1 (weight =1). Only arrangement candidate space A24 meets the constraint condition of component K3 to be placed in the front of component K1. Furthermore, arrangement candidate spaces A24 and A25 providing the arrangement of the minimum linear distance to component K1 satisfy the constraint condition of installation at the possible closest position to component K1. The evaluation value of arrangement candidate space A24 is 6, while that of arrangement candidate A25 is 1. Arrangement candidates A21, A22 and A23 are evaluated to have the degree of satisfaction of 0.5 for the latter condition, by judging from the distance to component K1. The arrangement candidate list is given as (A21 (0.5), A22 (0.5), A23 (0.5), A24 (6), A25 (1)) and A24 is selected as temporary arrangement. The location of component K3 is given by $X3=X1$, $Y3=Y1+20$ and $Z3=Z1=10$, and the space dividing information 2615 is generated after the temporary arrangement in the step 21803, as well as the case of component K1.

The control of the processing goes back to the step 21803 to take out component K4 from the arrangement list to update the arrangement list. The non-arranged space is searched and the six arrangement candidate spaces (A31, A32, A33, A34, A35, A36) are composed as shown in FIG. 27(3). The constraint conditions of component K4 require that component K4 be placed close to component K2 (weight=1). And, component K4 must be linked to the route branched from the route connecting between components K1 and K2. This constraint condition requires that component K is preferred to be located close to component K2. Since the latter condition is equivalent to location close to component K2, the latter condition is not taken into account. The constraint condition of installation at the close location to component K2 is met by arrangement candidate spaces A31, A32, A33, A34 and A36, and the evaluation value is 1. Arrangement candidate A35 is evaluated to have degree of satisfaction of 0.5 by judging from the distance to component K2 and its evaluation value is given as 0.5. The arrangement candidate list is given as (A31(1), A32(1), A33(1), A34(1), A35(0.5), A36(1)) shown in FIG. 12(3). A31, A32, A33, A34 and A36 are selected as the candidates from the evaluation value.

To find a more effective arrangement plan, the method for accommodating the entire component group in the minimum space is described in the followings. In other words, the size of the space containing the entire component group is estimated from the obtained arrangement candidates. Comparison is made between the space size in case the component K4 is located in arrangement candidate A31 and the one in case in arrangement candidate A32. The result reveals that the latter arrangement candidate reduces the total arrangement space more effectively, which improves the space utilization. The similar comparisons are executed to the arrangement candidates A32, A33, A34, A35 and A36. Finally, the A34 is selected as the first one in the order of the arrangement candidate list. New space dividing information 2615 is generated after temporary arrangement in the step 21804 as well as the case of component K1.

When the control of the processing goes back to the step 21803, it proceeds to the step 21806 because the arrangement list is empty. Since temporary arrangement has been completed for one group in the step 21806, the system generates the final arrangement results according to the results of the temporary arrangement, and the control of the processing goes back to the step 21802. The coordinate values of temporary arrangement of components K2, K3 and K4 are functions of the coordinate values X1 and Y1 of component K1, and all the locations can be determined by determination of the X1 and Y1. Installation of components K3 and K4 within the building at the positions as close as possible to the corners may contribute more effective use of the space. Then, all the coordinate values can be fixed. FIG.27 (4) illustrates the arrangement results. Now, the processing for each group is completed, and the control goes back to the step 21806 which executes the arrangement of the next group. The processing is now completed because the arrangement list is empty. The above is the description of actual processing for the example shown in FIG. 23(1).

The above description is concerned with the method of arranging each of components 601. It is also possible to arrange multiple related components at one time. For example, the optimum arrangement in a group is obtained in advance, and, by regarding one group as one component 601, automatic arrangement for the groups is executed.

(c) Automatic routing processing

Figure 28:
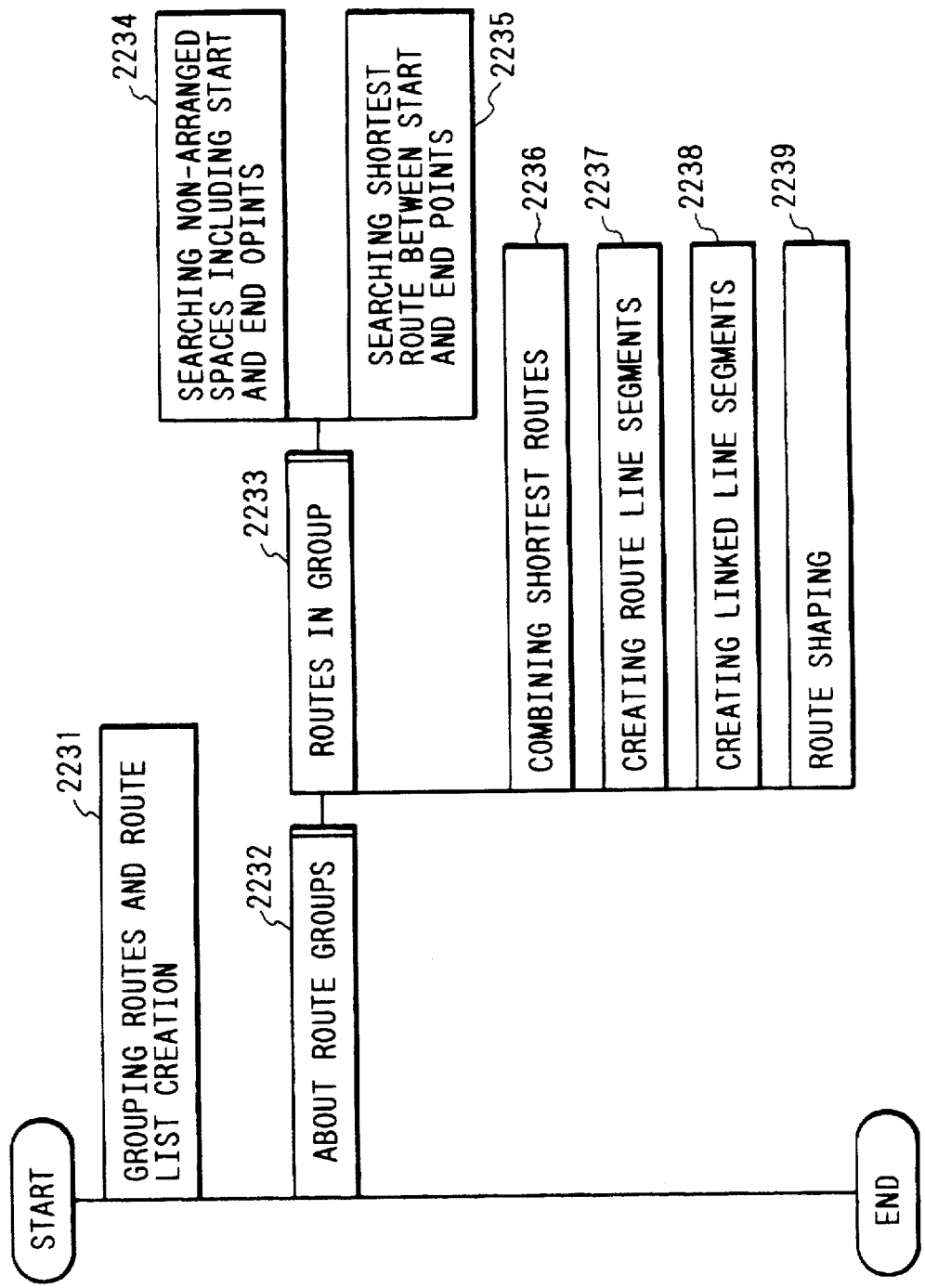
FIG. 28 is a drawing to show automatic pipe routing process.
Figure 30:
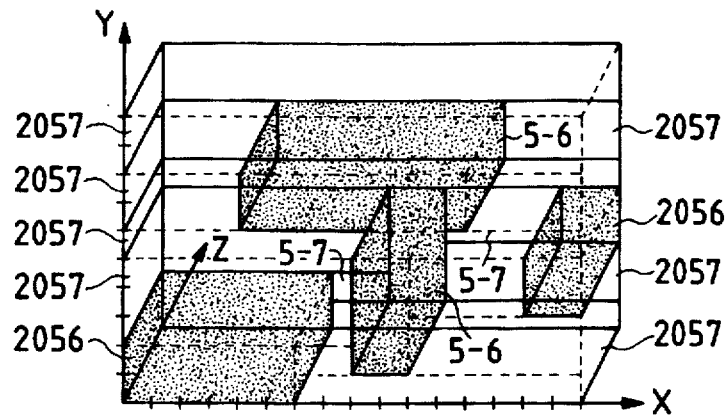
FIG. 30(1) is a three-dimensional drawing to show a target space of the pipe routing.
Figure 30:
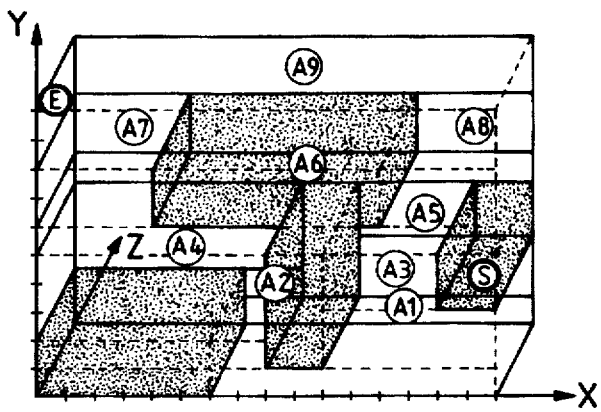
Figure 30:
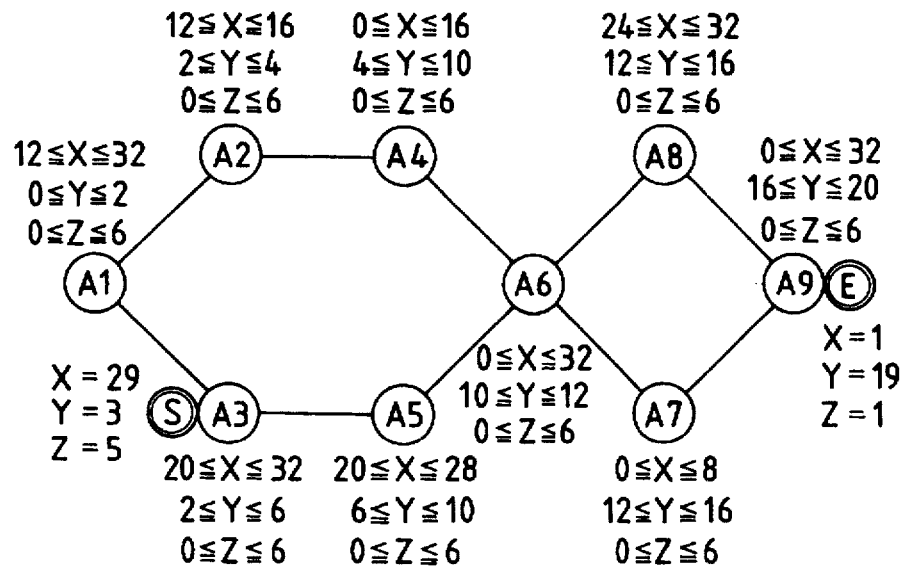
Figure 32:
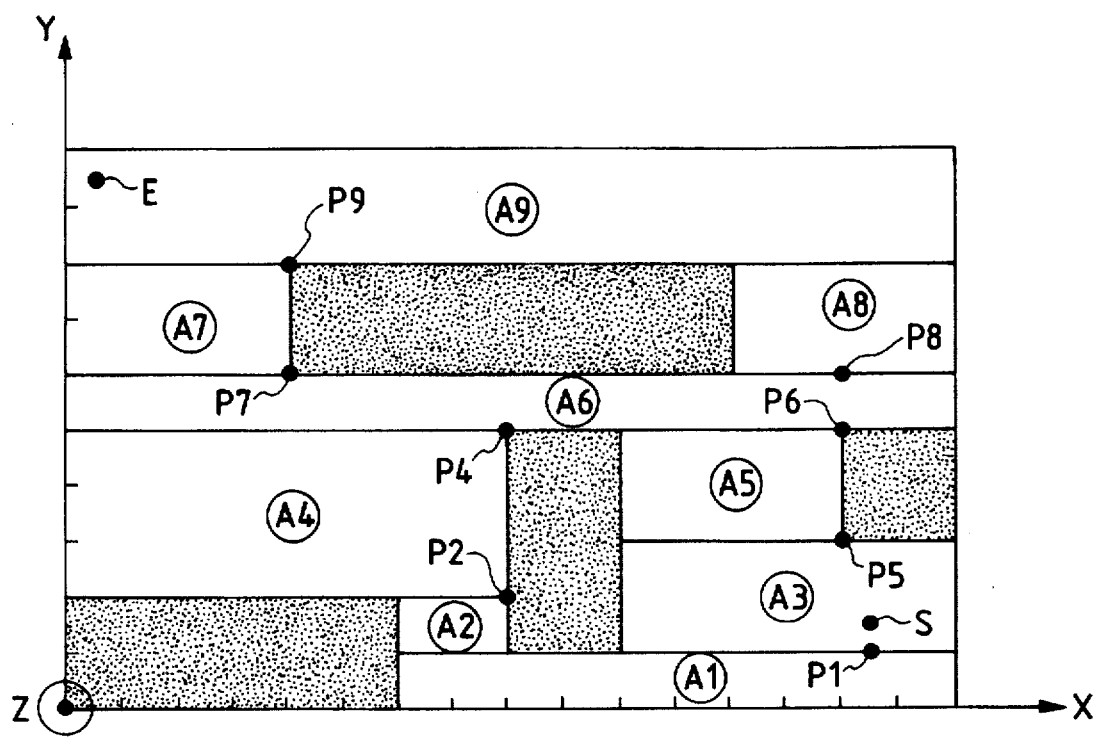
FIG. 32 is a drawing to show the corner points in the optimized route.

The following describes the automatic routing processing 2002 referring to the processing flow of FIG. 28 and the plane views of FIGS. 30(1) and 30(2) in explanation of FIG. 32.

The step 2231 is a process of determining the priority of routes to be routed and generating a route list. The priority of the routing is given in the order of a pipe, a air conditioning duct and a cable tray. If this priority happens to be the same, the size and importance of the pipes are used to determine the priority. Information on the start point, end point, the cross section form and the bend radius is added to the route list. If the passing point is set in addition to the start and end point, the route is regarded as one group and the problem is divided into problems of finding out sub-routes between the points, i.e.; sub-routes between the start and a passing point, between passing points and between a passing and the end point, then they are registered in the route list. For example, when the start point of route R is P1, the passing points are P2 and P3, and the end point P4 is given, the route list will be represented as (R (R1 (P1, P2), R2 (P2, P3), R3 (P3, P4))). R denotes a group, while R1, R2 and R3 represent sub-routes. The coordinate values of the points in the parentheses of the sub-routes show the start and end points of the sub-routes. If route R has no designation of an intermediate passing point, and only the start point P1 and the end point P2 are given, the rout list is represented as (R (R (P1, P2))).

FIG. 30(1) indicates the object space for route generation and it shows distinguishably the arranged spaces 2056 which cannot pass through the route and the non-arranged spaces 2057 which can pass through the route. One graduation of the each coordinate axis corresponds to 2 m. In FIG. 30(2), A1 through A9 show the non-arranged spaces 2057 which are the ranges permitting the routing, and the start and end point of the route R to be obtained are represented by S and E, respectively. Since the intermediate passing point is not specified, the sub-line is not generated, and the line list in the step 2231 is given as (R (R (S, E))).

R at the top of the rout list is taken out in the step 2232 and the route list is given as (R (S, E)). The processing is completed if the route list is empty.

The sub-route at the top of the route list is taken out in the step 2233, that is, the route R (S, E) at the top of the route list is taken out in the step 2233. If there is no route to be taken out, the control goes to step 2234.

The non-arranged space 2057 containing the start point S and the end point E of route R is searched in the step 2234. For this search, the space dividing information 2615 is used to take out the non-arranged space cell 2617 from the cell structure shown in FIG. 21. And, by comparing the information on the size of the non-arranged space 2057 and the coordinate value, the non-ranged spaces 2057 containing the start or the end points are searched. As can be seen from FIG. 30(2), the results indicate that start point S is contained in the non-arranged space A3, while the end point E is included in the non-arranged space A9.

The shortest possible route from the start point to the end point through the non-arranged spaces 2057 is searched in the step 2236. Linkage ways of the non-arranged spaces A1 through A9 which are the ranges permitting the routing, can be graphically represented as given in FIG. 30(3). FIG. 30 (3) denotes positions of start point S and end point E of the routing. The coordinate values of start point S are (29, 3, 5), and those of end point E are (1, 19, 1).

Figure 29:
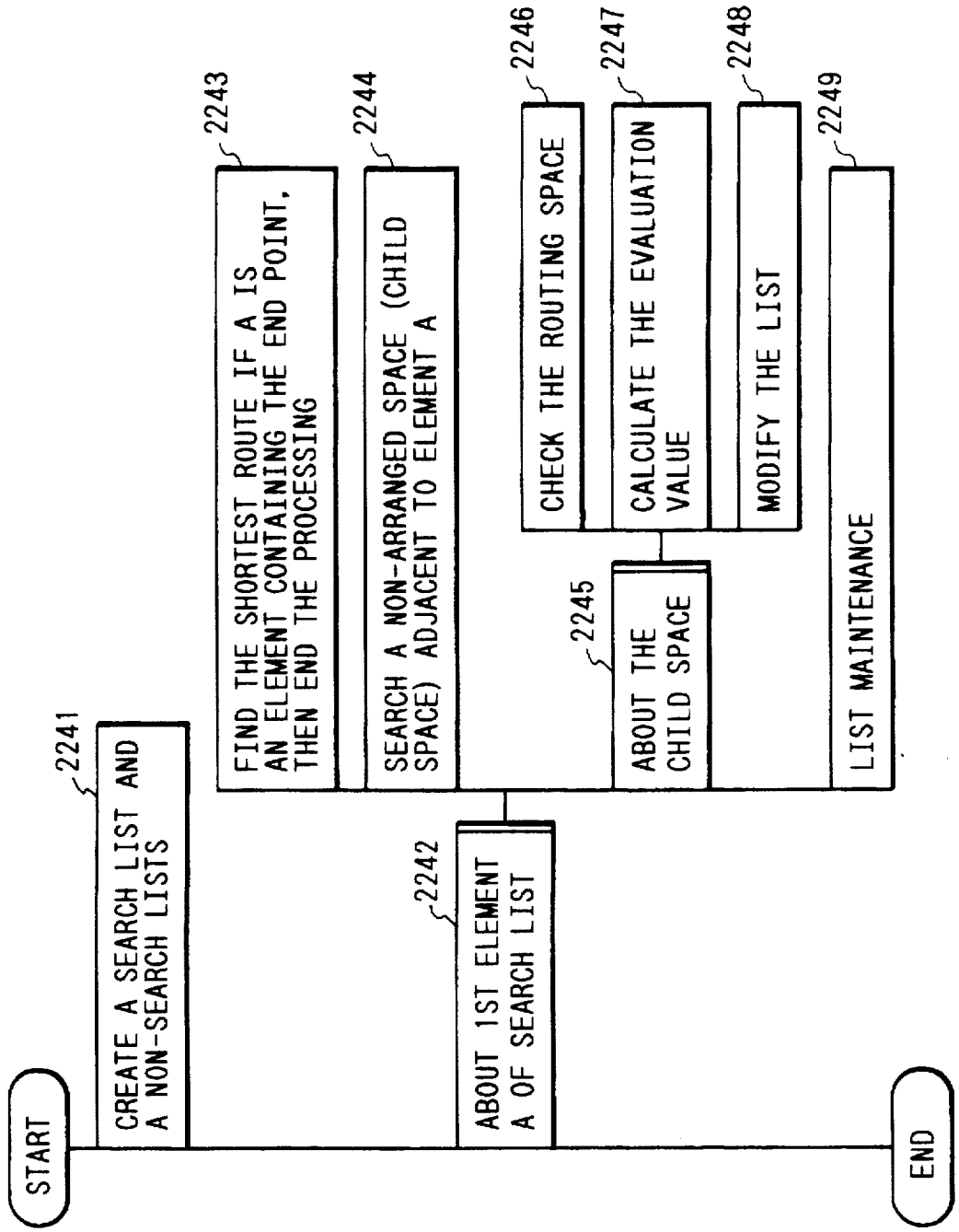
FIG. 29 is a drawing to illustrate shortest route search process.
Figure 31:
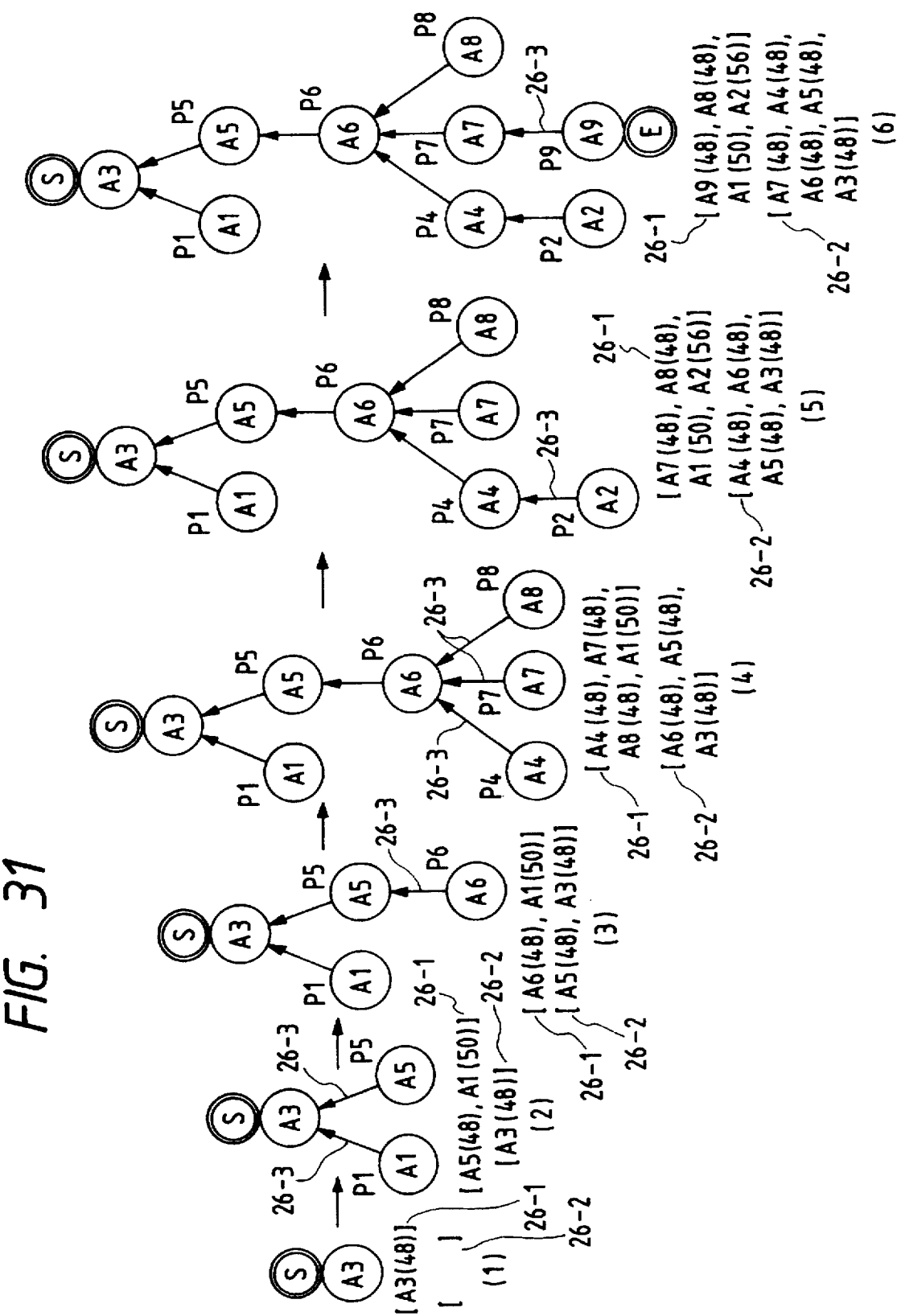
FIG. 31 is a drawing to explain shortest route search process.

The process of finding the shortest route as shown in FIG. 29 was applied to the problem of finding the shortest route from the start point S to the end point E. FIG. 31 illustrates the processing when the process of FIG. 29 is applied to the example of FIG. 30.

The search list and non-search list are generated in the step 2241. Then evaluation value D of the non-arranged space A3 containing the start point S is obtained. Evaluation value D is used to find the linear distance (estimated minimum distance) from the start point to the end point.

Since start point S is located in the non-arranged space A3, the minimum distance is g (A3)=0. To find the minimum distance from the non-arranged space A3 to the end point E, Manhattan distance (|X (E)–X (S)|+|Y (E)–Y (S)|+|Z (E)–Z (S)|) is used and the distance h (A3)=48. Therefore, the evaluation value of the non-arranged space A3 is given as D=g (A3)+h (A3)=48. The non-arranged space A3 is registered in the empty search list. The search list is given as (A3 (48)). The step (1) of FIG. 31 illustrates this process, and the search list 26-1 and the non-search list 26-2.

Element A3 of the top of the search list is taken out in the step 2242, and is shifted to non-search list, then the non-search list is given as (A3 (48)). In the step 2243, the system judges whether the element A3 coincides with the non-arranged space containing the end point. Since it does not coincide, the control goes to step 2244.

The A1 and A2 which are the non-arranged spaces 2057 adjacent to element A3, are searched by using the space dividing information 2615 in the step 2244 to generate child space lists (A1, A5). The child space list A1 is taken out of the child space list in the step 2245. The size of the child space and the cross section form of the route are compared in the step 2246 to check whether the routing is possible. Since, by comparing the range of each coordinate axis and the size of the route, it is proved that the routing is sufficiently possible, the control of the processing goes to the next step 2247.

Evaluation value d of child space A1 is obtained in the step 2247. The shortest distance c (A3, A1) from element A3 to child space A1 is obtained as the shortest distance from start point S to child space A1. Since the range of child space A1 is 12≦X≦32, 0≦Y≦2 and 0≦Z≦6, the point getting the shortest distance from the start point S to child space A1 is given as P1 (29, 2, 5) and the shortest distance c (A3, A1)=1. Assume that the estimated shortest distance h (A1) from child space A1 to the end point E is the distance between point P1 and end point E, and we get h (A1)=49. This will give g (A1)=g (A3)+c (A3, A1)=1 and d (A1)=g (A1)+h (A1).

A pointer moving from child space A1 to element A3 is assigned in the step 2248, and is registered in the search list as D (A1)=d (A1)=50. Then, the control of the processing goes back to step 2245.

Child space A5 is taken out of the child space list and processed in the same way as child A1. Then, c (A3, A5)=4 is gained since point P5 (28, 6, 5) is the point which provides the shortest distance from start point S to child space A5. The estimated shortest distance from child space A5 to end point E is given as h (A5)=44, which, in turn, provides g (A5)=g (A3)+c (A3, A5 )=4, and d (A5)=g (A5)+h (A5)=48. A pointer moving from A5 to A3 is assigned in the step 2248, and the result is registered into the search list 26-1 as D(A5)=d(A5)=48. Search list 26-1 is given as (A5 (48), A1 (50)). When the control of the processing goes back to step 2245, it goes to step 2249 since the child space list is empty.

The elements in the search list are rearranged in the ascending order of the evaluation value D in the step 2249. This result is shown in the step (2) of FIG. 31.

The control of the processing goes back to step 2242. Element A5 having the smallest evaluation value D is taken out of the search list, and is shifted to the non-search list. Then, it is processed in the same way as the element A3. The child spaces in this case are A6 and A3, but A3 is eliminated from the scope, since it is a parent space of the A5. Thus, child space A6 alone becomes the object for processing. The point ensuring the shortest distance position from point P5 of element A5 to child space A6 is P6 (28, 10, 5), then c (A5, A6)=7. The estimated shortest distance from child space A6 to end the point E is equal to the distance from point P6 to end point E, hence h (A6)=40. This will give g (A6)=g (A5)+c (A5, A6 )=8 and d (A6)=g (A6)+h (A6)=48. Since child space A6 is registered neither in the search list nor in the non-search list, a pointer moving from A6 to A5 is assigned, and the result is registered into the search list as D(A6)=d(A6)=48. The elements in the search list are rearranged in the ascending order of the evaluation value D in the step 2249. This result is shown in the step (3) of FIG. 31.

The control of the processing goes back to step 2242 again. Element A5 having the smallest evaluation value D is taken out of the search list, and is processed in the same way. The child spaces in this case are A4, A7 and A8. P4 (16, 10, 5) provides the shortest distance from point P6 of element A6 to child space A4, and the estimated shortest distance to end point E is equal to the distance from point P4 to end point E, hence d (A4)=g (A6)+c (A6, A4)+h=48.

P7 (8, 12, 5) provides the shortest distance from point P6 of element A6 to child space A7, and the estimated shortest distance to the end point E is equal to the distance from point P7 to the end point E, hence d (A7)=g (A6)+c (A6, A7)+h (A7)=48.

Similarly, P8 (28, 12, 5) provides the shortest distance from point P6 of element A6 to child space A8, and the estimated shortest distance to the end point E is equal to the distance from point P8 to the end point E, hence d (A8)=g (A8)=g (A6)+c (A6, A8)+h (A8)=48.

Since child spaces A4, A7 and A8 are registered neither in the search list nor in the non-search list, a pointer moving from A4, A7 and A8 to A6 is assigned, and the result is registered into the search list as D (A4)=d (A4)=48, D (A7)=d (A7)=48, and D (A8)=d (A8)=48. The elements in the search list are rearranged in the ascending order of the evaluation value D in the step 2249. This result is shown in the step of (4) of FIG. 31.

The control of the processing goes back to the step 2242 again to take the leading element A4 out of the search list. A2 is the only child space in this case. Assume that P2 (16, 4, 5) provides the shortest distance from point P4 of element A4 to child space A2, and the estimated shortest distance to the end point E is equal to the distance from point P2 to end point E; then d (A2)=g (A4)+c (A4, A2)+h (A2)=56. A pointer moving from child space A2 to A4 is assigned, and the result is registered into the search list as D (A2)=d (A2)=56. The elements in the search list are rearranged in the ascending order of the evaluation value D in the step 2249. This result is shown in the step (5) of FIG. 31.

Similarly, the control of the processing goes back to step 2242 to take the leading element A7 out of the search list. A7 is the only child space in this case. Since P9 (8, 14, 5) provides the shortest distance from point P7 of element A7 to child space A9, and the estimated shortest distance to the end point E is equal to the distance from point P9 to end point E, d (A9)=g (A7)+c (A7, A9)+h (A9)=48 is obtained. Since child space A9 is registered neither in the search list nor in the non-search list, a pointer moving from A9 to A7 is assigned and the result is registered into the search list as D (A9)=d (A9)=48.

The non-arranged spaces in the search list are rearranged in the ascending order of the evaluation value D in the step 2249. In this case, element A9 containing the end point E should be the leading element for rearrangement. This result is shown in the step (6) of FIG. 31.

The control of the processing then goes back to the step 2242 to take the leading element A9 out of the search list. Since element A9 contains the end point E, the control of the processing goes along with the pointer from element A9 containing the end point E to element A3 containing the start point S to find the pass A9→A7→A6→A5→A3. When they are rearranged in the reverse order, the pass A3→A5→A6→A7→A9 is gained as the shortest route from the start point S to the end point E, thereby, the processing is completed.

The above discussion relates to the processing 2231 to find the shortest route from the start point S to the end point E. In the step 2232, the shortest route for the whole routing is generated by linking the shortest routes according to line segments (route line segment) 28-1 to 28-4 with the direction obtained in FIG. 33(1). The control of the processing goes to the next step 2233 without generating any thing because there is only one route in the present embodiment.

Figure 34:
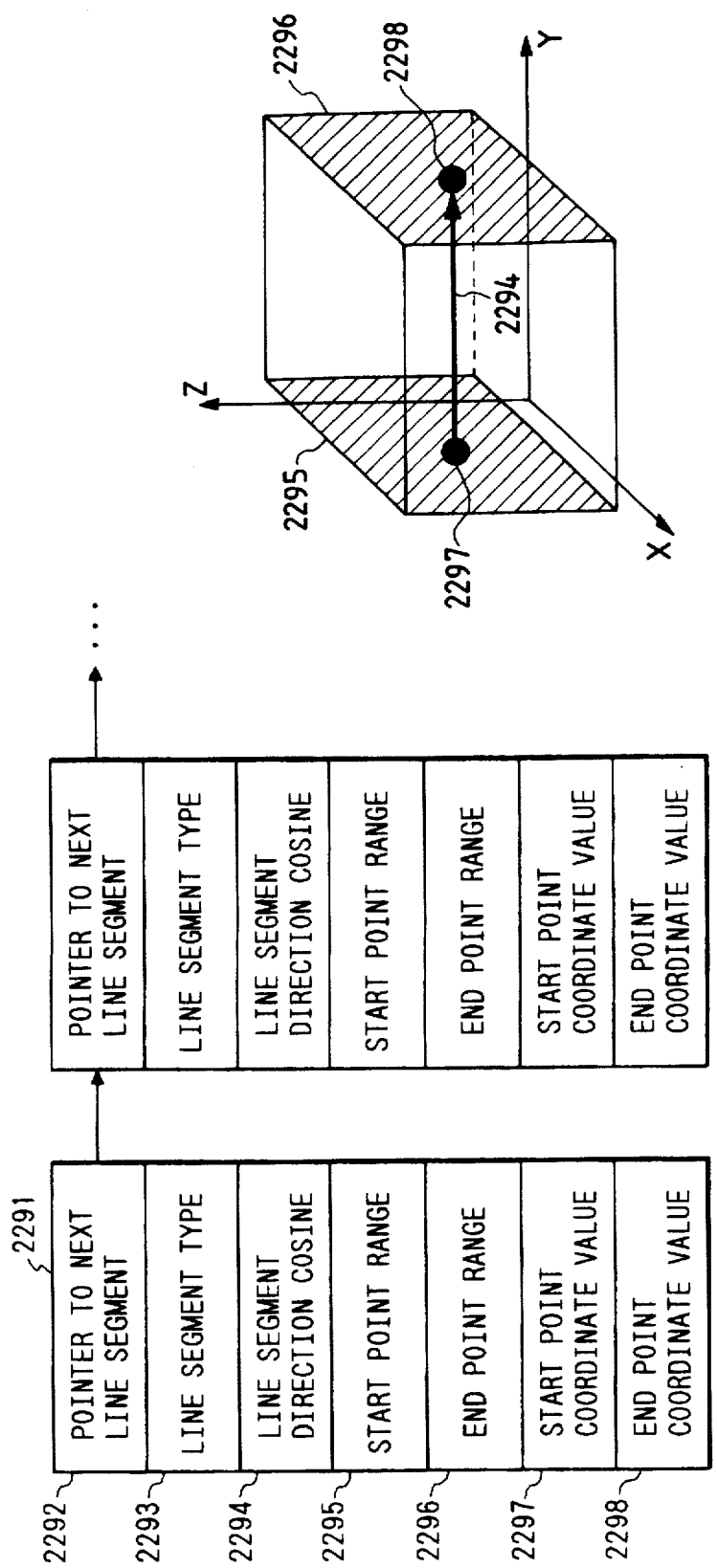
FIG. 34 is a drawing to show the data cells for managing the rout line segments.

In the step 2233, the line segments 28-1, 28-2, 28-3 and 28-4 obtained by the route searching are registered in the ascending order of route length in line segment cells 2291 as shown in FIG. 34 and the line segment cells 2291 are connected by pointers 2292. The route line segment is distinguished by a line segment type 2293 of the line segment cell 2291. Only these route line segments can not link between the start point S and the end point E and the whole routing cannot be completed.

The step 2234 generates linkage line segments and links the start point S and the end point E of the route. Firstly, in investigating the linkage between the start point S and line segment 28-1, it is judged that route line segment 28-1 cannot be moved so as to pass through the start point S. In order to link the start point S and line segment 28-1, linkage line segment 28-5 must be generated and added to the top of the line segment cells 2291. A flag for identifying a linkage line segment is set to the line segment type 2293. Direction cosine 2294 of linkage line segment 28-5 is given as (1, 0, 0), start point coordinate value 2297 as the start point S (29, 3, 5) of the route, and end point coordinate value 2298 as the end point E(20, 3, 5). Then, the constraints of Y axis and Z axis are imposed on the range of the line segment 28-1, thus the range 2295 of the start point is given as 20≦X≦28, Y=3 and Z=5, while the range 2296 of the end point is given as 20≦X≦28, Y=10 and Z=5.

By proceeding along the line segment list, it is judged that line segment 28-1 can be linked to line segment 28-2 and can be united into one line segment since the direction cosine of the both line segments is the same. Range 2296 of the end point of line segment 28-1 is set as 20≦X≦28, Y=12 and Z=5, and pointer 2292 is changed to pointer 2292 of route line segment 28-3 and the line segment cell of line segment 28-2 is deleted.

It can be seen that line segment 28-1 and line segment 28-3 cannot be linked to each other within respective movable ranges. Then linkage line segment 28-6 is generated, and line segment cell 2291 is inserted between the cells of line segment 28-1 and line segment 28-3.

Line segment 28-3 and line segment 28-4 can be linked with each other and united into one line segment since the direction cosine of the both line segments is the same.

The following discusses the linkage between the final line segment 28-3 and the end point E of the route. Line segment 28-3 cannot be moved so as to pass through start the point S. In order to link line segment 28-3 and the end point E, linkage line segment 28-7 must be generated within the arrangement space A9 and the line segment cell 2291 is placed at the end of the line segments.

The above processing determines the line segments which can be linked. Some line segments sill have degree of freedom and the control of the processing goes to the next route shaping step 2239 of FIG. 28 in order to fix the movable range of the line segment. The step 2239 takes constraint conditions into account. For example, assuming that the object already placed in the arranged space 2056 is a building structural body, the route must be located at least three meters apart from the building structural body such as wall, floor and ceiling and the route form and its bending radius must be taken into consideration. To ensure an effective use of the non-arranged space 2057 for the automatic generation of the next pipe routing, the movable range of the line segment must be fixed along the arranged space 2056.

Figure 33:
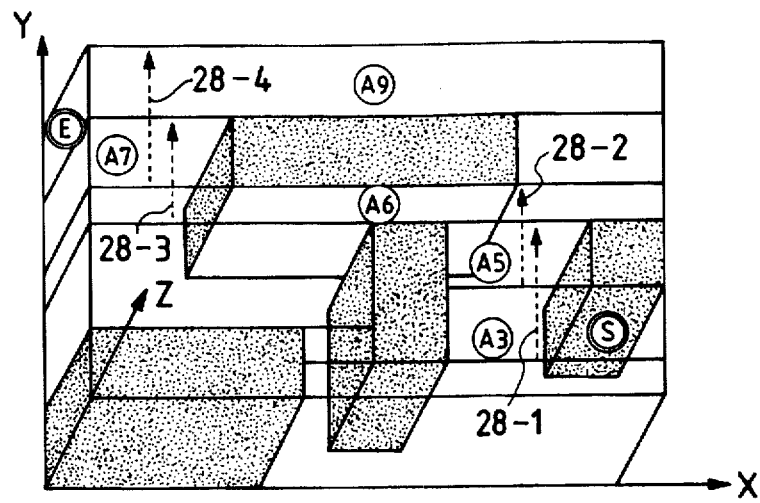
FIG. 33(1) is a drawing to illustrate rout candidates in the y direction.
Figure 33:
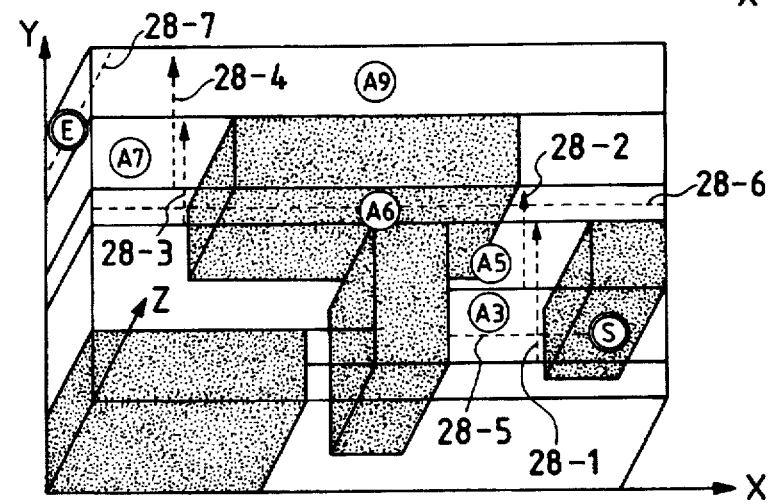
Figure 33:
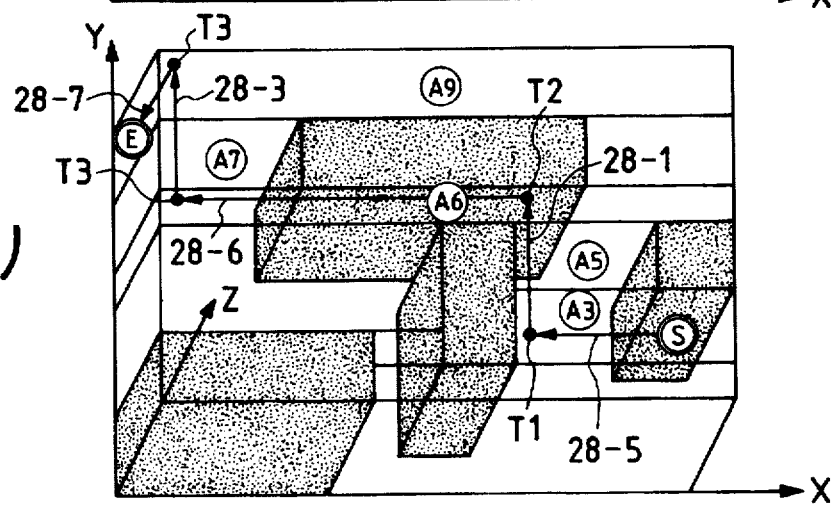

Segment lines are searched and those in the movable range are taken out as problem line segments. The line segments are taken out of the list of the problem line segments and the crossing points of the problem line segment and the non-problem line segments are found out to determine the new line segments which form the improved routing. FIG. 33(3) illustrates the final result.

The above embodiment adopting automatic processing for routing discussed the method of automatic generation of one route. More than one route can be bundled and treated as one complex route.

Furthermore, although, in the above-mentioned embodiments, the interactive processing or the automatic processing for the component arrangement and the routing is used independently, it is also possible and may be effective to combine both of the processing ways arrange component arrangement and the routing by making the most of merits of each processing ways.

While preferred embodiments of the present invention mainly refer to applications to design and production of plant structures, the present invention is also applicable to design and production activities for arrangement of general structures containing piping in construction, ship, railroad vehicle, aircraft, automobile, and medical equipment fields. Furthermore, the present invention is applicable to design and production activities for integrated circuits using semiconductors which requires three-dimensional structure designing to increase packing density.

A plant component design and production supporting system in accordance with the present invention enables the designer to adequately lay out plant components in a plant space interactively with a computer via its display screen.

This supporting system enables throughout generation of various information of plant components from basic design information to detailed design information, further to production information, greatly increasing the efficiency in design and production, reducing design and production supporting processes, and making the designing costs in factories very low.

What is claimed is:

1. A design and production supporting system for component arrangement and pipe routing comprising:

inputting means for inputting basic design information including arrangement space information, component design information, and logical connection information representing connectivity relationship among components;

three-dimensional component mapping means for generating three-dimensional components layout information from said basic design information, wherein said three-dimensional component mapping means includes:

means for arranging and displaying components in a two-dimensional plane assigned in an object three-dimensional arrangement space in such a way as to preserve said connectivity relationship among said components, means for interactively moving and arranging three-dimensionally each of said components in such a way that said connectivity relationship is displayed in said two-dimensional place in said object three-dimensional arrangement space, and routing means for deciding routes connecting said components arranged in said object three-dimensional arrangement space, further comprising:

means for inputting component arrangement constraint conditions, wherein said three-dimensional component mapping means comprising:

means for automatically arranging said components based on said basic design information and said component arrangement constraint conditions, wherein said three-dimensional component mapping means comprises means for automatically deciding pipe routing among said components based on said basic design information and said component arrangement constraint conditions, wherein said means for automatically deciding pipe routing among said components comprises:

means for dividing a route to be laid out into sub-routes and generating a sub-route list which includes information on a start point and an end point and further linkage directions of said sub-routes;

means for specifying a space for layout of said sub-route containing said start and end point and evaluating said sub-route searched by using said basic design information under said constraint condition requiring most reduction of routing distance between said start and end point of said sub-route in said specified space; and means for laying out the most highly evaluated sub-routes in said specified space.

2. A design and production supporting system for component arrangement and pipe routing according to claim 1, further comprising:

means for generating production mapping information based on said obtained three-dimensional component layout information.

3. A design and production supporting system for component arrangement and pipe routing according to claim 1, further comprising:

means for displaying said component arrangement obtained by said means for automatically arranging said components; and means for interactively deciding component arrangement by moving displayed components of said automatically obtained component arrangement in a displayed in a displayed space.

* * * * *